(12) United States Patent
Zhang et al.

(10) Patent No.: US 12,277,362 B2
(45) Date of Patent: Apr. 15, 2025

(54) SCREEN CASTING METHOD, DEVICE, AND STORAGE MEDIUM FOR SUPPORTING AUDIO STATUS CONSISTENCY

(71) Applicant: HONOR DEVICE CO., LTD., Shenzhen (CN)

(72) Inventors: Lan Zhang, Shenzhen (CN); Hui Dou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/032,524

(22) PCT Filed: Jan. 25, 2022

(86) PCT No.: PCT/CN2022/073710
§ 371 (c)(1),
(2) Date: Apr. 18, 2023

(87) PCT Pub. No.: WO2023/103167
PCT Pub. Date: Jun. 15, 2023

(65) Prior Publication Data
US 2024/0248670 A1   Jul. 25, 2024

(30) Foreign Application Priority Data
Dec. 8, 2021   (CN) .......................... 202111493131.4

(51) Int. Cl.
G06F 3/14 (2006.01)
G06F 3/04817 (2022.01)
G06F 3/16 (2006.01)

(52) U.S. Cl.
CPC ........ *G06F 3/1454* (2013.01); *G06F 3/04817* (2013.01); *G06F 3/165* (2013.01)

(58) Field of Classification Search
CPC .................................................... G06F 3/1454
See application file for complete search history.

(56) References Cited

U.S. PATENT DOCUMENTS 11,360,732 B1 *  6/2022  Dagani ............... G09G 5/14
2011/0283191 A1  11/2011  Maki et al.
(Continued)

FOREIGN PATENT DOCUMENTS

CN       109032555 A      12/2018
CN       111078166 A       4/2020
(Continued)

OTHER PUBLICATIONS

Li CN113010139 (A) Machine Translation (Year: 2024).*

*Primary Examiner* — Gustavo Polo
(74) *Attorney, Agent, or Firm* — WOMBLE BOND DICKINSON (US) LLP

(57) ABSTRACT

This application provides a screen casting method, a device, and a storage medium. In a screen casting process, when a sound output device is switched to the screen casting transmit end, whether the screen casting transmit end outputs a sound depends on a current status of an audio status switching control, thereby ensuring that whether the screen casting transmit end outputs a sound can be consistent with an expectation of a user in a screen casting scenario. In addition, in the screen casting method provided in this application, when whether the screen casting transmit end outputs a sound is set based on a click operation performed by the user on the audio status switching control, an icon corresponding to the audio status switching control is dynamically modified based on an audio status (mute or non-mute) corresponding to the audio status switching control.

18 Claims, 31 Drawing Sheets

(56) References Cited

U.S. PATENT DOCUMENTS

| | | |
|---|---|---|
| 2015/0296247 A1 | 10/2015 | Glasser |
| 2016/0086568 A1 | 3/2016 | Imamura et al. |
| 2020/0125323 A1 | 4/2020 | Lee et al. |
| 2021/0263642 A1 | 8/2021 | Li et al. |
| 2022/0070599 A1 | 3/2022 | Ma et al. |
| 2023/0119300 A1* | 4/2023 | Chen ................ H04N 21/43078 725/38 |

FOREIGN PATENT DOCUMENTS

| | | |
|---|---|---|
| CN | 111327769 A | 6/2020 |
| CN | 111475133 A | 7/2020 |
| CN | 111741372 A | 10/2020 |
| CN | 111954028 A | 11/2020 |
| CN | 111988653 A | 11/2020 |
| CN | 112394901 A | 2/2021 |
| CN | 112835549 A | 5/2021 |
| CN | 113010139 A | 6/2021 |
| CN | 113225592 A | 8/2021 |
| CN | 113721880 A | 11/2021 |
| CN | 113905217 A | 1/2022 |
| JP | 2011142430 A | 7/2011 |
| JP | 2016059751 A | 4/2016 |
| KR | 20200043887 A | 4/2020 |
| WO | 2021103920 A1 | 6/2021 |

\* cited by examiner

SCREEN CASTING METHOD, DEVICE, AND STORAGE MEDIUM FOR SUPPORTING AUDIO STATUS CONSISTENCY

CROSS-REFERENCE TO RELATED APPLICATIONS

This application is a national stage of International Application No. PCT/CN2022/073710, filed on Jan. 25, 2022, which claims priority to Chinese Patent Application No. 202111493131.4, filed on Dec. 8, 2021, both of which are incorporated herein by references in their entireties.

TECHNICAL FIELD

This application relates to the field of screen casting technologies, and in particular, to a screen casting method, a device, and a storage medium.

BACKGROUND

With development of terminal technologies, more terminals have a screen casting function. For example, in a home, work, teaching, or game scenario, a terminal casts a currently displayed picture onto a large screen, to greatly facilitate viewing content of the picture by people.

In a screen casting scenario in which a screen casting transmit end, namely, a terminal that sends screen casting information, is a personal computer (personal computer, PC device), currently, a screen casting application installed on the PC device needs to be used to cast audio/video content played on the PC device onto a screen casting receive end, for example, a large-screen device (subsequently referred to as a large-screen device) such as a television.

Although the PC device can implement a screen casting function by using the screen casting application, some problems cannot be ignored, for example, an audio status of the PC device may be inconsistent with a status obtained after a user performs modification before screen casting or during screen casting.

SUMMARY

To resolve the foregoing technical problem, this application provides a screen casting method, a device, and a storage medium, to implement consistency between an audio status of a PC device and an audio status set by a user in a screen casting scenario.

According to a first aspect, this application provides a screen casting method, applied to a screen casting transmit end. The screen casting transmit end is a PC device, a screen casting application is installed on the PC device, and the method includes: displaying an audio status switching control and a volume slider control in a display interface of the screen casting transmit end: when the screen casting transmit end plays audio data based on a volume value corresponding to the volume slider control, after receiving a click operation on the audio status switching control, stopping, by the screen casting transmit end in response to the click operation, outputting a sound, and modifying an icon corresponding to the volume status switching control from a non-mute icon into a mute icon: playing the audio data by using a screen casting receive end after the screen casting transmit end establishes a screen casting connection to the screen casting receive end: and after receiving a click operation for switching a sound output device from the screen casting receive end to the screen casting transmit end, stopping, by the screen casting transmit end in response to the click operation, sending the audio data to the screen casting receive end, keeping mute, and keeping the icon corresponding to the volume status switching control as the mute icon. Therefore, in a screen casting process, when the sound output device is switched to the screen casting transmit end, whether the screen casting transmit end outputs a sound depends on a current status of the audio status switching control, thereby ensuring that whether the screen casting transmit end outputs a sound can be consistent with an expectation of a user in a screen casting scenario.

In addition, in the screen casting method provided in this application, when whether the screen casting transmit end outputs a sound is set based on a click operation performed by the user on the audio status switching control, the icon corresponding to the audio status switching control is dynamically modified based on an audio status (mute or non-mute) corresponding to the audio status switching control, to keep both auditory consistency and visual consistency with expectations of the user, thereby improving user experience.

According to the first aspect, after the stopping sending the audio data to the screen casting receive end, keeping mute, and keeping the icon corresponding to the volume status switching control as the mute icon, the method further includes: playing, by the screen casting transmit end after receiving a click operation on the audio status switching control, the audio data based on the volume value corresponding to the volume slider control in response to the click operation, and modifying the icon corresponding to the volume status switching control from the mute icon into the non-mute icon. Therefore, before screen casting, the screen casting transmit end is set to mute: in the screen casting process, after the user switches the sound output device back to the screen casting transmit end, the screen casting transmit end can keep mute: and when the user clicks the audio status switching control again to set the audio status to non-mute, that is, cancel mute, the screen casting transmit end can output a sound, and the icon corresponding to the audio status switching control is modified from the mute icon into the non-mute icon, thereby keeping consistency with a status set by the user.

According to any one of the first aspect or the foregoing implementation of the first aspect, after the playing, by the screen casting transmit end after receiving a click operation on the audio status switching control, the audio data based on the volume value corresponding to the volume slider control in response to the click operation, and modifying the icon corresponding to the volume status switching control from the mute icon into the non-mute icon, the method further includes: after receiving a click operation on the audio status switching control, stopping, by the screen casting transmit end in response to the click operation, outputting a sound, and modifying the icon corresponding to the volume status switching control from the non-mute icon into the mute icon. Therefore, in a scenario in which the sound output device is the screen casting transmit end, if the user modifies an audio status of the screen casting transmit end again, both the audio status of the screen casting transmit end and the corresponding icon can be changed based on user settings, to keep consistency with a status set by the user.

According to any one of the first aspect or the foregoing implementations of the first aspect, after the playing the audio data by using a screen casting receive end after the screen casting transmit end establishes a screen casting connection to the screen casting receive end, the method further includes: after receiving a click operation for breaking the screen casting connection between the screen casting transmit end and the screen casting receive end, stopping, by the screen casting transmit end in response to the click operation, sending the audio data to the screen casting receive end, keeping mute, and keeping the icon corresponding to the volume status switching control as the mute icon. Therefore, if the screen casting transmit end is set to mute by the user before screen casting and the audio status of the screen casting transmit end is not modified in the screen casting process, after screen casting disconnection, the screen casting transmit end keeps in an audio status existing before screen casting, to keep consistency with a status set by the user.

According to any one of the first aspect or the foregoing implementations of the first aspect, after the playing the audio data by using a screen casting receive end after the screen casting transmit end establishes a screen casting connection to the screen casting receive end, the method further includes: modifying, by the screen casting transmit end after receiving a click operation on the audio status switching control, the icon corresponding to the audio status switching control from the mute icon into the non-mute icon in response to the click operation. Therefore, if the user modifies the audio status of the screen casting transmit end in the screen casting process, the modification of the user is recorded, and the icon corresponding to the audio status switching control is modified based on the audio status, so that the audio status of the screen casting transmit end can be consistent with a status set by the user.

According to any one of the first aspect or the foregoing implementations of the first aspect, after the modifying, by the screen casting transmit end after receiving a click operation on the audio status switching control, the icon corresponding to the audio status switching control from the mute icon into the non-mute icon in response to the click operation, the method further includes: after receiving the click operation for switching the sound output device from the screen casting receive end to the screen casting transmit end, stopping, by the screen casting transmit end in response to the click operation, sending the audio data to the screen casting receive end, playing the audio data based on the volume value corresponding to the volume slider control, and keeping the icon corresponding to the volume status switching control as the non-mute icon. Therefore, if the user modifies the audio status of the screen casting transmit end in the screen casting process, when the sound output device is switched to the screen casting transmit end, based on an audio status set by the user for the screen casting transmit end in the screen casting process, the screen casting transmit end can be controlled to output a sound or to be mute, so that the audio status of the screen casting transmit end can be consistent with a status set by the user.

According to any one of the first aspect or the foregoing implementations of the first aspect, after the modifying, by the screen casting transmit end after receiving a click operation on the audio status switching control, the icon corresponding to the audio status switching control from the mute icon into the non-mute icon in response to the click operation, the method further includes: after receiving a click operation for breaking the screen casting connection between the screen casting transmit end and the screen casting receive end, stopping, by the screen casting transmit end in response to the click operation, sending the audio data to the screen casting receive end, playing the audio data based on the volume value corresponding to the volume slider control, and keeping the icon corresponding to the volume status switching control as the non-mute icon. Therefore, if the user modifies the audio status of the screen casting transmit end in the screen casting process, after screen casting disconnection, the screen casting transmit end keeps in an audio status obtained after the user performs modification in the screen casting process, thereby implementing consistency with a status set by the user.

According to any one of the first aspect or the foregoing implementations of the first aspect, after the playing the audio data by using a screen casting receive end after the screen casting transmit end establishes a screen casting connection to the screen casting receive end, the method further includes: after receiving a click operation on the volume slider control, playing the audio data by using the screen casting receive end based on an adjusted volume value. Therefore, in the screen casting process, the user can modify a volume value of the screen casting transmit end to change a volume of the audio data output to the screen casting receive end, so that the screen casting receive end can play the audio data based on a volume value obtained after the screen casting transmit end performs adjustment.

According to any one of the first aspect or the foregoing implementations of the first aspect, the playing the audio data by using a screen casting receive end after the screen casting transmit end establishes a screen casting connection to the screen casting receive end includes: when the screen casting transmit end plays the audio data by using a built-in speaker, after receiving a screen casting connection request, establishing, by the screen casting transmit end, the screen casting connection to the screen casting receive end in response to the screen casting connection request, obtaining the audio data from a sound channel corresponding to the speaker, and sending the audio data to the screen casting receive end, so that the screen casting receive end plays the audio data.

For example, in actual application, identification numbers of audio devices, such as a speaker and a headset, may be recorded, to determine, based on an identification number, an audio device currently used by the screen casting transmit end.

Therefore, the identification number of the audio device currently used by the screen casting transmit end is recorded, so that when the sound output device is the screen casting receive end, the screen casting transmit end can obtain, from a sound channel corresponding to the audio device identified by the recorded identification number, audio data that needs to be played, and send the audio data to the screen casting receive end. In this way, in the screen casting scenario, regardless of whether the screen casting transmit end switches the audio device, the screen casting receive end can receive audio data that can be played, that is, can normally output a sound.

According to any one of the first aspect or the foregoing implementations of the first aspect, after the obtaining the audio data from a sound channel corresponding to the speaker, and sending the audio data to the screen casting receive end, so that the screen casting receive end plays the audio data, the method further includes: after receiving the click operation for switching the sound output device from the screen casting receive end to the screen casting transmit end, stopping, by the screen casting transmit end in response to the click operation, obtaining the audio data from the sound channel corresponding to the speaker, keeping the speaker mute, and keeping the icon corresponding to the volume status switching control as the mute icon. Therefore, in the screen casting process, when the sound output device is switched to the screen casting transmit end, and the audio device currently used by the screen casting transmit end is a built-in speaker, whether the speaker of the screen casting transmit end outputs a sound depends on a current status of an audio status switching control corresponding to the speaker, thereby ensuring that whether the speaker of the screen casting transmit end outputs a sound can be consistent with an expectation of the user in the screen casting scenario.

According to any one of the first aspect or the foregoing implementations of the first aspect, after the obtaining the audio data from a sound channel corresponding to the speaker, and sending the audio data to the screen casting receive end, so that the screen casting receive end plays the audio data, the method further includes: after receiving the click operation for breaking the screen casting connection between the screen casting transmit end and the screen casting receive end, stopping, by the screen casting transmit end in response to the click operation, obtaining the audio data from the sound channel corresponding to the speaker, keeping the speaker mute, and keeping the icon corresponding to the volume status switching control as the mute icon.

According to any one of the first aspect or the foregoing implementations of the first aspect, after the obtaining the audio data from a sound channel corresponding to the speaker, and sending the audio data to the screen casting receive end, so that the screen casting receive end plays the audio data, the method further includes: after a headset is connected to the screen casting transmit end, obtaining the audio data from a sound channel corresponding to the headset, sending the audio data to the screen casting receive end, so that the screen casting receive end plays the audio data, and modifying the icon corresponding to the volume status switching control from the mute icon into the non-mute icon.

According to any one of the first aspect or the foregoing implementations of the first aspect, after the obtaining the audio data from a sound channel corresponding to the headset, sending the audio data to the screen casting receive end, so that the screen casting receive end plays the audio data, and modifying the icon corresponding to the volume status switching control from the mute icon into the non-mute icon, the method further includes: after receiving a click operation on the audio status switching control, setting, by the screen casting transmit end, the headset to a mute state in response to the click operation, and modifying the icon corresponding to the volume status switching control from the non-mute icon into the mute icon.

According to any one of the first aspect or the foregoing implementations of the first aspect, after the setting the headset to a mute state, and modifying the icon corresponding to the volume status switching control from the non-mute icon into the mute icon, the method further includes: after receiving the click operation for switching the sound output device from the screen casting receive end to the screen casting transmit end, stopping, by the screen casting transmit end in response to the click operation, obtaining the audio data from the sound channel corresponding to the headset, controlling the headset to stop outputting a sound, and keeping the icon corresponding to the volume status switching control as the mute icon. Therefore, in the screen casting process, when the sound output device is switched to the screen casting transmit end, and the audio device currently used by the screen casting transmit end is an external headset, whether the headset of the screen casting transmit end outputs a sound depends on a current status of an audio status switching control corresponding to the headset, thereby ensuring that whether the headset of the screen casting transmit end outputs a sound can be consistent with an expectation of the user in the screen casting scenario.

According to any one of the first aspect or the foregoing implementations of the first aspect, after the stopping obtaining the audio data from the sound channel corresponding to the headset, controlling the headset to stop outputting a sound, and keeping the icon corresponding to the volume status switching control as the mute icon, the method further includes: after receiving a click operation on the audio status switching control, controlling, by the screen casting transmit end in response to the click operation, the headset to output a sound, and modifying the icon corresponding to the volume status switching control from the mute icon into the non-mute icon.

According to any one of the first aspect or the foregoing implementations of the first aspect, after the setting the headset to a mute state, and modifying the icon corresponding to the volume status switching control from the non-mute icon into the mute icon, the method further includes: after receiving the click operation for breaking the screen casting connection between the screen casting transmit end and the screen casting receive end, stopping, by the screen casting transmit end in response to the click operation, obtaining the audio data from the sound channel corresponding to the headset, controlling the headset to stop outputting a sound, and keeping the icon corresponding to the volume status switching control as the mute icon.

According to a second aspect, this application provides a screen casting method, applied to a screen casting transmit end. A screen casting application is installed on the screen casting transmit end, and the method includes: after receiving a screen casting connection request, obtaining an initial audio status of the screen casting transmit end, and recording the initial audio status in an audio status table, where the initial audio status is a mute state or a non-mute state; determining a sound output device selected by a user: and when the sound output device is the screen casting transmit end, setting an audio status of the screen casting transmit end to the initial audio status: or when the sound output device is a screen casting receive end, setting the screen casting transmit end to the mute state, and sending audio data in screen casting information to the screen casting receive end.

For example, the screen casting transmit end is a PC device.

Therefore, in the screen casting solution provided in this application, in a screen casting scenario, an audio status in which the screen casting transmit end is before a screen casting connection is established is obtained, and the obtained audio status is recorded in the audio status table as the initial audio status of the screen casting transmit end. In this way, when it is determined that the sound output device selected by the user is the screen casting transmit end, the audio status of the screen casting transmit end is directly set to the initial audio status recorded in the audio status table. Therefore, in the screen casting scenario, when a sound is switched back to the screen casting transmit end, the audio status of the screen casting transmit end can be consistent with an audio status expected by the user, thereby greatly improving user experience.

According to the second aspect, after the obtaining an initial audio status of the screen casting transmit end, and recording the initial audio status in an audio status table, the method further includes: invoking an audio status listening module to listen for a click operation performed by the user on an audio status switching control of the screen casting transmit end, where when an audio status corresponding to the audio status switching control is the mute state, after the audio status switching control is clicked, the audio status is switched from the mute state to the non-mute state: or when an audio status corresponding to the audio status switching control is the non-mute state, after the audio status switching control is clicked, the audio status is switched from the non-mute state to the mute state: and after detecting, through listening, a click operation performed by the user on the audio status switching control, updating, based on a switched audio status, the initial audio status recorded in the audio status table.

Therefore, in the screen casting solution provided in this application, in a screen casting process, the audio status listening module is enabled to continuously listen for the audio status of the screen casting transmit end, and the initial audio status recorded in the audio status table is updated when the audio status is changed, so that the initial audio status recorded in the audio status table can be changed based on an actual operation of the user, to ensure that when screen casting disconnection is performed or the sound output device is changed to the screen casting transmit end, an audio status set based on the initial audio status recorded in the audio status table is consistent with an audio status that the user actually wants to set. In this way, before screen casting or during screen casting, the user manually modifies the screen casting transmit end into the mute state, and after screen casting disconnection or outputting a sound by a large-screen device is switched to outputting a sound by the screen casting transmit end, the audio status of the screen casting transmit end can be consistent with an audio status set by the user, that is, the screen casting transmit end is in the mute state instead of directly outputting a sound.

According to any one of the second aspect or the foregoing implementation of the second aspect, after the sending audio data in screen casting information to the screen casting receive end, the method further includes: after the user changes the sound output device from the screen casting receive end to the screen casting transmit end, reading the initial audio status recorded in the audio status table: and setting the audio status of the audio device to the initial audio status.

Therefore, in the screen casting solution provided in this application, the audio status of the screen casting transmit end is set based on the initial audio status recorded in the audio status table, so that after the sound output device is changed from the screen casting receive end to the screen casting transmit end, the audio status of the screen casting transmit end can be consistent with a status set by the user, thereby further improving user experience.

According to any one of the second aspect or the foregoing implementations of the second aspect, the method further includes: after receiving a screen casting disconnection request, reading the initial audio status recorded in the audio status table: and setting the audio status of the screen casting transmit end to the initial audio status.

Therefore, in the screen casting solution provided in this application, the audio status of the screen casting transmit end is set based on the initial audio status recorded in the audio status table, so that after screen casting disconnection, the audio status of the screen casting transmit end can be consistent with a status set by the user, thereby further improving user experience.

According to any one of the second aspect or the foregoing implementations of the second aspect, after the connection to the screen casting receive end is broken, the method further includes: disabling the audio status listening module.

Therefore, in the screen casting solution provided in this application, further listening for a change of the audio status is stopped after screen casting ends, thereby effectively avoiding occupation and waste of a resource of the screen casting transmit end.

According to any one of the second aspect or the foregoing implementations of the second aspect, the screen casting application includes a screen casting management module, an audio management module, and a transmission module. The screen casting management module exchanges data with the audio management module, and the audio management module exchanges data with the transmission module. The setting an audio status of the screen casting transmit end to the initial audio status includes: setting, by the audio management module, the audio status of the screen casting transmit end to the initial audio status.

Therefore, in the screen casting solution provided in this application, the audio status of the screen casting transmit end is set by the audio management module in the screen casting process, so that it is only necessary for the audio management module to perform setting in a unified manner regardless of a protocol used by the screen casting application, thereby greatly reducing a development workload and maintenance difficulty.

According to any one of the second aspect or the foregoing implementations of the second aspect, the screen casting application includes a screen casting management module, an audio management module, and a transmission module. The screen casting management module exchanges data with the audio management module, the audio management module exchanges data with the transmission module, and the audio status table is managed by the audio management module. The setting an audio status of the screen casting transmit end to the initial audio status includes: sending, by the transmission module, an initial audio status query request to the audio management module: sending, by the audio management module to the transmission module based on the initial audio query request, the initial audio status recorded in the audio status table: and setting, by the transmission module, the audio status of the screen casting transmit end to the initial audio status.

Therefore, in the screen casting solution provided in this application, the audio status of the screen casting transmit end is set by the transmission module in the screen casting process, so that screen casting applications using different protocols can perform personalized settings based on actual requirements, thereby making the screen casting solution provided in this application more diversified.

According to any one of the second aspect or the foregoing implementations of the second aspect, the sending audio data in screen casting information to the screen casting receive end includes: determining a protocol type corresponding to the audio data: determining a target encoding manner of the audio data based on the protocol type: encoding the audio data in the target encoding manner to obtain an audio data packet: and sending the audio data packet to the screen casting receive end. In this way, the audio data is encoded in the encoding manner corresponding to the protocol type corresponding to the audio data, to ensure that audio data corresponding to different protocol types can be encoded in different encoding manners, so that the screen casting solution provided in this application can be adapted to screen casting applications using protocols of different protocol types.

According to any one of the second aspect or the foregoing implementations of the second aspect, the method further includes: sending the protocol type to the screen casting receive end when sending the audio data packet to the screen casting receive end. In this way, the screen casting receive end can know a decoding manner that needs to be used to decode the audio data packet, thereby ensuring accuracy of a decoding result.

According to any one of the second aspect or the foregoing implementations of the second aspect, the determining a target encoding manner of the audio data based on the protocol type includes: searching an encoding and decoding mapping relationship table for an encoding manner corresponding to the protocol type, where the encoding and decoding mapping relationship table is determined by the screen casting transmit end and the screen casting receive end through negotiation: and determining the found encoding manner as the target encoding manner.

Therefore, in the screen casting solution provided in this application, the encoding and decoding mapping relationship table for determining an encoding manner/a decoding manner corresponding to the protocol type is determined by the screen casting transmit end and the screen casting receive end through pre-negotiation. In this way, the encoding manner is not directly transmitted between the screen casting transmit end and the screen casting receive end, so that the audio data can be prevented from being obtained through decoding after content transmitted between the screen casting transmit end and the screen casting receive end is intercepted, thereby ensuring security of the transmitted content.

According to a third aspect, this application provides an electronic device. The electronic device is a screen casting transmit end and includes a processor and a memory, the memory is coupled to the processor, the memory stores program instructions, and when the program instructions are executed by the processor, the electronic device is enabled to execute the instructions of the method according to any one of the first aspect or the foregoing implementations of the first aspect, or execute the instructions of the method according to any one of the second aspect or the foregoing implementations of the second aspect.

According to a fourth aspect, this application provides a computer-readable medium, configured to store a computer program. When the computer program is run on an electronic device, the electronic device is enabled to execute the instructions of the method according to any one of the first aspect or the foregoing implementations of the first aspect, or execute the instructions of the method according to any one of the second aspect or the foregoing implementations of the second aspect.

According to a fifth aspect, this application provides a computer program product. The computer program product includes a computer program. When the computer program is run on an electronic device, the electronic device is enabled to execute the instructions of the method according to any one of the first aspect or the foregoing implementations of the first aspect, or execute the instructions of the method according to any one of the second aspect or the foregoing implementations of the second aspect.

According to a sixth aspect, this application provides a chip. The chip includes a processing circuit and a transceiver pin. The transceiver pin and the processing circuit communicate with each other by using an internal connection path. The processing circuit executes the instructions of the method according to any one of the first aspect or the foregoing implementations of the first aspect, or executes the instructions of the method according to any one of the second aspect or the foregoing implementations of the second aspect, to control a receive pin to receive a signal and control a transmit pin to send a signal.

According to a seventh aspect, this application provides a screen casting system. The system includes a screen casting transmit end and a screen casting receive end.

For example, the screen casting transmit end is the electronic device according to the third aspect.

For example, the screen casting receive end is a television, or another device that can receive and cast screen casting information sent by the screen casting transmit end.

DESCRIPTION OF EMBODIMENTS

Figure 1:
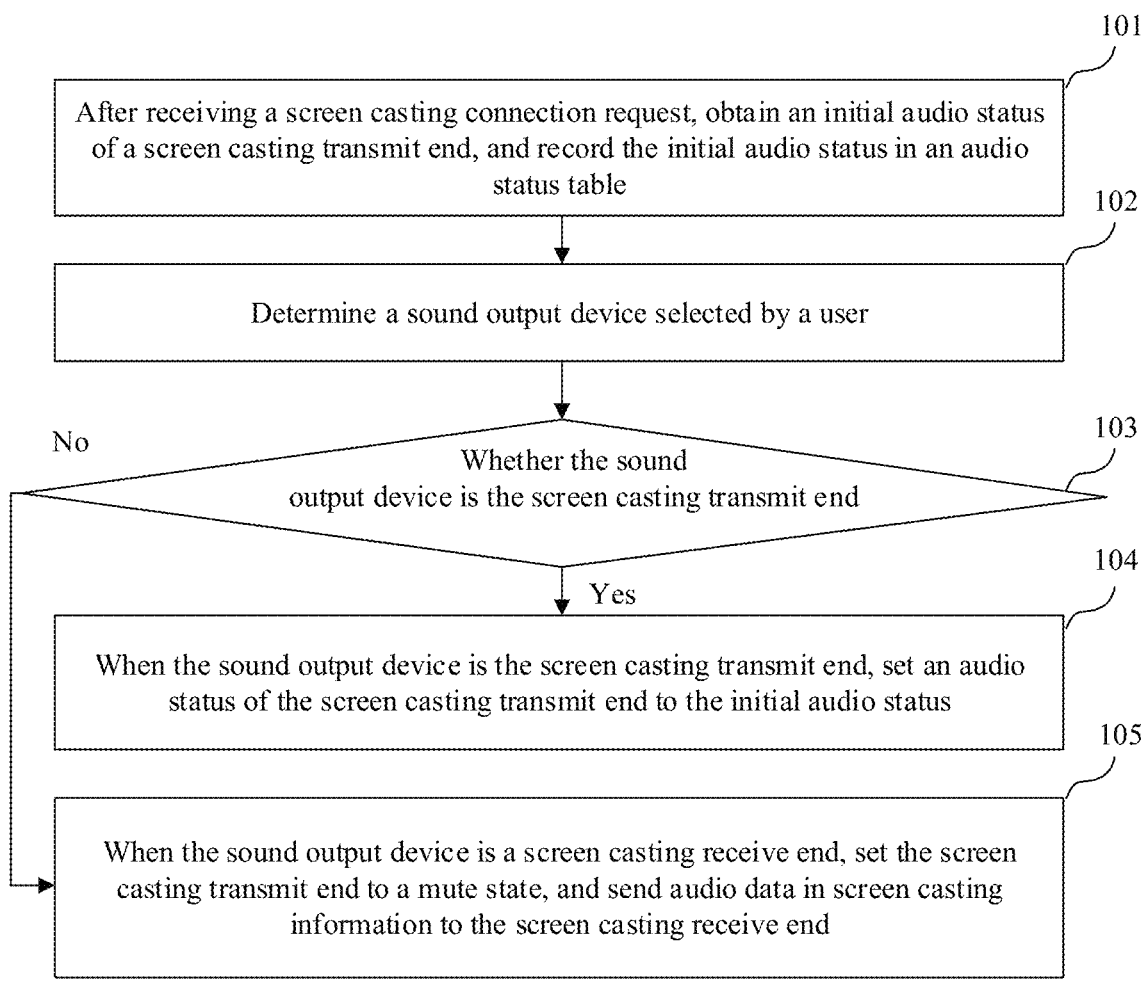
FIG. 1 is a schematic flowchart illustrating an example of a screen casting method according to an embodiment of this application.

The following clearly describes the technical solutions in embodiments of this application with reference to the accompanying drawings in the embodiments of this application. Apparently, the described embodiments are merely some rather than all of the embodiments of this application. All other embodiments obtained by persons of ordinary skill in the art based on the embodiments of this application without creative efforts fall within the protection scope of this application.

In this specification, the term "and/or" indicates merely an association relationship for describing associated objects, and indicates that three relationships may exist. For example, A and/or B may indicate the following three cases: Only A exists, both A and B exist, and only B exists.

The terms "first", "second", and the like in the specification and claims of the embodiments of this application are used to distinguish between different objects, and are not used to describe a specific sequence of objects. For example, a first target object, a second target object, and the like are used to distinguish between different target objects, and are not used to describe a specific sequence of target objects.

In the embodiments of this application, words such as "an example" or "for example" are used to indicate an instance, an illustration, or a description. Any embodiment or design solution described as "an example" or "for example" in the embodiments of this application should not be construed as being more preferred or advantageous than other embodiments or design solutions. Exactly, use of the words such as "an example" or "for example" is intended to present a related concept in a specific manner.

In the description of the embodiments of this application, unless otherwise stated, "a plurality of" means two or more. For example, a plurality of processing units mean two or more processing units, and a plurality of systems mean two or more systems.

Before the technical solutions of the embodiments of this application are described, an electronic device to which the technical solutions provided in the embodiments of this application are applicable is first described.

Specifically, the technical solutions provided in the embodiments are applied to a screen casting transmit end, and the screen casting transmit end is a PC device (hereinafter referred to as a PC) on which a screen casting application is installed.

For example, in the embodiments, the PC may be a desktop computer, or may be a notebook computer.

In addition, it should be noted that, in the embodiments, a screen casting receive end that receives screen casting content, such as video data, image data, or audio data, sent by the screen casting transmit end may be a large-screen device such as a television or a display screen.

The following describes implementation details of the technical solutions provided in the embodiments of this application, and the following content is merely implementation details provided for convenience of understanding and is not necessary for implementing the solutions.

For example, referring to FIG. 1, the embodiments of this application include the following specific implementation steps:

Step 101: After receiving a screen casting connection request, obtain an initial audio status of the screen casting transmit end, and record the initial audio status in an audio status table.

For example, in actual application, the screen casting application may include a screen casting management module, an audio management module, and a transmission module.

For example, the screen casting management module exchanges data with the audio management module, and the audio management module exchanges data with the transmission module.

Specifically, in the embodiments, a screen casting connection request, a screen casting disconnection request, and a sound output device switching request in a screen casting scenario are all obtained by the screen casting management module through listening.

Further, the initial audio status of the screen casting transmit end is obtained and managed by the audio management module.

Further, the transmission module is configured to transmit screen casting information of the screen casting transmit end to the screen casting receive end.

For example, in some implementation scenarios, the screen casting information may be any one or several of audio data, video data, and image data. This is not limited in the embodiments.

In addition, it should be noted that in the embodiments, an audio status falls into a mute state and a non-mute state. Therefore, the initial audio status may be, for example, the mute state or the non-mute state.

Further, specifically, in actual application, for quick identification inside a machine, the initial audio status recorded in the audio status table may be represented by a state value (state code) determined through pre-agreement.

For example, in some examples, the mute state may be represented by "0", and the non-mute state may be represented by "1".

It should be understood that the foregoing description is merely an example provided to better understand the technical solutions of the embodiments, and is not used as a unique limitation on the embodiments.

To better understand the technical solutions provided in the embodiments, the following describes, with reference to FIG. 2 to FIG. 7, an implementation process of initiating a screen casting connection request.

Figure 2:
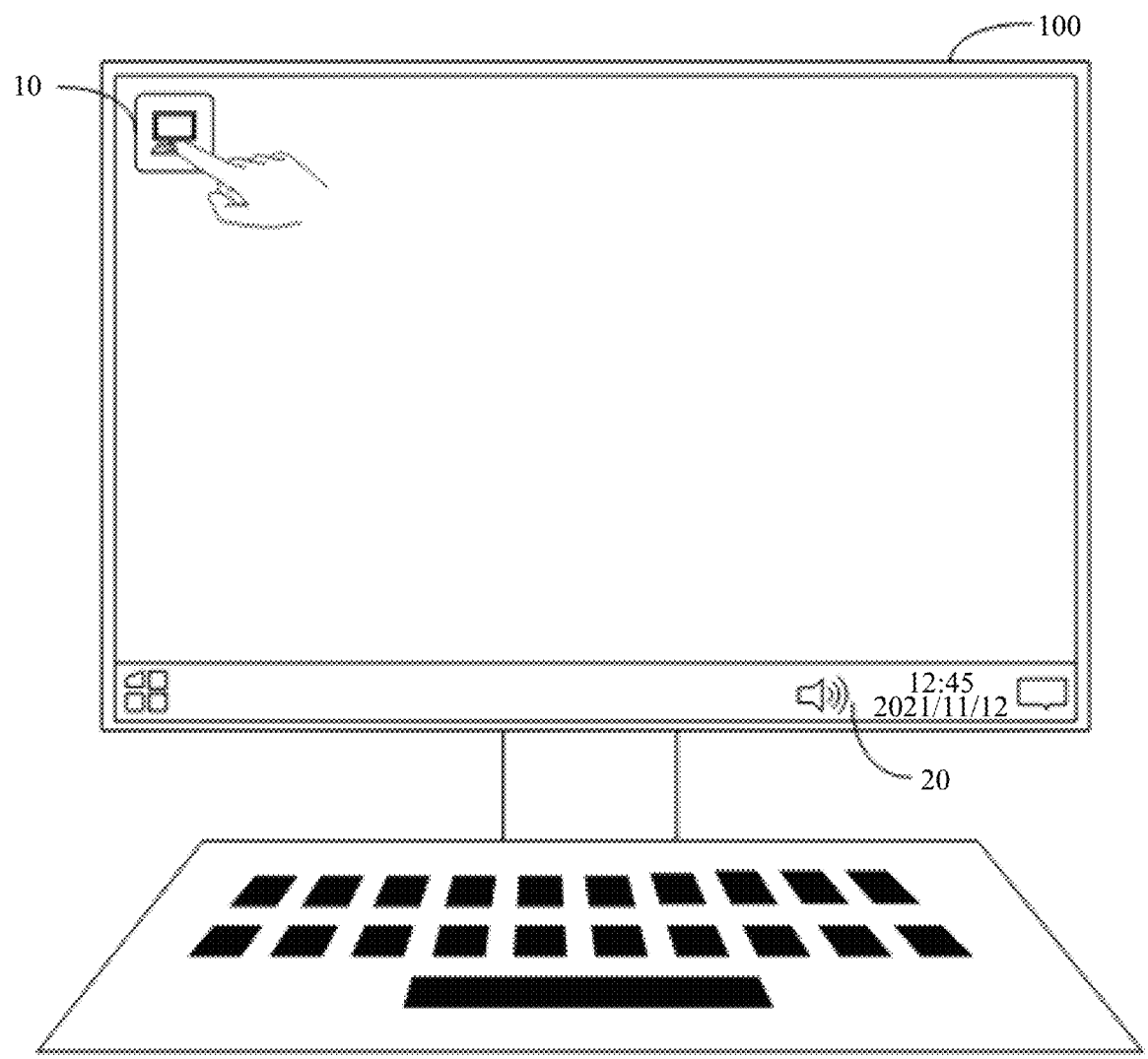
FIG. 2 is a schematic diagram illustrating an example of a home page of a screen casting transmit end.

Referring to FIG. 2, for example, a display interface of a PC device 100 displays a home page of the PC device 100.

It may be understood that, in actual application, the home page may include one or more controls, such as a video application control, a social application control, a browser control, and a computer manager application control. The controls are not listed one by one herein, and this is not limited in the embodiments.

Still referring to FIG. 2, specifically, in the technical solutions of the embodiments, the home page of the PC device 100 includes a screen casting application control 10.

In addition, a toolbar at the bottom of the home page of the PC device 100 may include one or more controls, such as a sound setting control 20 for setting an audio status of the PC device 100, for example, adjusting the audio status to a mute state or a non-mute state, and for bringing up a volume slider.

It should be noted that names and a quantity of controls displayed in the display interface of the PC device 100 and names and a quantity of controls in a pop-up interface in FIG. 2 and the following accompanying drawings are merely examples for illustration, and are not limited in this application.

Figure 3:
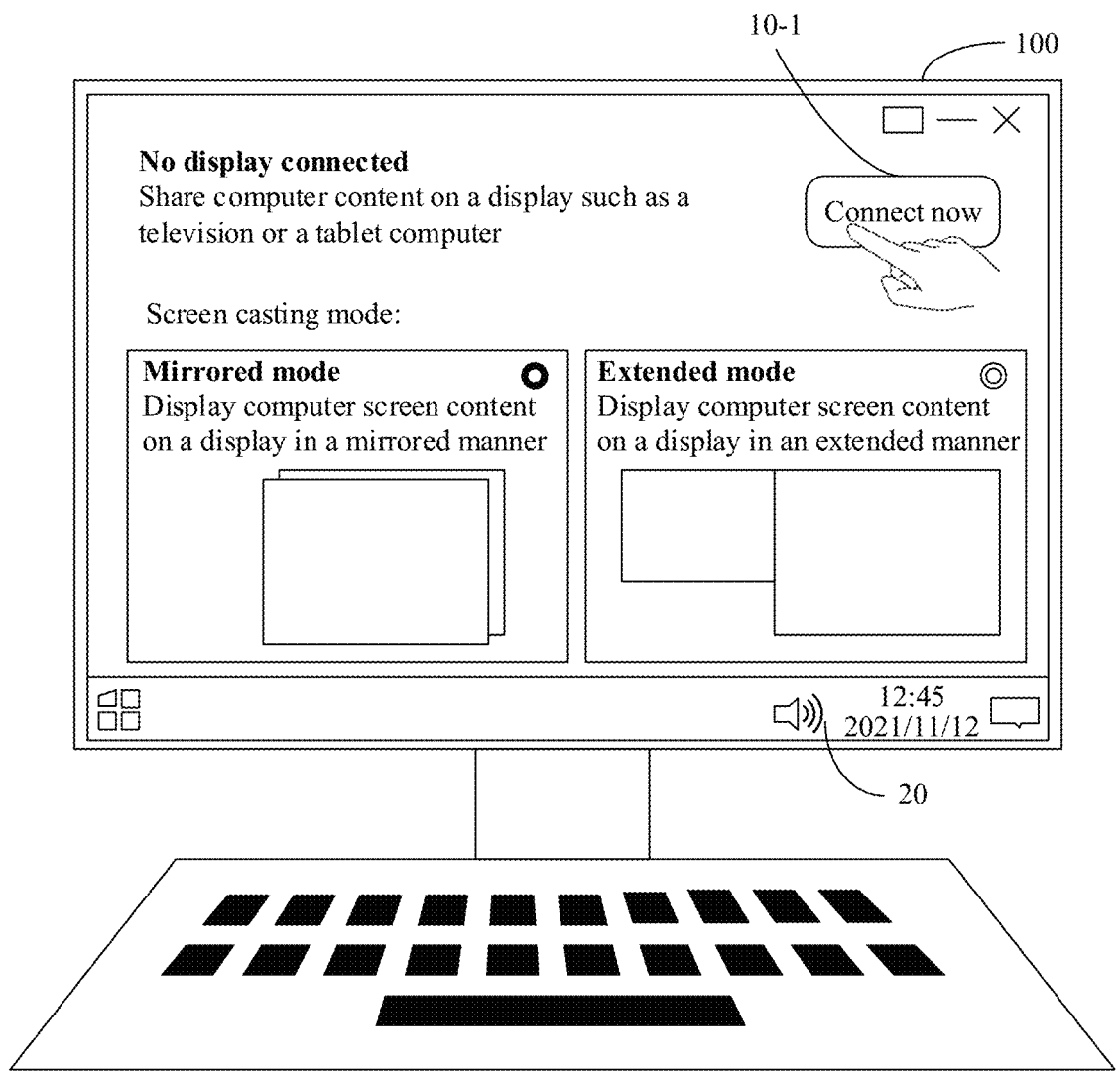
FIG. 3 is a schematic diagram 1 illustrating an example in which a screen casting application initiates a screen casting connection.

Still referring to FIG. 2, when a user wants to cast content of the PC device 100 onto a large-screen device such as a television, after the user clicks the screen casting application control 10 on the home page, the PC device 100 displays a screen casting connection initiation page in the display interface in response to the operation behavior of the user, as shown in FIG. 3.

Referring to FIG. 3, for example, the screen casting connection initiation page may include one or more options, for example, a "connect now" option 10-1 for initiating a screen casting connection request, and options used by the user to select a screen casting mode.

Still referring to FIG. 3, the options used by the user to select a screen casting mode include, for example, a "mirrored mode" option and an "extended mode" option.

The mirrored mode means that content on a screen of a computer, namely, a screen of the PC device 100, is displayed on a display of a screen casting receive end, for example, a large-screen device such as a television, in a mirrored manner. That is, after a screen casting connection between the PC device 100 and the large-screen device is established by using the mirrored mode, content displayed on the display of the large-screen device is exactly the same as the content displayed on the screen of the PC device 100.

The extended mode means that content on a screen of a computer, namely, a screen of the PC device 100, is displayed on a display of a screen casting receive end, for example, a large-screen device such as a television, in an extended manner. That is, after a screen casting connection between the PC device 100 and the large-screen device is established by using the extended mode, the display of the large-screen device displays both the content displayed on the screen of the PC device 100 and content of the large-screen device. This is similar to multi-screen coordination.

In addition, it should be noted that, in actual application, a function that needs to be implemented by the screen casting application may be alternatively integrated into one application with another function, for example, a system management function such as drive management or power management may be integrated into one application with a function, such as screen casting or multi-screen coordination, for improving user experience.

For example, the application may be referred to as, for example, "my computer" or "computer manager". This is not limited in the embodiments.

Figure 4:
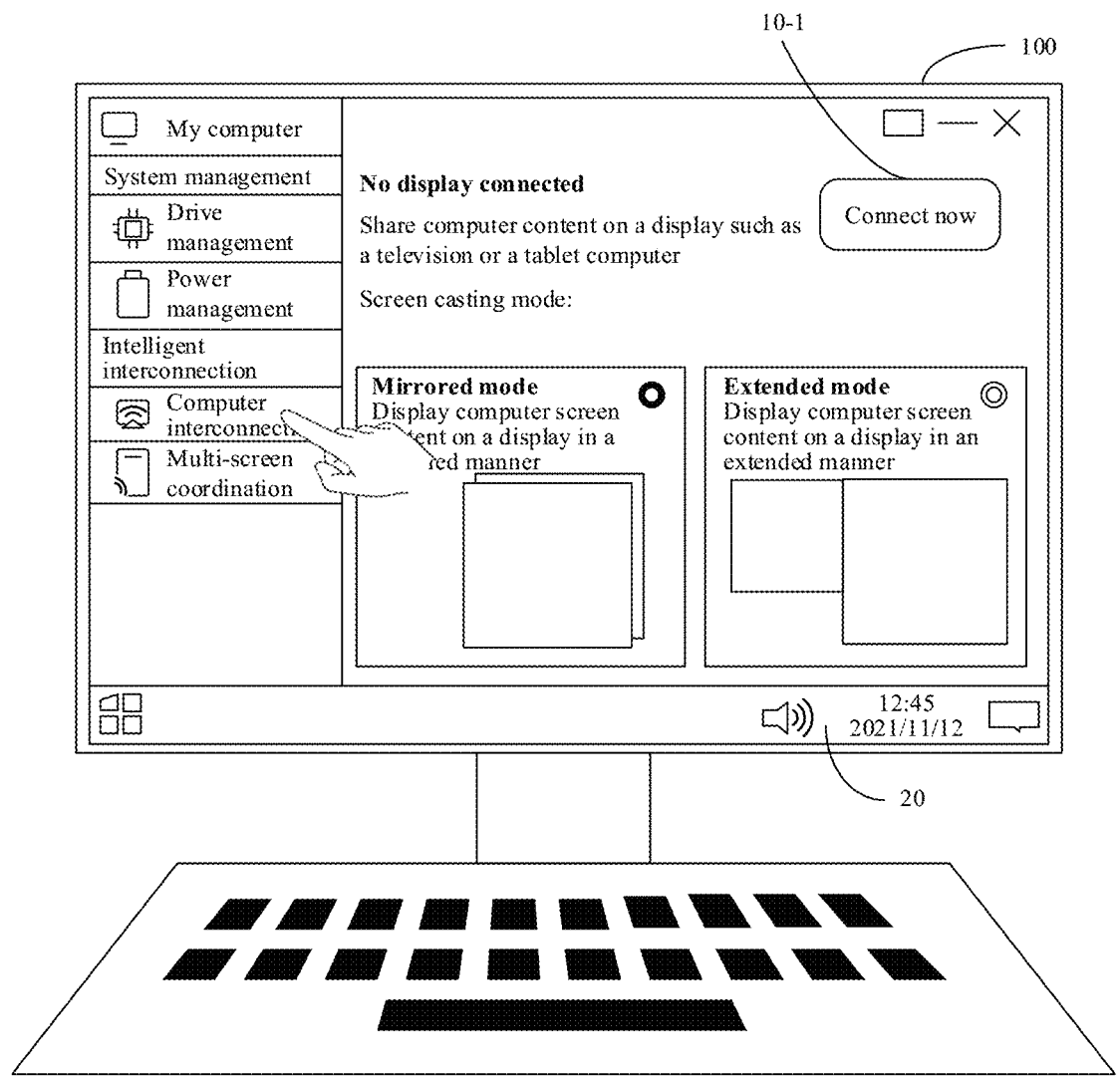
FIG. 4 is a schematic diagram 2 illustrating an example in which a screen casting application initiates a screen casting connection.

Referring to FIG. 4, for example, when the user clicks a "computer interconnection" option displayed in a function list, the PC device 100 displays, in a display interface on the right in response to the operation behavior of the user, the screen casting connection initiation page shown in FIG. 3.

Figure 5:
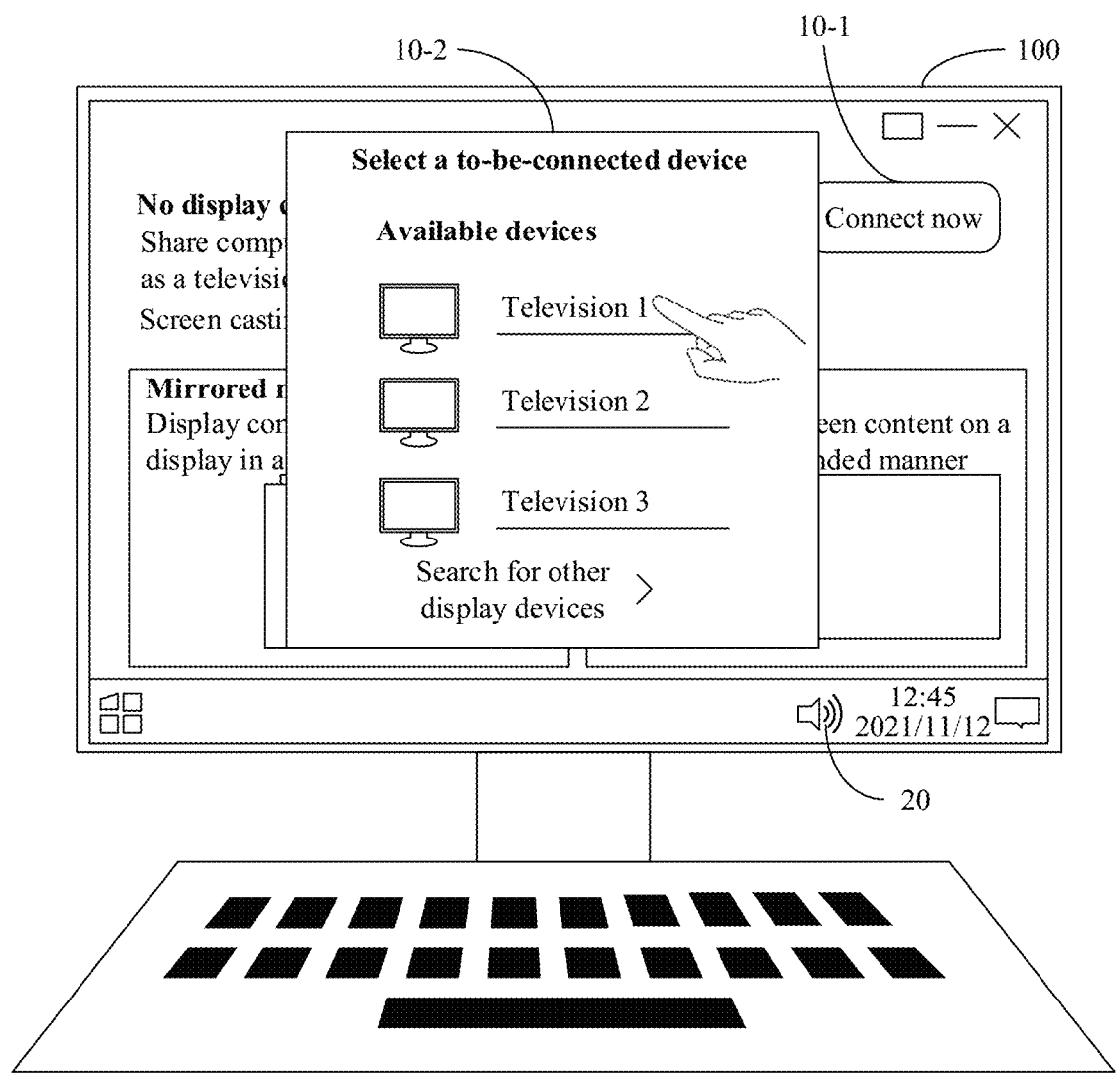
FIG. 5 is a schematic diagram illustrating an example of an interface for selecting a screen casting receive end.

Still referring to FIG. 3 or FIG. 4, after the user selects the mirrored mode and then clicks the "connect now" option 10-1, the PC device 100 displays a device selection window 10-2 in the display interface in response to the operation behavior of the user, as shown in FIG. 5.

Specifically, the device selection window 10-2 is used to display currently available devices, namely, large-screen devices that can be used as screen casting receive ends. For example, as shown in FIG. 5, the currently available devices include a television 1, a television 2, and a television 3.

Still referring to FIG. 5, the device selection window 10-2 may further include a "search for other display devices" option. In this way, when none of the currently displayed available devices is a device that needs to be selected by the user, the user may click the "search for other display devices" option to jump to a page for searching for other display devices, and the PC device 100 enables a search function to search for an available large-screen device nearby.

It may be understood that in an actual application scenario, a prerequisite for establishing a screen casting connection between the PC device 100 and the large-screen device may be, for example, that the screen casting connection is established in a wired connection manner or a wireless connection manner.

For example, the wireless connection manner may be, for example, that the two devices access a same WLAN network, or successfully match by using Bluetooth.

Therefore, in a screen casting scenario, when the PC device 100 establishes a connection to the large-screen device in a wireless manner, after the user clicks the "connect now" option 10-1, the PC device 100 further needs to determine whether the PC device has enabled Bluetooth or WLAN.

Correspondingly, if the PC device 100 has not enabled Bluetooth or WLAN, in response to the operation behavior of the user, before jumping to the device selection window 10-2, the PC device 100 first enables Bluetooth or WLAN, and then jumps to a device search interface.

Correspondingly, after a search operation ends, the PC device 100 jumps to the device selection window 10-2, to display found available devices in the device selection window 10-2.

In addition, it may be understood that, in actual application, the operation of enabling Bluetooth or WLAN may be completed by the PC device 100; or the PC device 100 may jump to an interface for enabling Bluetooth or WLAN, and Bluetooth or WLAN may be enabled by the user. This is not limited in the embodiments.

Figure 6:
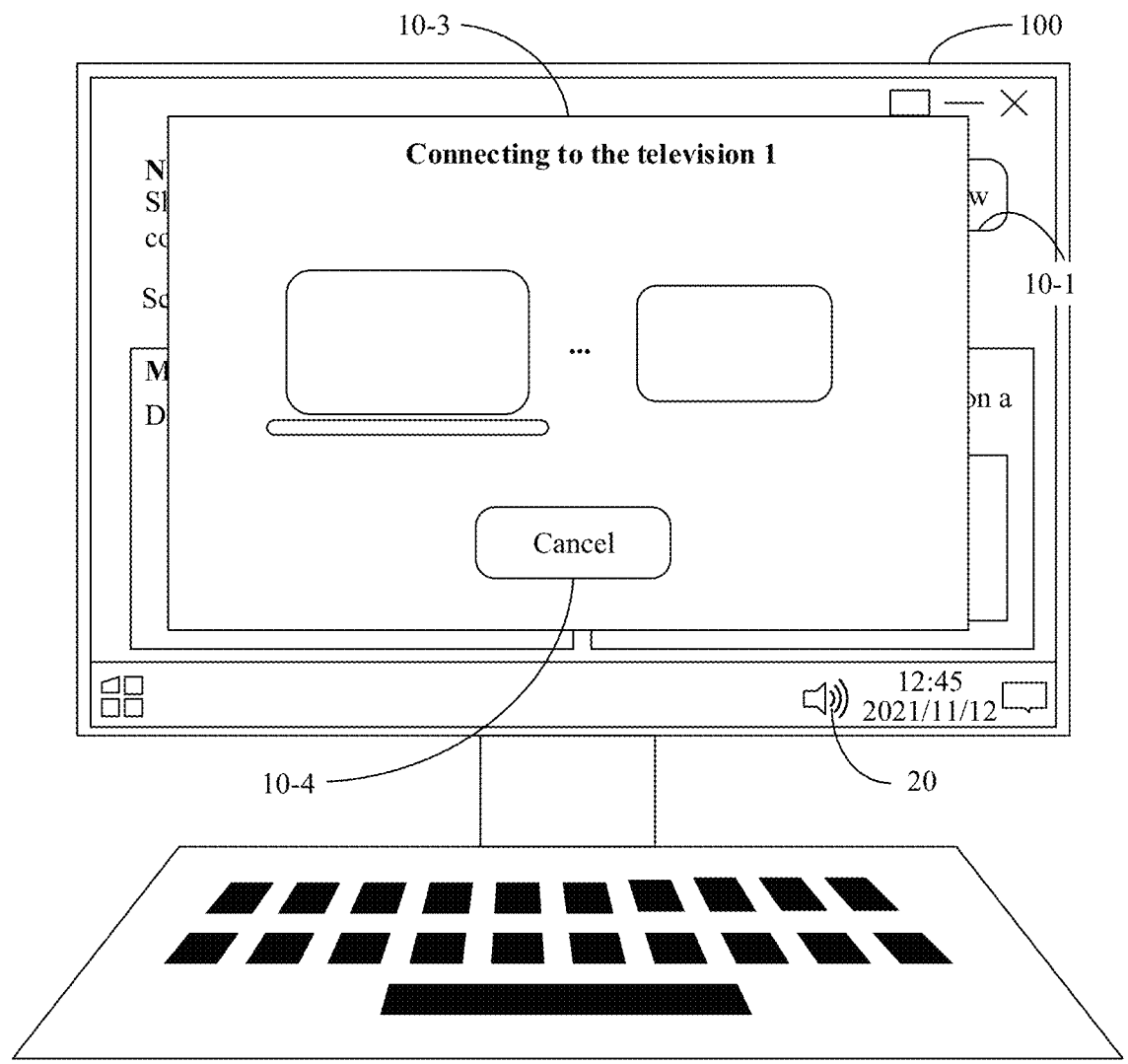
FIG. 6 is a schematic diagram illustrating an example of an interface for establishing a connection to a selected screen casting receive end.

Still referring to FIG. 5, for example, after the user clicks a "television 1" option, the PC device 100 displays a connection window 10-3 in the display interface in response to the operation behavior of the user, as shown in FIG. 6.

Referring to FIG. 6, for example, the displayed connection window 10-3 may include a cancel option 10-4.

For example, when the user clicks the cancel option 10-4, in response to the operation behavior of the user, the PC device 100 returns to the interface shown in FIG. 5.

Figure 7:
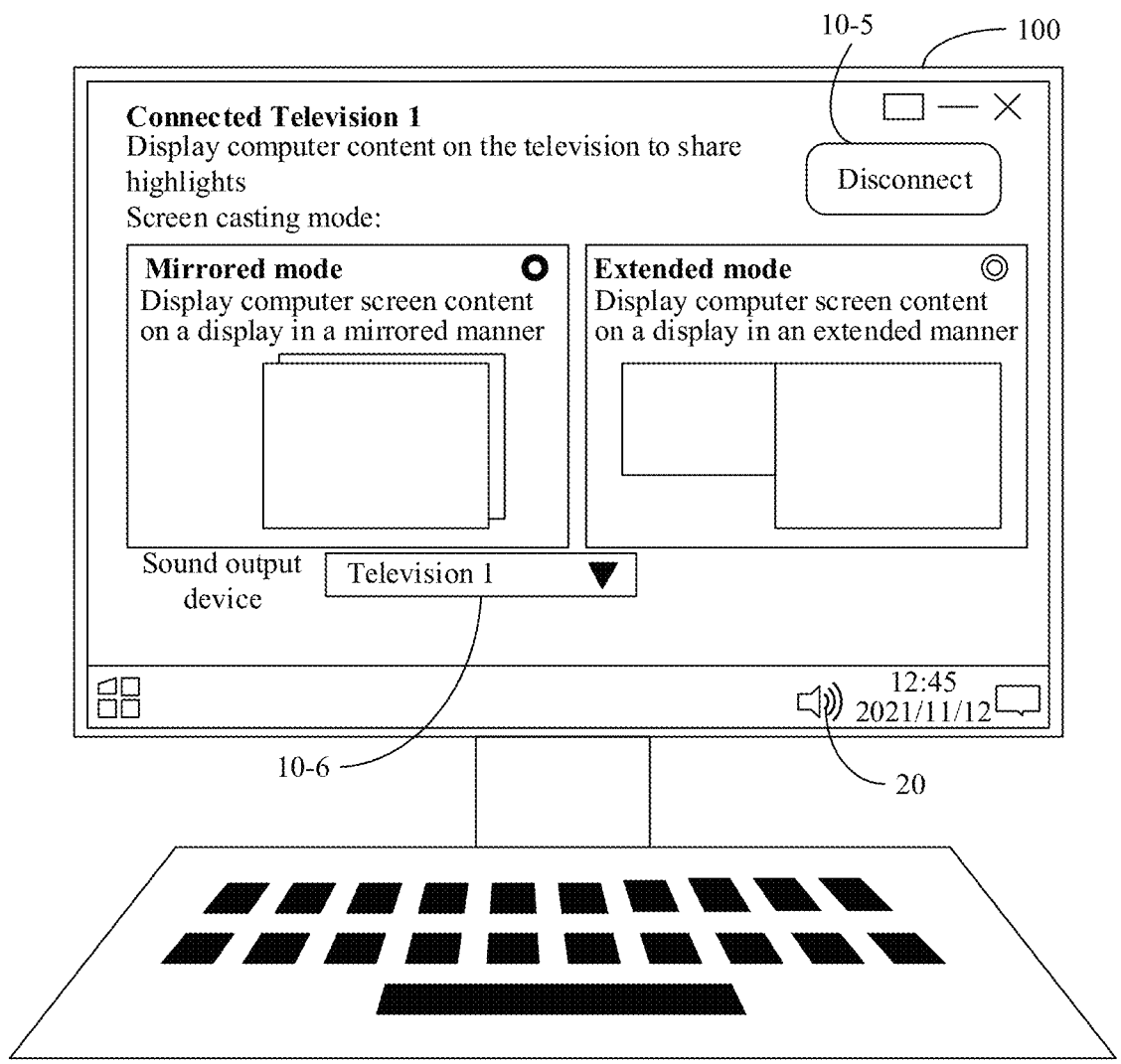
FIG. 7 is a schematic diagram illustrating an example of an interface that is of a screen casting application and that is displayed after a screen casting connection succeeds.

For example, after the PC device 100 establishes a screen casting connection to the television 1, the display interface of the PC device 100 is changed to a pattern shown in FIG. 7.

For example, an interface displayed after the screen casting connection succeeds may include one or more options, for example, a disconnect option 10-5, a sound output device selection option 10-6, and options used by the user to select a screen casting mode, for example, a "mirrored mode" option and an "extended mode" option, that are shown in FIG. 7.

It should be understood that the foregoing description is merely an example provided to better understand the technical solutions of the embodiments, and is not used as a unique limitation on the embodiments.

Step 102: Determine a sound output device selected by the user.

Still referring to FIG. 7, when the sound output device selected by the user is "television 1", it is determined that the sound output device is the screen casting receive end, that is, the screen casting receive end outputs a sound.

Correspondingly, when the sound output device selected by the user is "current device", it is determined that the sound output device is the screen casting transmit end, that is, the screen casting transmit end outputs a sound.

Step 103: Whether the sound output device is the screen casting transmit end.

Specifically, if it is determined that the sound output device is the screen casting transmit end, an operation of step 104 is performed: otherwise, an operation of step 105 is performed.

Step 104: Set an audio status of the screen casting transmit end to the initial audio status.

For example, if a state value of the initial audio status recorded in the audio status table is "0", that is, the initial audio status is the mute state, after the audio status of the screen casting transmit end is set to the initial audio status, the screen casting transmit end is mute as the sound output device, that is, does not output a sound. In this case, a screen of the screen casting receive end and a screen of the screen casting transmit end display a same picture, but neither of the two devices outputs a sound.

For example, if a state value of the initial audio status recorded in the audio status table is "1", that is, the initial audio status is the non-mute state, after the audio status of the screen casting transmit end is set to the initial audio status, the screen casting transmit end outputs a sound as the sound output device. In this case, the screen of the screen casting receive end and the screen of the screen casting transmit end display a same picture, and the screen casting receive end does not output a sound.

Step 105: Set the screen casting transmit end to the mute state, and send audio data in the screen casting information to the screen casting receive end.

It should be noted that when the sound output device is the screen casting receive end, regardless of whether the initial audio status recorded in the audio status table is the mute state or the non-mute state, after the screen casting transmit end establishes a screen casting connection to the screen casting receive end, the screen casting transmit end cannot output a sound. Therefore, the screen casting application in the screen casting transmit end needs to invoke an interface for setting a sound of the screen casting transmit end, to set the screen casting transmit end to the mute state, and then send the audio data in the screen casting information to the screen casting receive end by using a transmission module. In this way, the screen casting receive end can play the audio data after receiving the audio data, that is, the screen casting receive end can output a sound.

Figure 8:
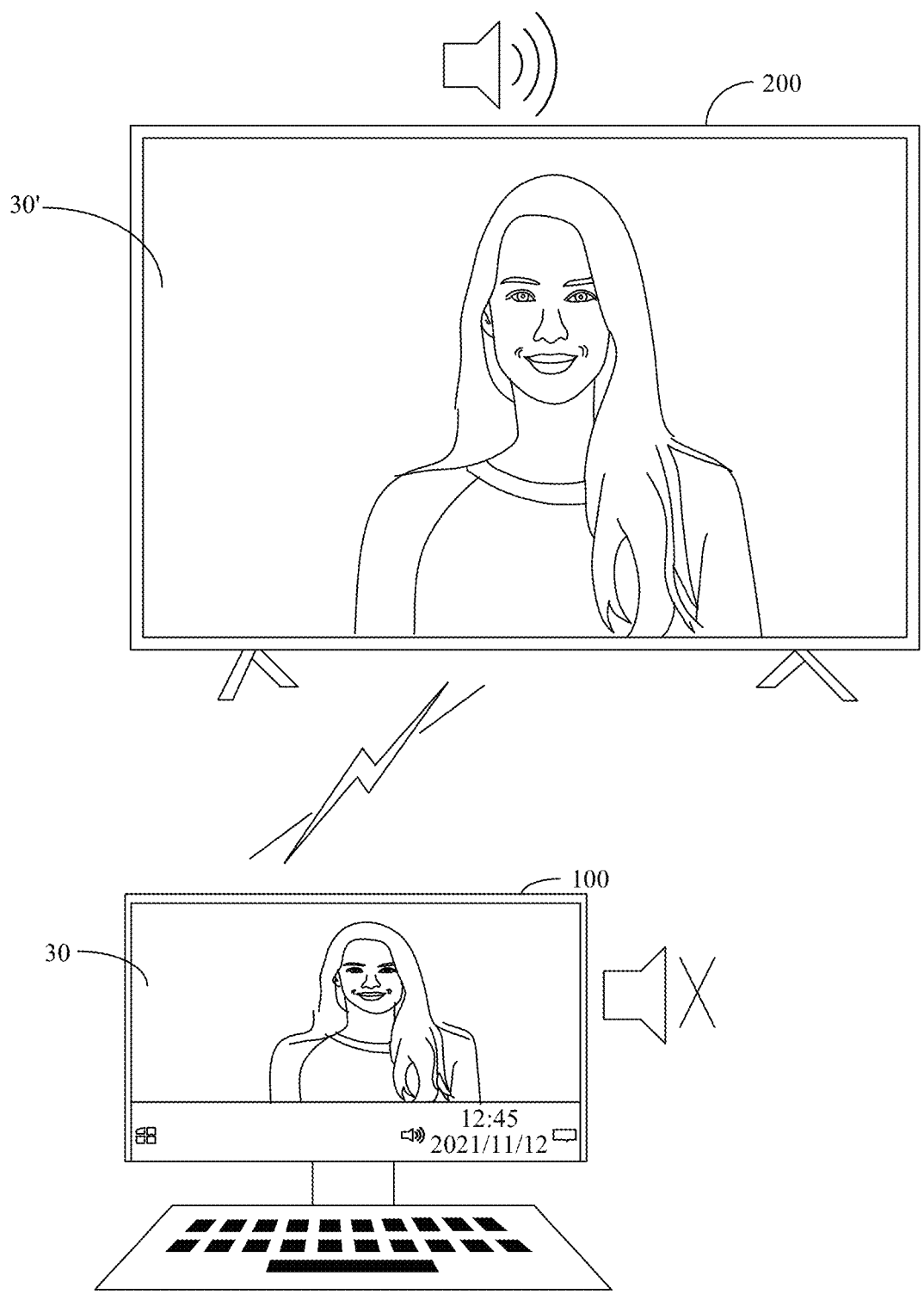
FIG. 8 is a schematic diagram illustrating an example of interfaces that are of a screen casting initiation end and a screen casting receive end and that are displayed after a screen casting connection succeeds.

Referring to FIG. 8, for example, after the PC device 100 (screen casting transmit end) establishes a screen casting connection to a television 200 (screen casting receive end), if the television 200 is the sound output device, in the mirrored mode, the screen of the PC device 100 displays a picture 30, and a screen of the television 200 displays content that is the same as the picture 30, for example, a picture 30' displayed on the television 200 in FIG. 8. In addition, the PC device 100 does not output a sound, and the television 200 outputs a sound.

In addition, it should be noted that when the sound output device is the screen casting receive end, the operation of setting the screen casting transmit end to the mute state is implemented by a system, and is not implemented by the user through modification. Therefore, the state is not recorded in the audio status table, and therefore does not interfere with an operation of the user.

In addition, it may be understood that, in actual application, the audio data sent by the transmission module to the television 200 is usually an audio data packet obtained after audio encoding processing. In this way, a loss of a data frame caused by directly transmitting the audio data can be avoided, and the audio data can also be prevented from directly exposing privacy of the user.

In addition, in actual application, when the screen casting connection between the PC device 100 and the television 200 is established by using the screen casting application, the PC device 100 and the television 200 follow different protocols. Therefore, an encoding manner may be determined based on a protocol type corresponding to the audio data, to encode the audio data in the determined encoding manner.

Specifically, when sending the audio data in the screen casting information to the screen casting receive end, such as the television 200 described above, the transmission module needs to first determine the protocol type corresponding to the audio data: then determine a target encoding manner of the audio data based on the protocol type: then encode the audio data in the target encoding manner to obtain an audio data packet: and finally send the audio data packet to the screen casting receive end.

Correspondingly, the protocol type is sent to the screen casting receive end when the audio data packet is sent to the screen casting receive end.

In this way, the screen casting receive end, such as the television 200, can know a decoding manner that needs to be used to decode the audio data packet, thereby ensuring accuracy of a decoding result.

In addition, it should be noted that, for the determining a target encoding manner of the audio data based on the protocol type, for example, the target encoding manner may be determined by using an encoding and decoding mapping relationship table determined by the screen casting transmit end and the screen casting receive end through pre-negotiation, that is, the encoding and decoding mapping relationship table is searched for an encoding manner corresponding to the protocol type, and then the found encoding method is determined as the target encoding manner.

In this way, the encoding manner may not be directly transmitted between the screen casting transmit end and the screen casting receive end, to prevent content transmitted between the screen casting transmit end and the screen casting receive end from being intercepted, thereby ensuring that content of the audio data is not stolen by an illegal element, in particular, effectively ensuring conference security in a use scenario of an audio conference or a video conference.

Therefore, a current audio status of the PC device 100 is first obtained before the screen casting connection is established, the current audio status is used as the initial audio status, and a state value corresponding to the initial audio status is recorded in the audio status table, so that an audio status in which the user expects, in a screen casting process, the PC device 100 to be can be known. In this way, when screen casting disconnection is subsequently performed or the PC device 100 is subsequently used as the sound output device, the audio status of the PC device 100 can be consistent with an expectation of the user.

In addition, it should be noted that, specifically, in an actual application scenario, after the PC device 100 establishes a screen casting connection to the large-screen device, that is, in the screen casting process, the user may manually modify the audio status of the PC device 100. Therefore, to ensure that the state value of the initial audio status recorded in the audio status table can be dynamically updated based on actual modification performed by the user, listening needs to be performed on an audio status switching control.

Specifically, in the embodiments, to detect, through listening, whether the user clicks the audio status switching control of the PC device 100, an audio status listening module provided by a system used by the PC device 100 is used.

Specifically, after performing step 101, the PC device 100 may invoke the audio status listening module, so that the audio status listening module listens for a click operation performed by the user on the audio status switching control of the PC device 100.

It should be noted that, when an audio status corresponding to the audio status switching control is the mute state, after the audio status switching control is clicked, the audio status is switched from the mute state to the non-mute state.

Correspondingly, when an audio status corresponding to the audio status switching control is the non-mute state, after the audio status switching control is clicked, the audio status is switched from the non-mute state to the mute state.

Therefore, the audio status listening module is used to listen for a click operation on the audio status switching control, and after the click operation performed by the user on the audio status switching control is detected through listening, it is only necessary to update, based on a switched audio status, the initial audio status recorded in the audio status table.

For example, when the state value corresponding to the initial audio status is "0" before screen casting connection, after the user clicks the audio status switching control after screen casting connection, the audio status of the PC device 100 is changed to the non-mute state. In this case, the audio status table is updated, for example, the recorded state value is changed from "0" to "1".

Figure 9:
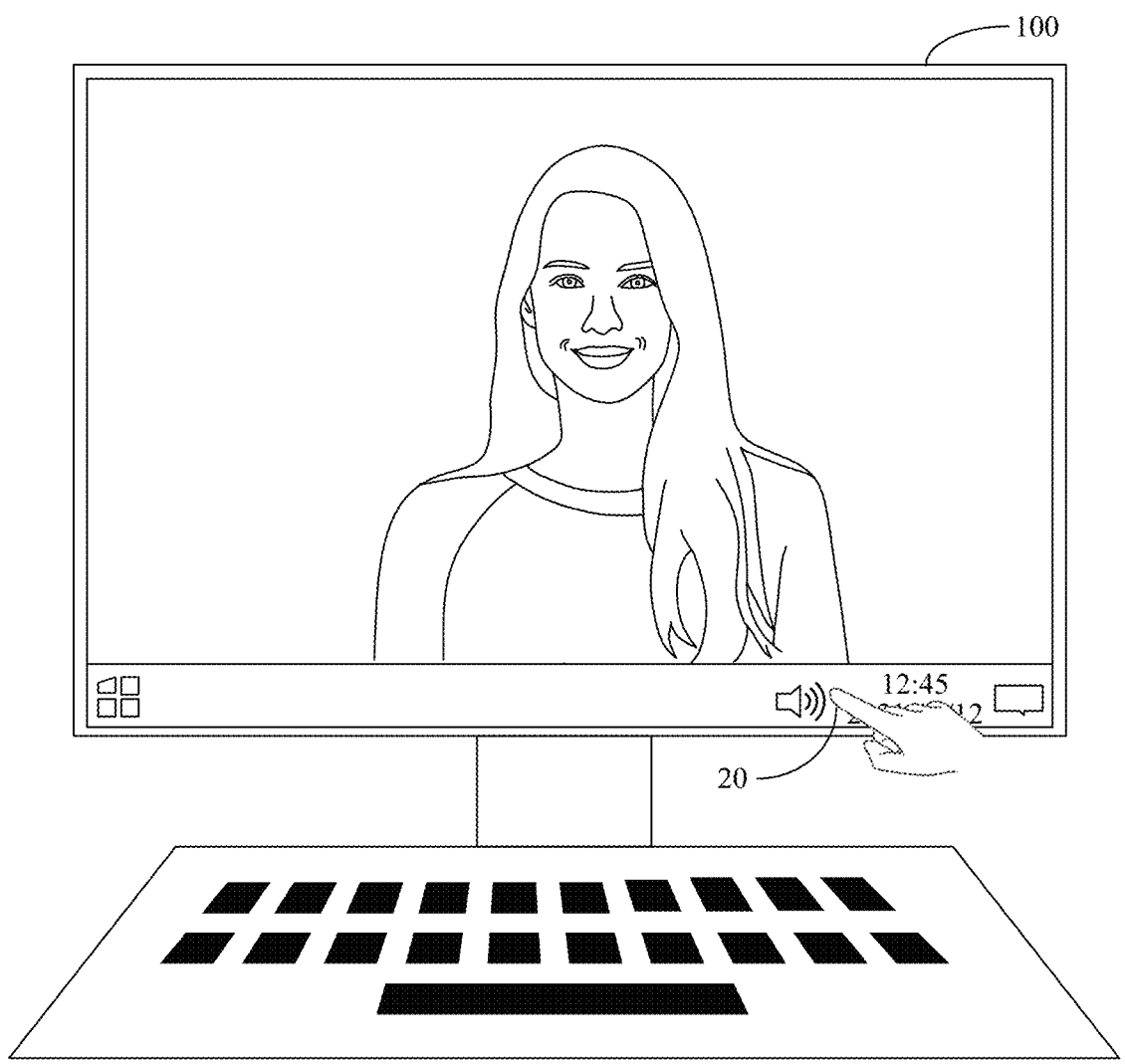
FIG. 9 is a schematic diagram 1 illustrating an example in which a user adjusts a screen casting transmit end to mute.

Referring to FIG. 9, for example, if the user wants to modify the audio status of the PC device 100 in the screen casting process, the user may first click the sound setting control 20.

Figure 10:
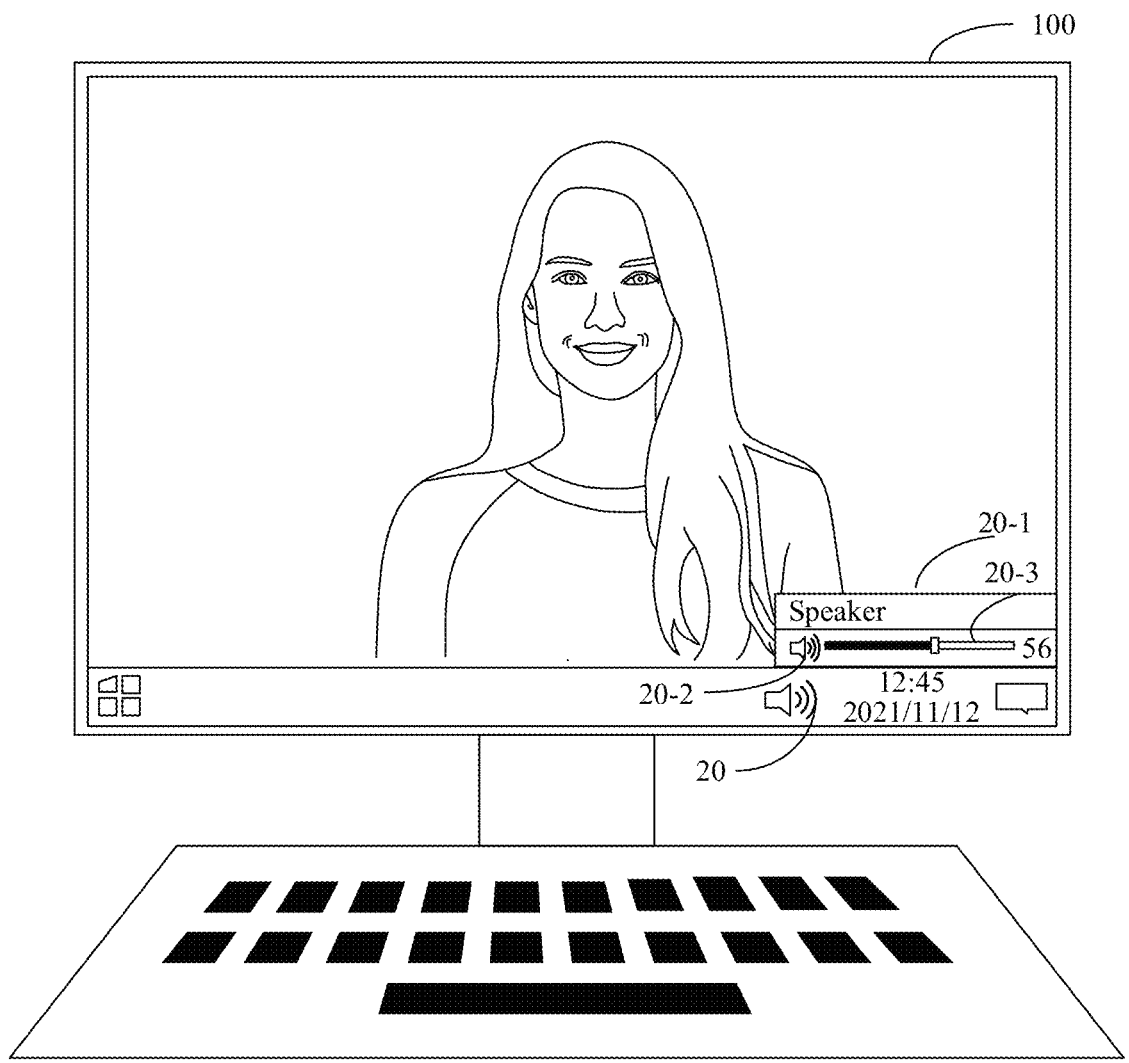
FIG. 10 is a schematic diagram 2 illustrating an example in which a user adjusts a screen casting transmit end to mute.

Correspondingly, after the user clicks the sound setting control 20, the PC device 100 displays a sound setting window 20-1 in response to the operation behavior of the user, as shown in FIG. 10.

Still referring to FIG. 10, for example, the sound setting window 20-1 may display all devices that currently can play audio data, such as a speaker in FIG. 10, and an audio status switching control 20-2 and a volume slider control 20-3 for volume adjustment that correspond to each device for playing audio data.

It should be noted that, only one device for playing audio data, namely, the speaker, is shown in FIG. 10. In actual application, if the PC device 100 is connected to a headset (wired/Bluetooth) or acoustic equipment, the sound setting window 20-1 further displays an audio status switching control 20-2 and a volume slider control 20-3 for volume adjustment that correspond to the headset (wired/Bluetooth) or the acoustic equipment.

Figure 11:
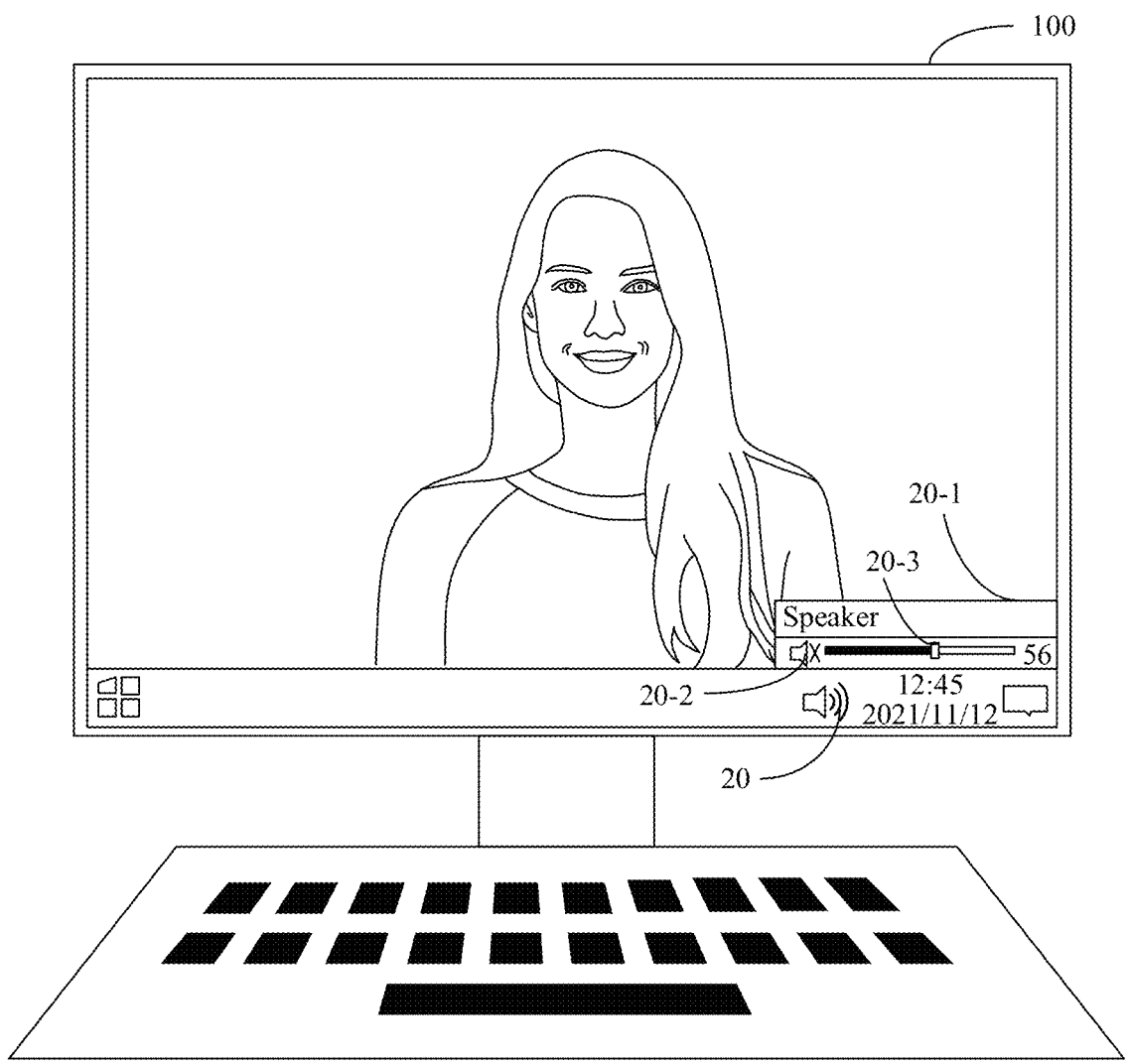
FIG. 11 is a schematic diagram 3 illustrating an example in which a user adjusts a screen casting transmit end to mute.

Still referring to FIG. 10, for example, if the user clicks the audio status switching control 20-2, the audio status listening module detects the click operation through listening, and the PC device changes an icon of the audio status switching control 20-2 from a pattern shown in FIG. 10 to an icon pattern of the audio status switching control 20-2 in FIG. 11 in response to the operation behavior of the user. That is, it indicates that the initial audio status is changed from the non-mute state to the mute state. In this case, the state value recorded in the audio status table is changed from "1" representing the non-mute state to "0" representing the mute state.

In this way, the initial audio status recorded in the audio status table can be changed based on an actual operation of the user, to ensure that when screen casting disconnection is performed or the sound output device is changed to the screen casting transmit end, an audio status set based on the initial audio status recorded in the audio status table is consistent with an audio status that the user actually wants to set.

Specifically, in actual application, for example, setting the audio status of the PC device 100 based on the initial audio status recorded in the audio status table may be as follows:

Scenario 1: After the user changes the sound output device from the large-screen device such as a television, namely, the screen casting receive end, to the PC device 100, namely, the screen casting transmit end, the initial audio status recorded in the audio status table is read, and specifically the state value corresponding to the initial audio status is read: and then, the audio status of the screen casting transmit end is set to the initial audio status.

Figure 12:
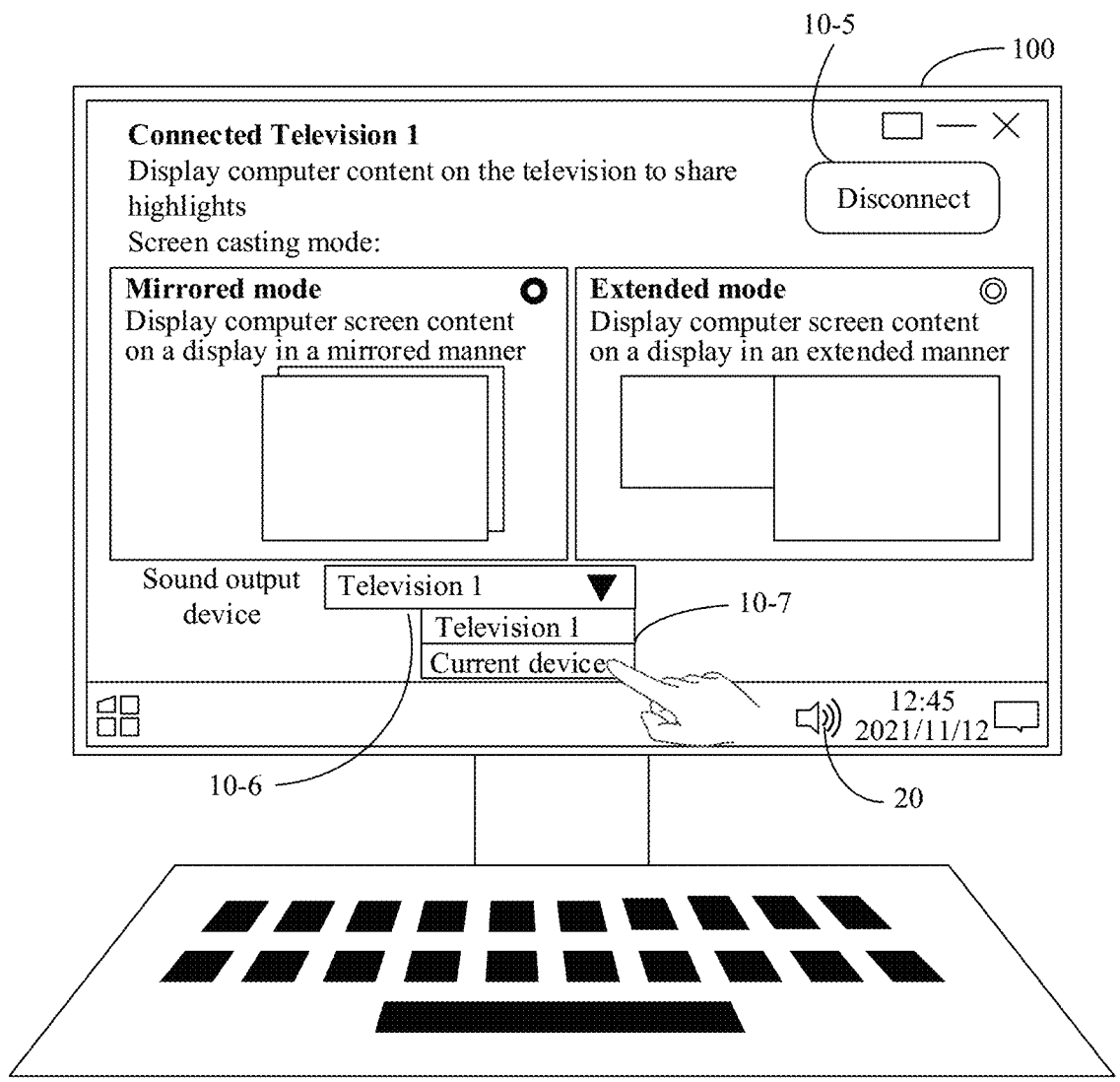
FIG. 12 is a schematic diagram illustrating an example of an interface displayed when a sound output device is switched to a current device.

Referring to FIG. 12, for example, after the user clicks the sound output device selection option 10-6, the PC device 100 displays a sound output device selection list 10-7 in response to the operation behavior of the user.

For example, in some examples, in a scenario in which the audio data is played by either the screen casting transmit end or the screen casting receive end, the sound output device selection list 10-7 may include a currently connected screen casting receive end such as the television 1 in FIG. 12 and the screen casting transmit end such as the current device in FIG. 12.

For example, in some other examples, in a scenario in which the audio data can be played by another third-party audio device such as acoustic equipment, the sound output device selection list 10-7 may further include an available third-party audio device in addition to the television 1 and the current device shown in FIG. 12.

Figure 13:
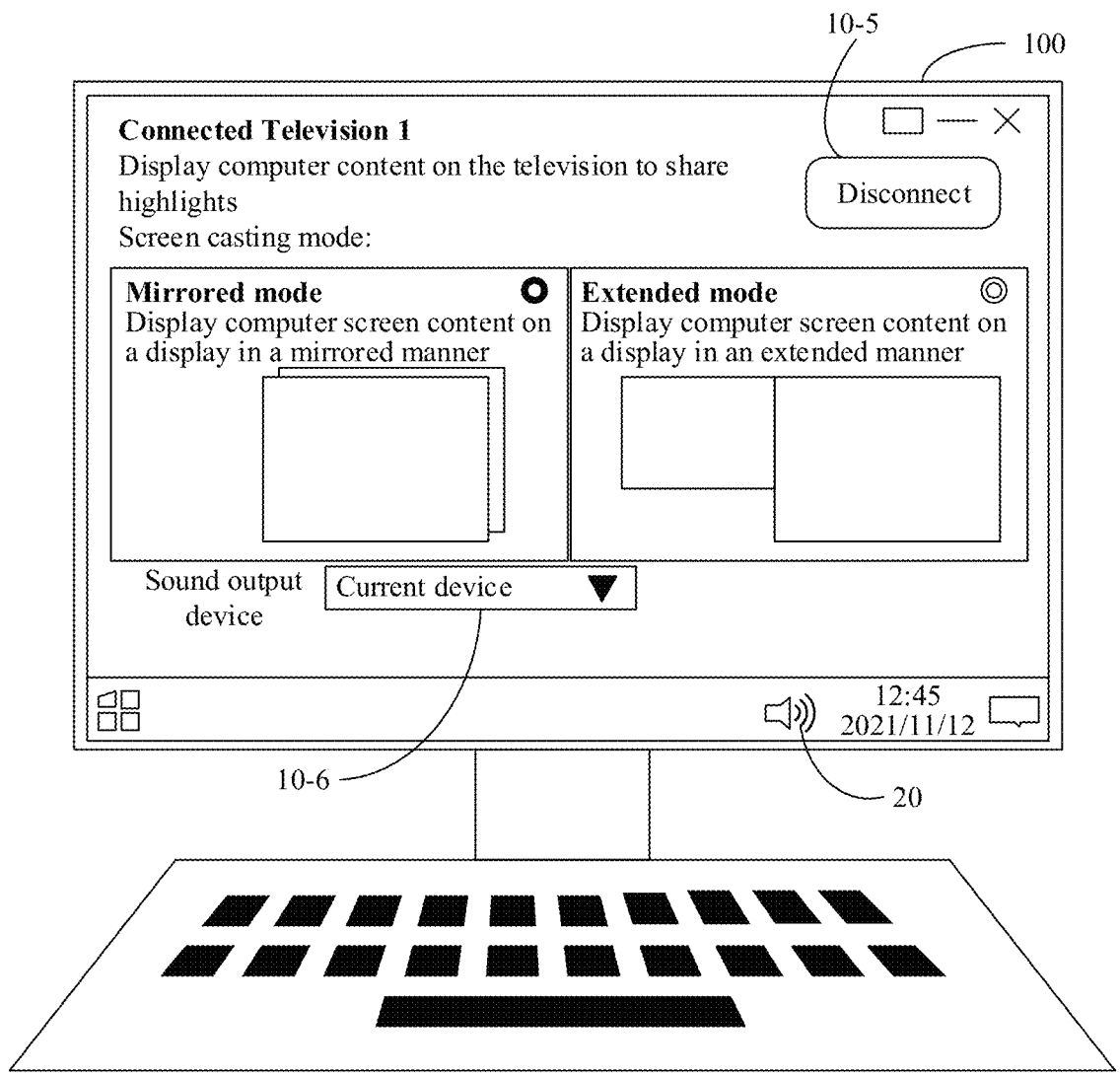
FIG. 13 is a schematic diagram illustrating an example of an interface displayed after a sound output device is switched to a current device.

Still referring to FIG. 12, if the user selects a "current device" option displayed in the sound output device selection list 10-7, the sound output device is switched from outputting a sound by the television 1 to outputting a sound by the PC device 100, and the PC device 100 changes content displayed in the sound output device option 10-6 from the television 1 in FIG. 12 to the current device in FIG. 13 in response to the operation behavior of the user.

For example, for a solution in which the screen casting method provided in the embodiments is not used, after the user switches the sound output device from the television 200 to the PC device 100, regardless of whether the user modifies the audio status of the PC device in the screen casting process, the PC device 100 outputs a sound and the television 200 does not output a sound in the screen casting process.

Figure 14:
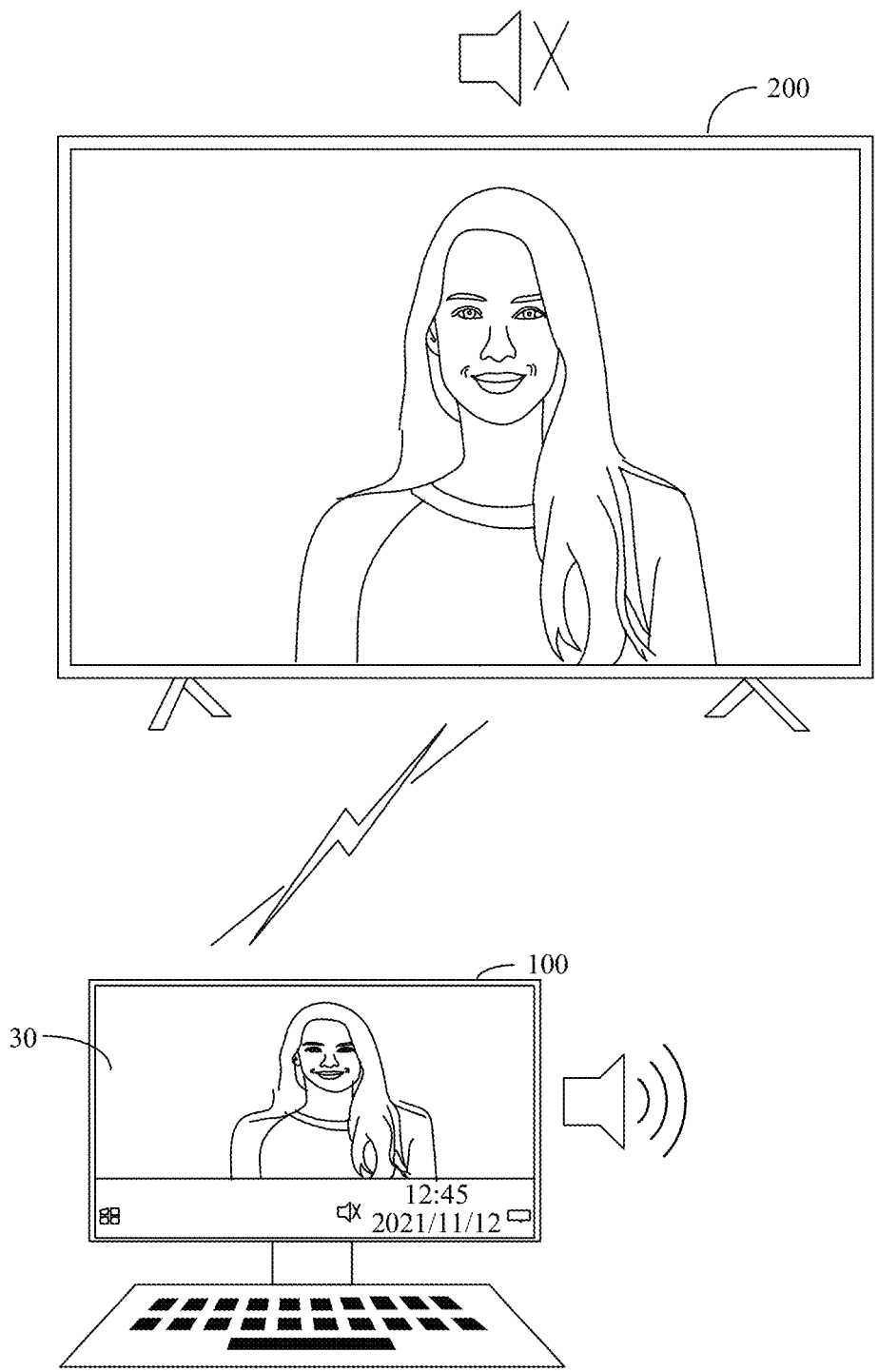
FIG. 14 is a schematic diagram 1 illustrating an example of sound changes that are of a screen casting transmit end and a screen casting receive end and that are made after a sound output device is switched to a current device.

For example, as shown in FIG. 14, the sound setting option 20 shows that a current audio status of the PC device 100 is the mute state. However, in a scenario in which the PC device 100 is the sound output device, the PC device 100 still outputs a sound. This causes inconsistency between the audio status of the PC device 100 and an expectation of the user.

Specifically, in the technical solutions provided in the embodiments, the initial audio status in the audio status table is updated in real time based on an operation of the user, and in the screen casting process, after the sound output device is switched from the television 200 to the PC device 100, the audio status of the PC device 100 is set based on the initial audio status recorded in the audio status table. In this way, after the sound output device is switched from the television 200 to the PC device 100, the audio status of the PC device 100 can be consistent with a status set by the user, thereby resolving a problem of audio status inconsistency.

Figure 15:
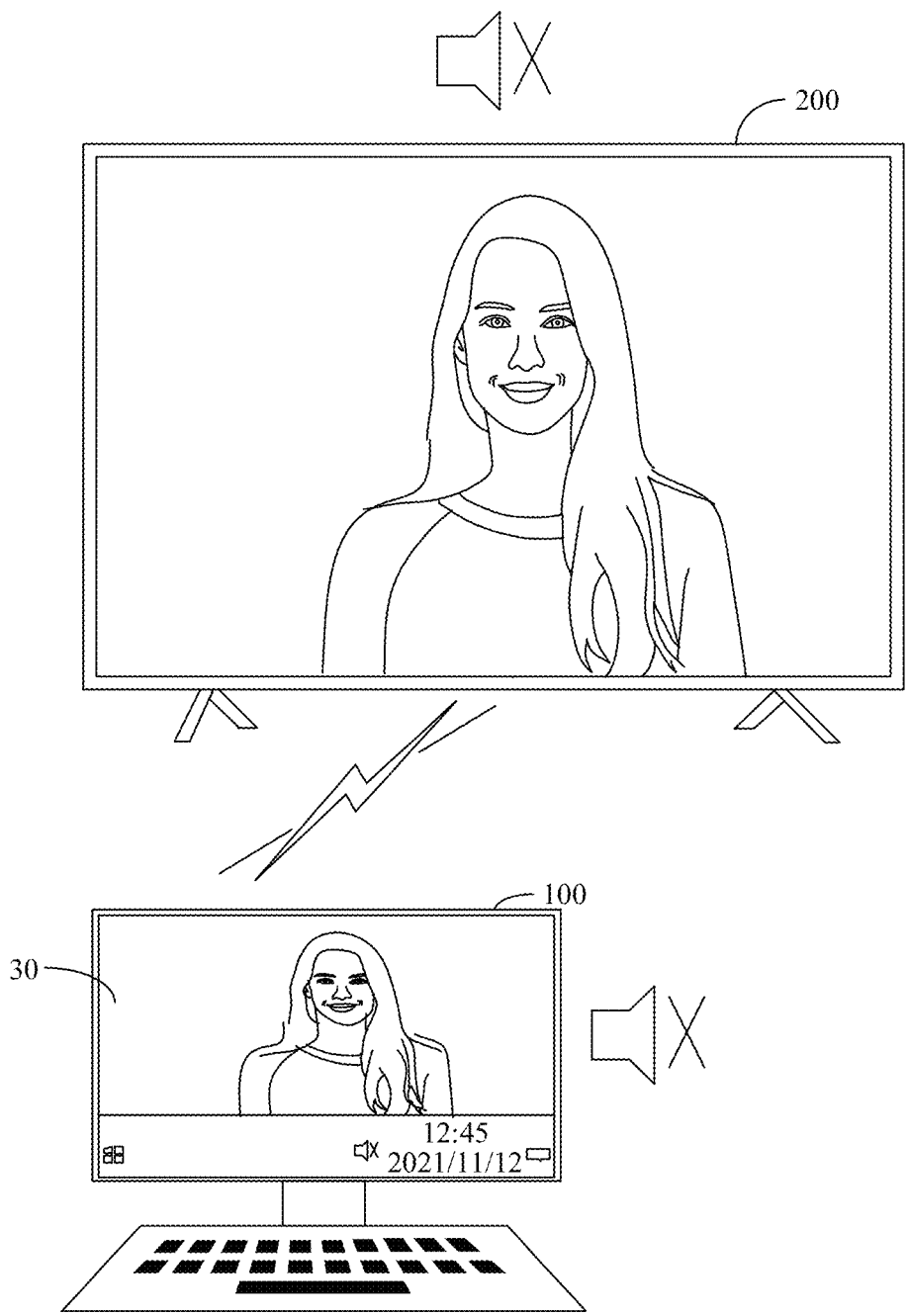
FIG. 15 is a schematic diagram 2 illustrating an example of sound changes that are of a screen casting transmit end and a screen casting receive end and that are made after a sound output device is switched to a current device.

For example, as shown in FIG. 15, the sound setting option 20 shows that a current audio status of the PC device 100 is the mute state. In the technical solutions provided in the embodiments, in a scenario in which the PC device 100 is the sound output device, as the sound output device, the PC device 100 currently does not output a sound and is in the mute state, that is, in this scenario, both the PC device 100 and the television 200 display only pictures and do not output sounds.

Scenario 2: After receiving a screen casting disconnection request, the screen casting management module notifies the audio management module to read the initial audio status recorded in the audio status table and then set the audio status of the screen casting transmit end to the initial audio status.

Still referring to FIG. 13, for example, after the user clicks the disconnect option 10-5, the PC device 100 breaks the screen casting connection to the television 200 in response to the operation behavior of the user.

It may be understood that, after screen casting disconnection, the screen casting information provided by the PC device 100 is no longer sent to the television 200 by using the transmission module. Therefore, the screen of the television 200 no longer displays content displayed on the screen of the PC device 100. In addition, the television 200 does not play the audio data in the screen casting information provided by the PC device 100.

For example, for a solution in which the screen casting method provided in the embodiments is not used, after the user clicks the disconnect option 10-5, regardless of whether the user modifies the audio status of the PC device in the screen casting process, after screen casting disconnection, the system directly sets the PC device 100 to output a sound, and sets the television 200 not to output a sound.

Figure 16:
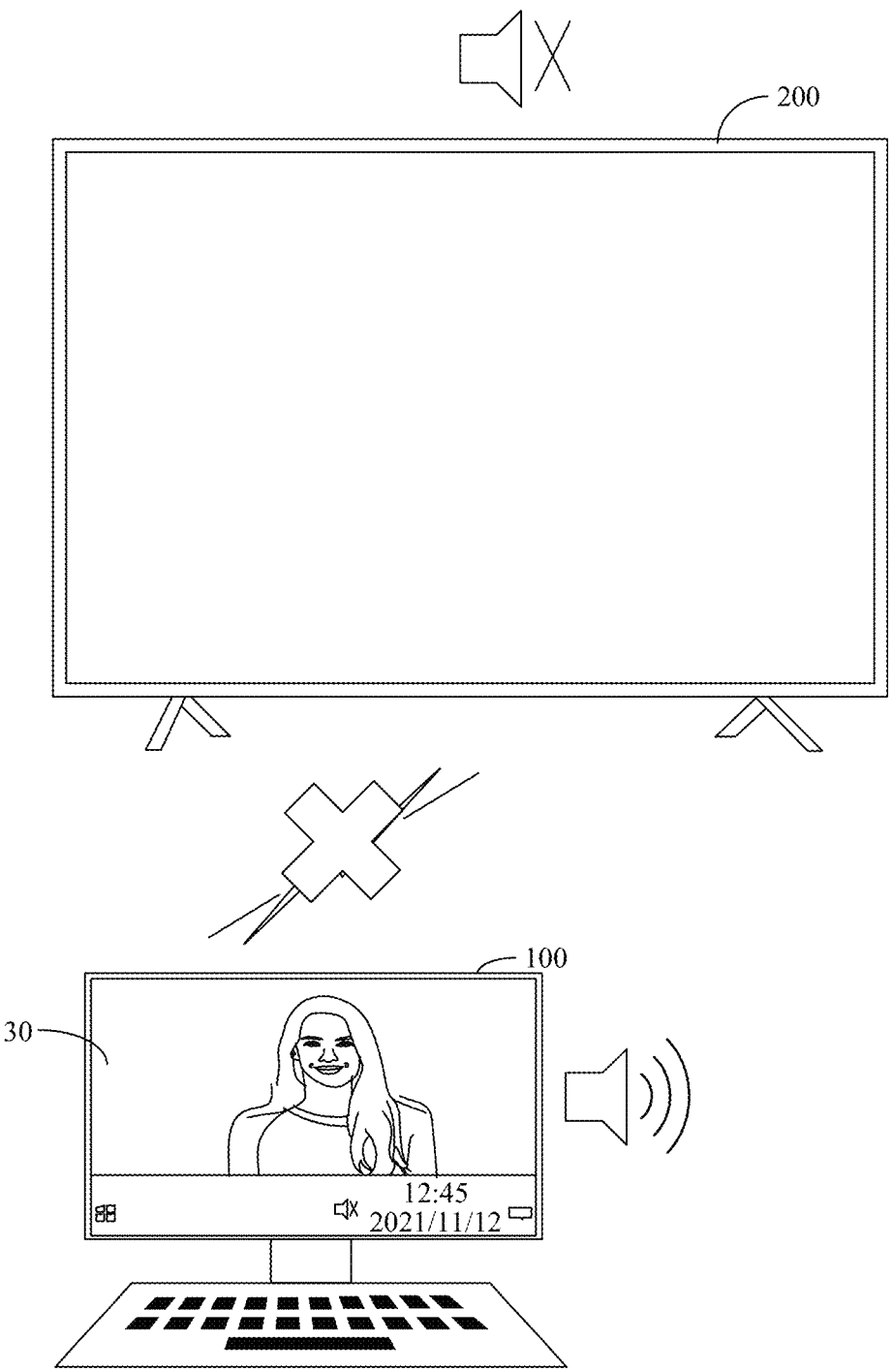
FIG. 16 is a schematic diagram 1 illustrating an example of sound changes that are of a screen casting transmit end and a screen casting receive end and that are made after screen casting disconnection.

For example, as shown in FIG. 16, the sound setting option 20 shows that a current audio status of the PC device 100 is the mute state, after screen casting disconnection from the television 200 is performed, because the system does not know that the user modifies the audio status of the current device in the screen casting process, the PC device 100 still outputs a sound. This causes inconsistency between the audio status of the PC device 100 and an expectation of the user.

Specifically, in the technical solutions provided in the embodiments, the initial audio status in the audio status table is updated in real time based on an operation of the user, and after screen casting disconnection, the audio status of the PC device 100 is set based on the initial audio status recorded in the audio status table. In this way, after screen casting disconnection, the audio status of the PC device 100 can be consistent with a status set by the user, thereby resolving a problem of audio status inconsistency.

Figure 17:
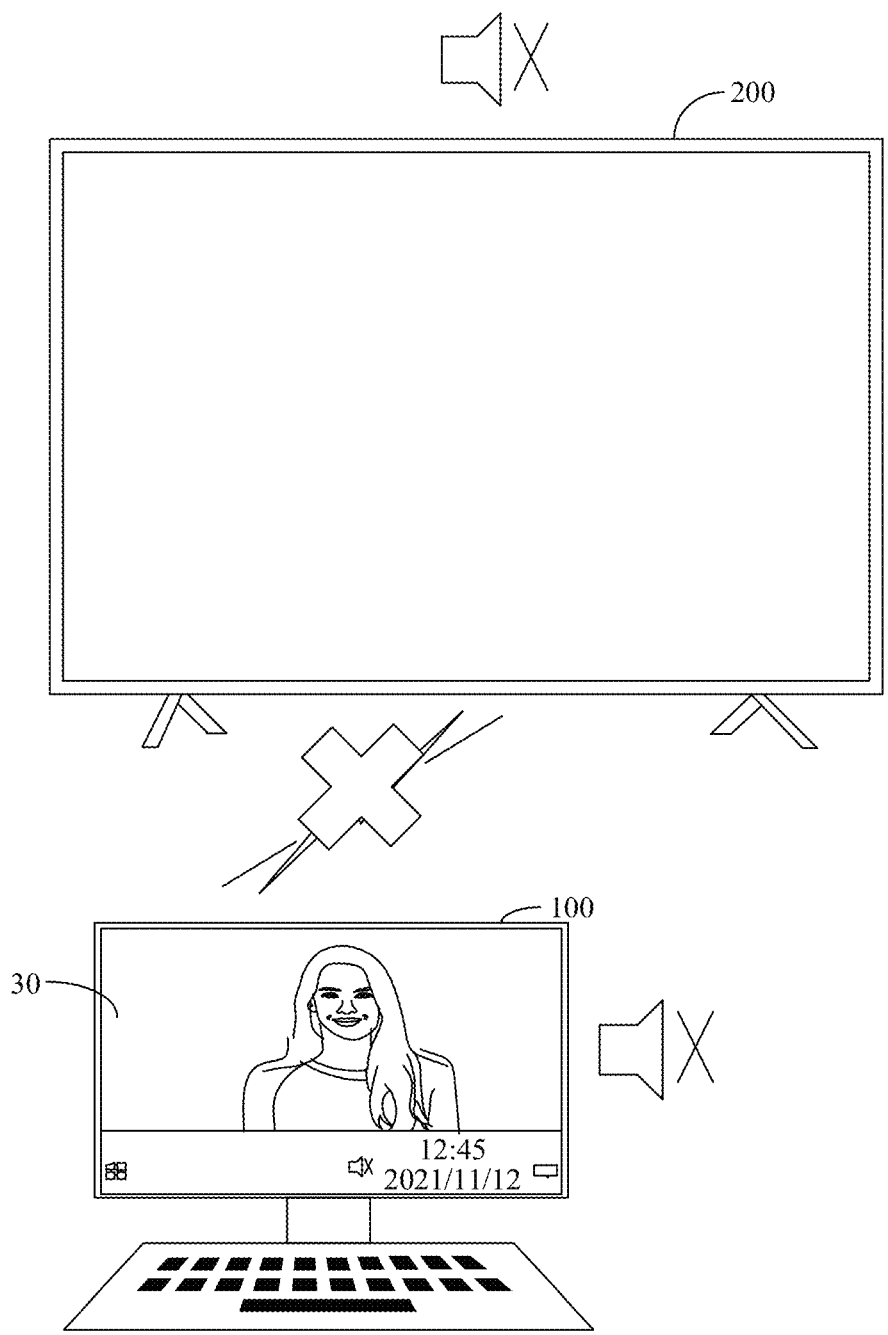
FIG. 17 is a schematic diagram 2 illustrating an example of sound changes that are of a screen casting transmit end and a screen casting receive end and that are made after screen casting disconnection.

For example, as shown in FIG. 17, the sound setting option 20 shows that a current audio status of the PC device 100 is the mute state. In the technical solutions provided in the embodiments, after the PC device 100 breaks the screen casting connection to the television 200, the audio status of the PC device 100 is set to the initial audio status, namely, the mute state, recorded in the audio status table. In this scenario, the PC device 100 displays only a picture and does not output a sound, and the television 200 neither displays the picture displayed on the screen of the PC device 100 nor outputs a sound.

In addition, it should be noted that in the screen casting process, the audio status listening module always listens for the click operation performed by the user on the audio status switching control. Therefore, after screen casting ends, that is, after screen casting disconnection, the audio status listening module needs to be disabled, that is, stops further listening for a change of the audio status, to avoid occupation and waste of a resource of the PC device 100.

Therefore, in the screen casting solution provided in this application, in a screen casting scenario, an audio status in which the screen casting transmit end is before a screen casting connection is established is obtained, and the obtained audio status is recorded in the audio status table as the initial audio status of the screen casting transmit end. In this way, when it is determined that the sound output device selected by the user is the screen casting transmit end, the audio status of the screen casting transmit end is directly set to the initial audio status recorded in the audio status table. Therefore, in the screen casting scenario, when a sound is switched back to the screen casting transmit end, the audio status of the screen casting transmit end can be consistent with an audio status expected by the user, thereby greatly improving user experience.

In addition, it should be noted that in actual application, if the user clicks the volume slider control 20-3 for volume adjustment, the PC device changes a magnitude of a volume of the output audio data in response to the operation behavior of the user. In this way, when the sound output device is the large-screen device, because the audio data received from the PC device is obtained through encoding based on an adjusted volume, the audio data played by the large-screen device is synchronized with a volume obtained after adjustment is performed by using the volume slider control 20-3. For example, when the user adjusts the volume up by using the volume slider control 20-3, a volume of the audio data played by the large-screen device is also adjusted up: or when the user adjusts the volume down by using the volume slider control 20-3, a volume of the audio data played by the large-screen device is also adjusted down.

In addition, specifically, in actual application, the technical solutions provided in the embodiments may be implemented by using two implementations.

Manner 1: The audio status of the screen casting transmit end is set by the audio management module in the screen casting process.

Figure 18:
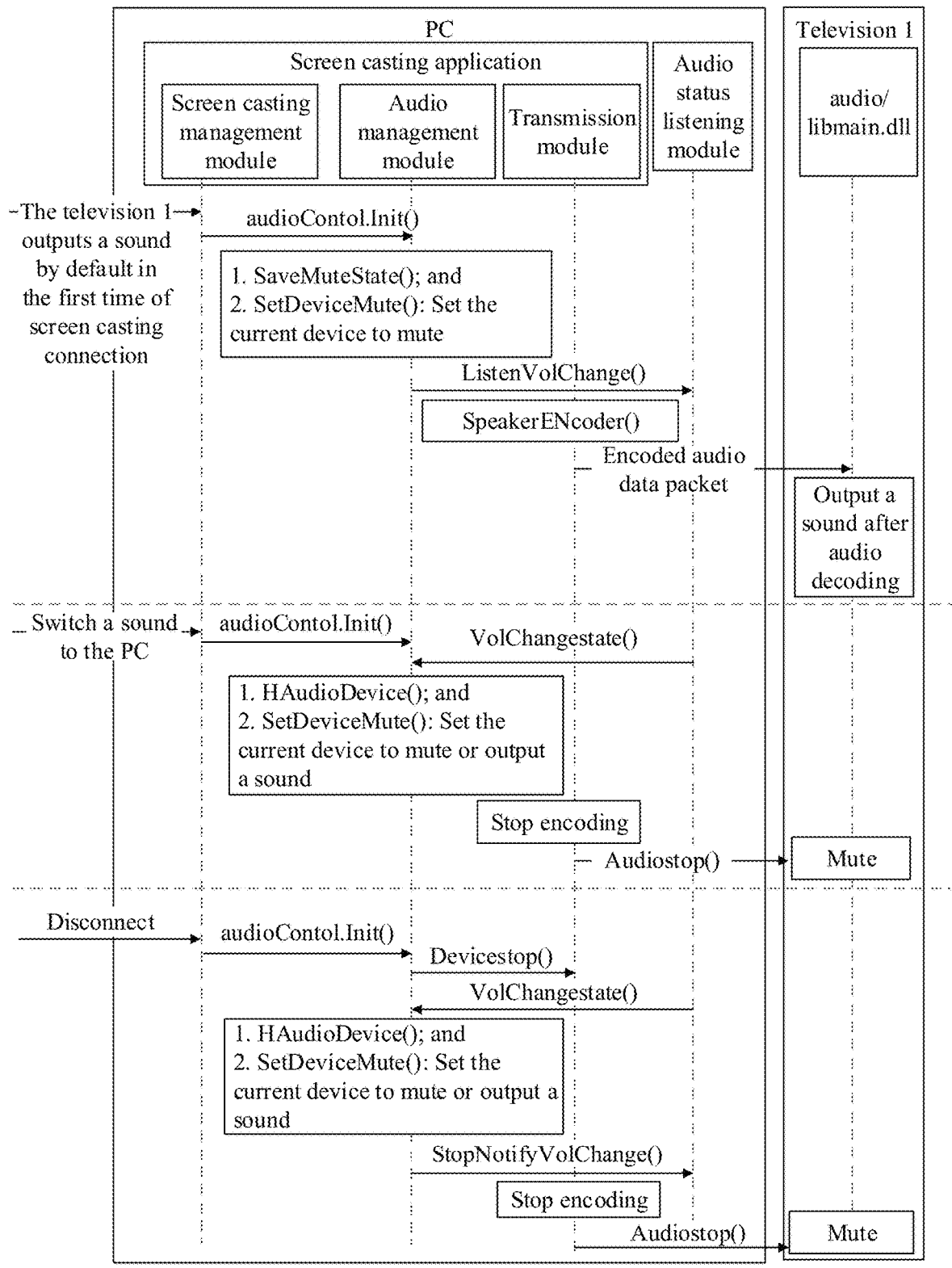
FIG. 18 is a schematic diagram illustrating an example of a method invoked when an upper-layer audio management module sets an audio status of a screen casting transmit end.

Referring to FIG. 18, for example, to better understand the technical solutions provided in the embodiments, the following scenario is described: A PC is first mute before screen casting, and then plays audio to perform screen casting (in the first time of screen casting connection, a large-screen device such as a television 1 in FIG. 18 outputs a sound). Then, a sound is switched to the current device, that is, is switched to the PC, and then switched back to the television 1. Finally, the screen casting connection is broken.

Still referring to FIG. 18, for example, when the user performs clicking for screen casting, an upper-layer screen casting management module (which may be referred to as, for example, MultiCastMgr) notifies an audio management module (which may be referred to as, for example, AudioControl) by using an audioContol.Init( ) method. Then, the audio management module learns, by using SaveMuteState ( ), that a current audio status is a mute state, and saves, as an initial value, a state value "0" corresponding to the mute state: and invokes SetDeviceMute( ) to set the current device to mute, and then enables ListenVolChange( ) to listen for an audio status of the PC.

It should be noted that in actual application, the operation in which the audio module invokes SetDeviceMute( ) to set the current device to mute and the operation in which the audio module invokes ListenVolChange( ) to start listening for the audio status of the PC are executed without a sequence limitation.

Still referring to FIG. 18, for example, in a process of performing the foregoing operations, an upper layer of a product notifies a corresponding protocol layer, namely, a transmission module, that a sound output device is the large-screen device (the television 1). In this case, after receiving the notification from the upper layer, the transmission module encodes the audio of the PC by using SpeakerENcoder( ), packages encoded audio, and sends packaged audio to the television 1, so that the television 1 outputs a sound after decoding the audio.

Still referring to FIG. 18, for example, when a sound is switched to the current device, the upper-layer screen casting management module notifies the audio management module by using the audioContol.Init( ) method, and the upper layer of the product notifies the transmission module not to encode the audio, package encoded audio, or send packaged audio to the television 1, that is, to stop encoding, and invoke Audiostop( ). In this way, the television 1 receives no audio data packet, and cannot obtain audio data through decoding for playing. Therefore, the television 1 is mute.

In addition, the audio management module queries a current audio status of the PC by using an HAudioDevice ( ) method.

Correspondingly, when the audio status is the mute state, the current device is set to mute by using SetDeviceMute( ); or when the audio status is a non-mute state, the current device is set, by using SetDeviceMute( ), to output a sound.

Then, when outputting a sound by the current device is switched back to outputting a sound by the large-screen device, an implementation procedure is similar to the procedure performed when the large-screen device outputs a sound by default in the first time of screen casting connection, but ListenVolChange( ) does not need to be invoked again.

Still referring to FIG. 18, for example, when the screen casting connection is broken, the audio management module notifies, by using Devicestop( ), the transmission module to break the screen casting connection to the television 1, and disables, by using StopNotifyDeviceChange( ), an audio status listening module that listens for an audio status of the PC.

In addition, the audio management module queries a current audio status of the PC by using the HAudioDevice ( ) method.

Correspondingly, when the audio status is the mute state, the current device is set to mute by using SetDeviceMute( ); or when the audio status is the non-mute state, the current device is set, by using SetDeviceMute( ), to output a sound.

In addition, the audio management module further notifies the transmission module not to encode the audio, package encoded audio, or send packaged audio to the television 1, that is, to stop encoding, and invoke Audiostop( ). In this way, the television 1 receives no audio data packet, and cannot obtain audio data through decoding for playing. Therefore, the television 1 is mute.

Figure 19:
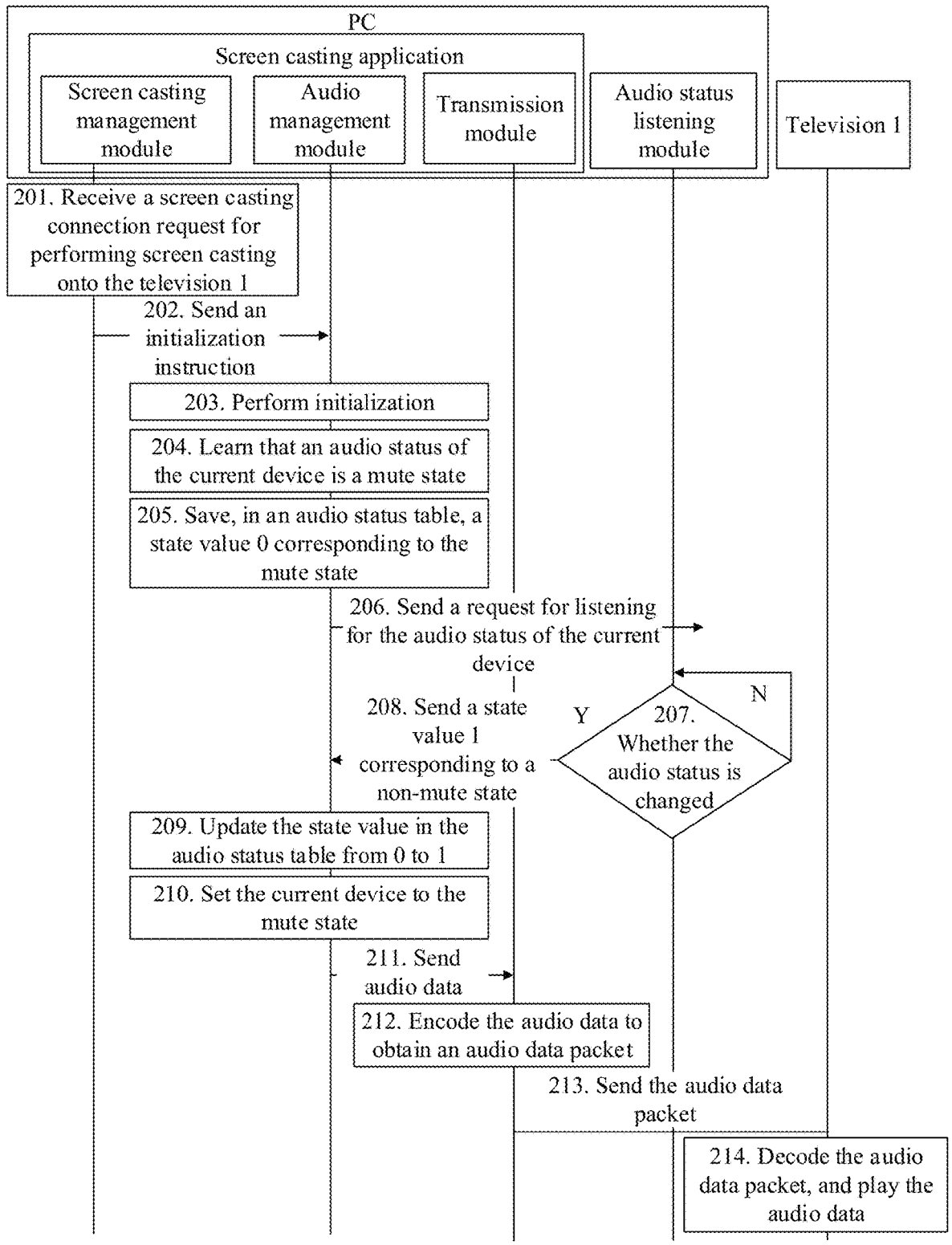
FIG. 19 is a schematic diagram 1 illustrating an example in which an upper-layer audio management module sets an audio status of a screen casting transmit end.
Figure 20:
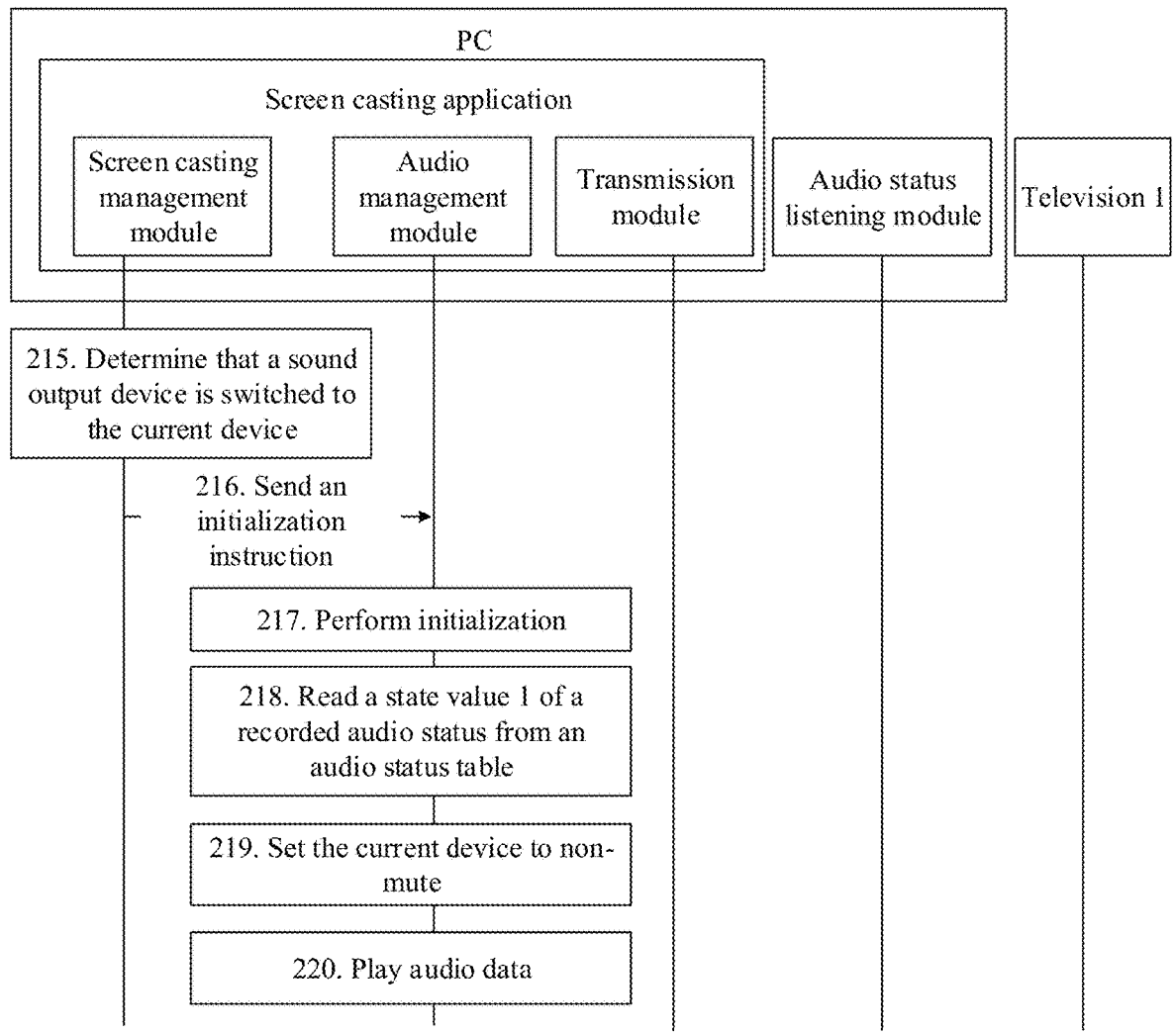
FIG. 20 is a schematic diagram 2 illustrating an example in which an upper-layer audio management module sets an audio status of a screen casting transmit end.
Figure 21:
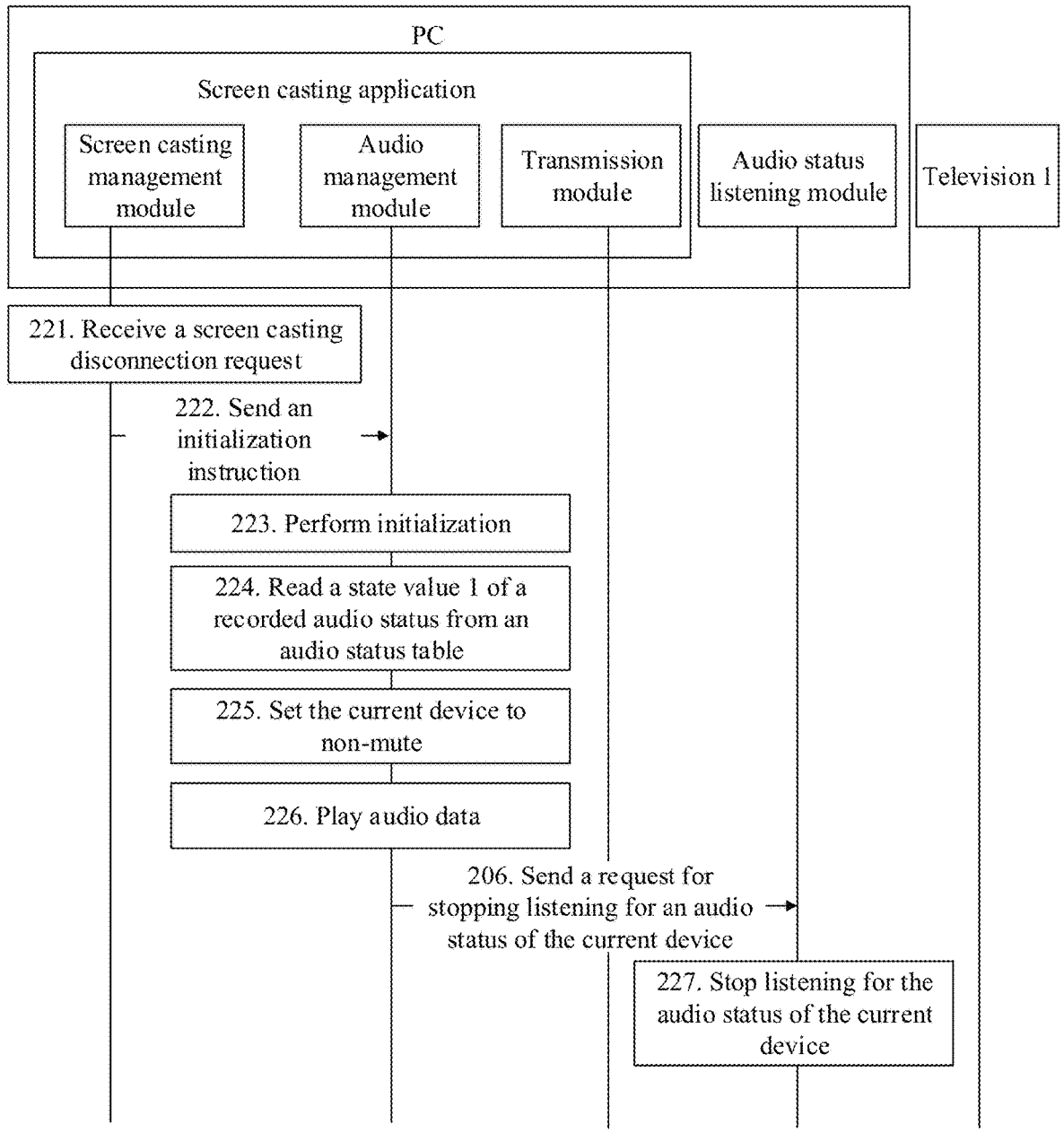
FIG. 21 is a schematic diagram 3 illustrating an example in which an upper-layer audio management module sets an audio status of a screen casting transmit end.

To better understand the screen casting processing implemented based on the technical solutions provided in the embodiments in the three scenarios shown in FIG. 18, the following provides detailed descriptions with reference to FIG. 19 to FIG. 21.

Referring to FIG. 19, for example, the screen casting transmit end is referred to as a PC, and the screen casting receive end is referred to as a television 1.

A screen casting application is installed on the PC, and the screen casting application includes a screen casting management module, an audio management module, and a transmission module.

In addition, a system used by the PC provides an audio status listening module.

It is assumed that when the PC establishes a screen casting connection to the television 1 for the first time, a sound output device is the television 1 by default, that is, the television 1 outputs a sound.

Still referring to FIG. 19, for example, when the user clicks the "connect now" option 10-1 in FIG. 3 or FIG. 4, the screen casting management module receives a screen casting connection request for performing screen casting onto the television 1, that is, performs step 201.

Then, the screen casting management module performs step 202 of sending an initialization instruction to the audio management module.

Correspondingly, after receiving the initialization instruction sent by the screen casting management module, the audio management module performs step 203 of performing an initialization operation, for example, implements initialization by invoking an audioContol.Init( ) interface.

Then, after initialization, the audio management module obtains an audio status of the current device.

Specifically, in actual application, the operation in which the audio management module obtains the audio status of the current device may be implemented by using a precompiled program interface.

For example, in the embodiments, the program interface is referred to as SaveMuteState( ).

By invoking SaveMuteState( ), the audio management module can learn whether a current audio status of the PC is a mute state or a non-mute state.

Correspondingly, if the audio management module learns, by using step 204, that the audio status of the current device is the mute state, the audio management module immediately performs step 205, and specifically, saves, in an audio status table, a state value such as "0" corresponding to the mute state obtained in step 204.

Then, the audio management module sends a request for listening for the audio status of the current device to the audio status listening module, that is, performs step 206.

Specifically, in the embodiments, the operation of invoking the audio status listening module to start listening for the audio status of the PC may be performed by invoking, for example, a pre-compiled ListenVolChange( ) interface.

For example, after the audio status listening module is enabled, in an entire screen casting process, that is, before screen casting disconnection, an operation of step 207 is always performed: detecting, through listening, whether the audio status is changed.

Correspondingly, if it is detected, through listening, that the audio status is changed, step 208 is performed; otherwise, step 207 continues to be performed.

For example, in a scenario shown in FIG. 19, an initial audio status of the PC is the mute state. Therefore, when the audio status listening module detects, through listening, that the audio status is changed, it indicates that the user clicks an audio status switching control, so that the audio status of the PC is changed to the non-mute state. Therefore, step 208 is specifically sending, to the audio management module, a state value such as "1" corresponding to the non-mute state.

Then, the audio management module updates, based on the received state value "1" corresponding to the non-mute state, a state value of the initial audio status recorded in the audio status table, and specifically, updates the state value in the audio status table from 0 to 1, that is, performs step 209.

In addition, the audio management module further notifies the transmission module that the sound output device is the television 1, and sets an audio device such as a speaker of the current device to mute by using an audio status setting interface that is referred to as, for example, SetDeviceMute ( ), that is, performs step 210 of setting the current device to the mute state.

It should be noted that, in actual application, the operation of step 210 may be performed in synchronization with step 204 after the audio management module performs step 203. This is not limited in the embodiments.

Then, after completing the operation of step 210, the audio management module sends audio data in screen casting information to the transmission module, that is, performs step 211.

Correspondingly, after receiving the audio data, the transmission module encodes the audio data in the manner described in step 105, to obtain an audio data packet, that is, performs step 212.

Then, the transmission module sends the obtained audio data packet to the television 1 by using an established screen casting link, that is, performs step 213.

Correspondingly, after receiving the audio data packet sent by the transmission module, the television 1 performs step 214 of performing a decoding operation on the audio data packet to recover the audio data and playing the audio data, so that the television 1 outputs a sound.

Therefore, the following process is implemented: The PC is first mute, then plays the audio, and then performs screen casting, so that the television 1 outputs a sound. In the screen casting process, the audio management module updates, based on modification performed by the user on the audio status of the PC, the state value corresponding to the initial audio status recorded in the audio status table. In this way, no impact is caused on use of a screen casting function by the user, and modification performed by the user on the audio status of the PC in the screen casting process can be obtained through listening in real time.

Further, after the screen casting information of the PC is sent to the television 1, and the television 1 starts to play a picture in the screen casting information and plays the audio data, if the user switches the sound output device from the television 1 to the PC, for a process of setting the audio status of the PC, references can be made to FIG. 20.

For example, if the screen casting management module detects, through listening, an operation in which the user switches the sound output device, and determines that the sound output device is switched to the current device, that is, after an operation of step 215, the screen casting management module sends an initialization instruction to the audio management module again, that is, performs step 216.

Correspondingly, after receiving the initialization instruction sent by the screen casting management module, the audio management module performs step 217 of performing an initialization operation, for example, implements initialization by invoking the audioContol.Init( ) interface.

Then, after initialization, the audio management module reads the state value of the recorded audio status from the audio status table.

For example, if the state value of the audio status recorded in the audio status table is "1", that is, the user modifies the audio status of the PC into the non-mute state before screen casting or in the screen casting process, after initialization, the audio management module reads the state value "1" of the recorded audio status from the audio status table, that is, performs content of step 218.

Then, the audio management module sets the current device to the non-mute state based on the read state value "1", that is, performs an operation of step 219, and then performs an operation of step 220: playing the audio data.

For example, if the state value of the audio status recorded in the audio status table is "0", that is, the user modifies the audio status of the PC into the mute state before screen casting or in the screen casting process, after initialization, the audio management module reads the state value "0" of the recorded audio status from the audio status table.

Correspondingly, after reading the state value "0" from the audio status table, the audio management module sets the current device to the mute state based on the read state value "0", and then plays the audio data.

It may be understood that the audio status of the PC is set to the mute state. Therefore, even if the audio data is played by the PC, because the audio status of the PC is the mute state, the PC does not output a sound in a process of playing the audio data.

In addition, it should be noted that, although operations performed by the audio status listening module are not shown in FIG. 20, after being enabled, the audio status listening module is always in a working state in the entire screen casting process, that is, in a process of performing step 215 to step 220, provided that the user modifies the audio status, the operations of step 207 to step 209 in FIG. 19 are performed.

In addition, because a screen casting scenario shown in FIG. 20 is that the user switches the sound output device from the television 1 to the PC, the transmission module no longer sends the audio data packet to the television 1, and the television 1 receives no audio data packet, and does not output a sound.

In addition, it may be understood that, because the technical solutions provided in the embodiments are specific to the audio data in the screen casting scenario, sending of video data is not shown in the figure.

Therefore, the following process is implemented: In the screen casting process, the sound output device is switched from the television 1 to the PC, and then the audio management module sets the audio status of the PC based on the state value recorded in the audio status table. In this way, after the sound output device is modified into the PC, the audio status of the PC can be consistent with an audio status set by the user.

Further, after the operations in FIG. 20 are completed, the PC starts to play the audio data, and the television 1 continues to play the picture/video data in the screen casting information, if the user clicks the disconnect option 10-5 in FIG. 7, for a process of setting the audio status of the PC, references can be made to FIG. 21.

For example, if the screen casting management module receives a screen casting disconnection request, that is, performs an operation of step 221, the screen casting management module sends an initialization instruction to the audio management module again, that is, performs step 222.

Correspondingly, after receiving the initialization instruction sent by the screen casting management module, the audio management module performs step 223 of performing an initialization operation, for example, implements initialization by invoking the audioContol.Init( ) interface.

Then, after initialization, the audio management module reads the state value of the recorded audio status from the audio status table.

For example, if the state value of the audio status recorded in the audio status table is "1", that is, the user modifies the audio status of the PC into the non-mute state before screen casting or in the screen casting process, after initialization, the audio management module reads the state value "1" of the recorded audio status from the audio status table, that is, performs content of step 224.

Then, the audio management module sets the current device to the non-mute state based on the read state value "1", that is, performs an operation of step 225, and then performs an operation of step 226: playing the audio data.

For example, if the state value of the audio status recorded in the audio status table is "0", that is, the user modifies the audio status of the PC into the mute state before screen casting or in the screen casting process, after initialization, the audio management module reads the state value "0" of the recorded audio status from the audio status table.

Correspondingly, after reading the state value "0" from the audio status table, the audio management module sets the current device to the mute state based on the read state value "0", and then plays the audio data.

It may be understood that the audio status of the PC is set to the mute state. Therefore, even if the audio data is played by the PC, because the audio status of the PC is the mute state, the PC does not output a sound in a process of playing the audio data.

In addition, after screen casting disconnection, the audio management module further sends, to the audio status listening module, a request for stopping listening for the audio status of the current device, that is, performs step 227.

Correspondingly, after receiving the request that is sent by the audio management module and that is for stopping listening for the audio status of the current device, the audio status listening module performs an operation of step 228: stopping listening for the audio status of the current device.

For example, the audio status listening module may invoke, for example, a pre-encapsulated StopNotifyVolChange( ) interface to stop listening for the audio status of the current device.

Therefore, in the screen casting solution provided in this application, the audio status of the screen casting transmit end is set by the audio management module in the screen casting process, so that it is only necessary for the audio management module to perform setting in a unified manner regardless of a protocol used by the screen casting application, thereby greatly reducing a development workload and maintenance difficulty.

Manner 2: The audio status of the screen casting transmit end is set by the transmission module in the screen casting process.

Figure 22:
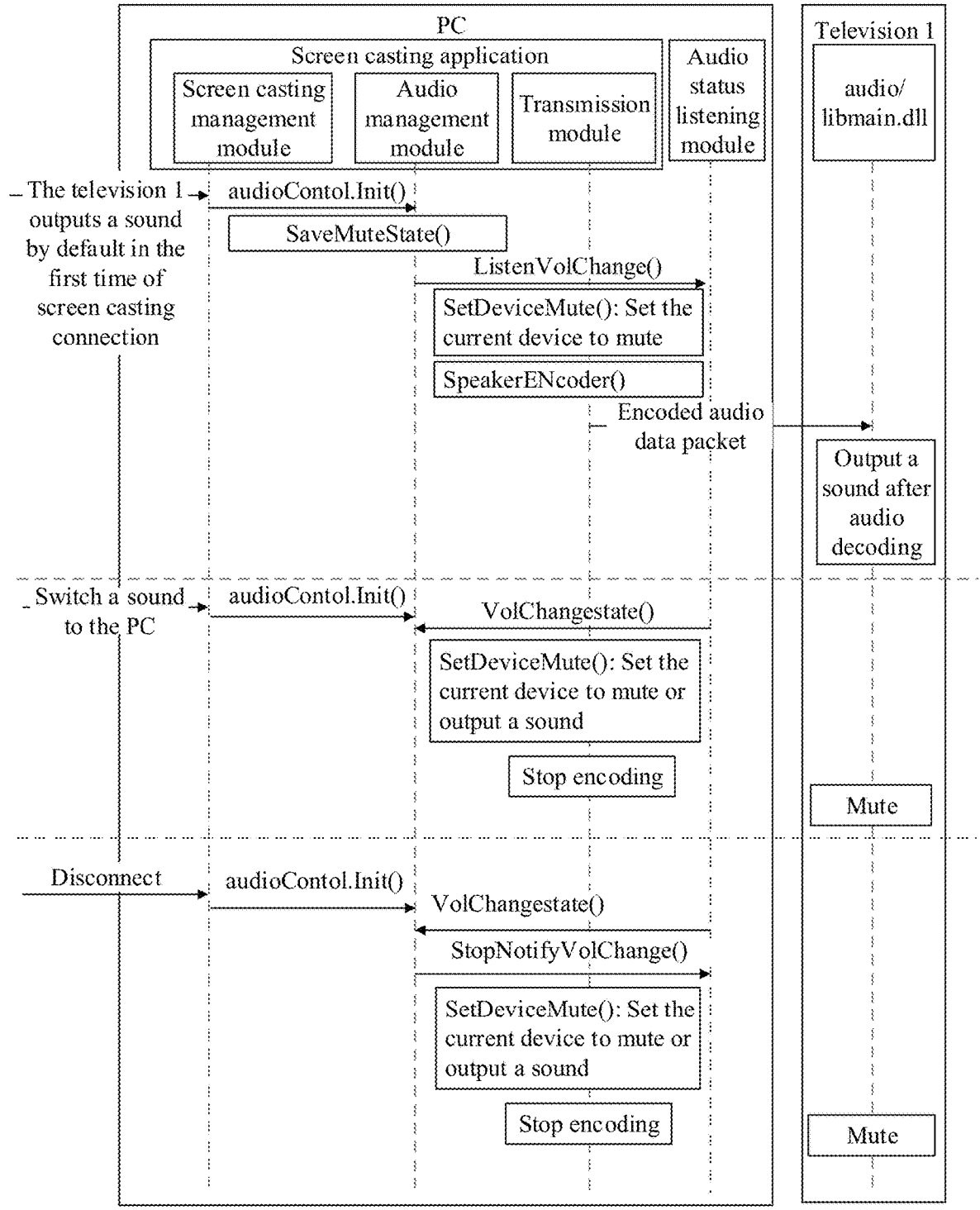
FIG. 22 is a schematic diagram illustrating an example of a method invoked when a lower-layer transmission module sets an audio status of a screen casting transmit end.

Referring to FIG. 22, for example, to better understand the technical solutions provided in the embodiments, the following scenario is described: A PC is first mute before screen casting, and then plays audio to perform screen casting (in the first time of screen casting connection, a large-screen device, such as a television 1 in FIG. 22, outputs a sound). Then, a sound is switched to the current device, that is, is switched to the PC, and then switched back to the television 1. Finally, the screen casting connection is broken.

Still referring to FIG. 22, for example, when the user performs clicking for screen casting, an upper-layer screen casting management module (which may be referred to as, for example, MultiCastMgr) notifies an audio management module (which may be referred to as, for example, AudioControl) by using an audioContol.Init( ) method. Then, the audio management module learns, by using SaveMuteState( ), that a current audio status is a mute state, and saves, as an initial value, a state value "0" corresponding to the mute state: and then enables ListenVolChange( ) to listen for an audio status of the PC.

It should be noted that in actual application, the operation in which the audio module invokes SetDeviceMute( ) to set the current device to mute and the operation in which the audio module invokes ListenVolChange( ) to start listening for the audio status of the PC are executed without a sequence limitation.

Still referring to FIG. 22, for example, in a process of performing the foregoing operations, an upper layer of a product notifies a corresponding protocol layer, namely, a transmission module, that a sound output device is the large-screen device (the television 1). In this case, after receiving the notification from the upper layer, the transmission module encodes the audio of the PC by using SpeakerENcoder( ), packages encoded audio, and sends packaged audio to the television 1, so that the television 1 outputs a sound after decoding the audio; and invokes SetDeviceMute( ) to set the current device to mute.

Still referring to FIG. 22, for example, when a sound is switched to the current device, the upper-layer screen casting management module notifies the audio management module by using the audioContol.Init( ) method, and the upper layer of the product notifies the transmission module not to encode the audio, package encoded audio, or send packaged audio to the television 1, that is, to stop encoding, and invoke Audiostop( ). In this way, the television 1 receives no audio data packet, and cannot obtain audio data through decoding for playing. Therefore, the television 1 is mute.

In addition, the audio management module queries a current audio status of the PC by using an HAudioDevice ( ) method.

Correspondingly, when the audio status is the mute state, the transmission module is notified to set the current device to mute by using SetDeviceMute( ); or when the audio status is the non-mute state, the transmission module is notified to set, by using SetDeviceMute( ), the current device to output a sound.

Then, when outputting a sound by the current device is switched back to outputting a sound by the large-screen device, an implementation procedure is similar to the procedure performed when the large-screen device outputs a sound by default in the first time of screen casting connection, but ListenVolChange( ) does not need to be invoked again.

Still referring to FIG. 22, for example, when the screen casting connection is broken, the audio management module notifies, by using Devicestop( ), the transmission module to break the screen casting connection to the television 1, and disables, by using StopNotifyDeviceChange( ), an audio status listening module that listens for an audio status of the PC.

In addition, the audio management module queries a current audio status of the PC by using the HAudioDevice ( ) method.

Correspondingly, when the audio status is the mute state, the transmission module is notified to set the current device to mute by using SetDeviceMute( ); or when the audio status is the non-mute state, the transmission module is notified to set, by using SetDeviceMute( ), the current device to output a sound.

In addition, the audio management module further notifies the transmission module not to encode the audio, package encoded audio, or send packaged audio to the television 1, that is, to stop encoding, and invoke Audiostop( ). In this way, the television 1 receives no audio data packet, and cannot obtain audio data through decoding for playing. Therefore, the television 1 is mute.

To better understand the screen casting processing implemented based on the technical solutions provided in the embodiments in the three scenarios shown in FIG. 22, the following provides detailed descriptions with reference to FIG. 23A and FIG. 23B to FIG. 25.

Figure 23A:
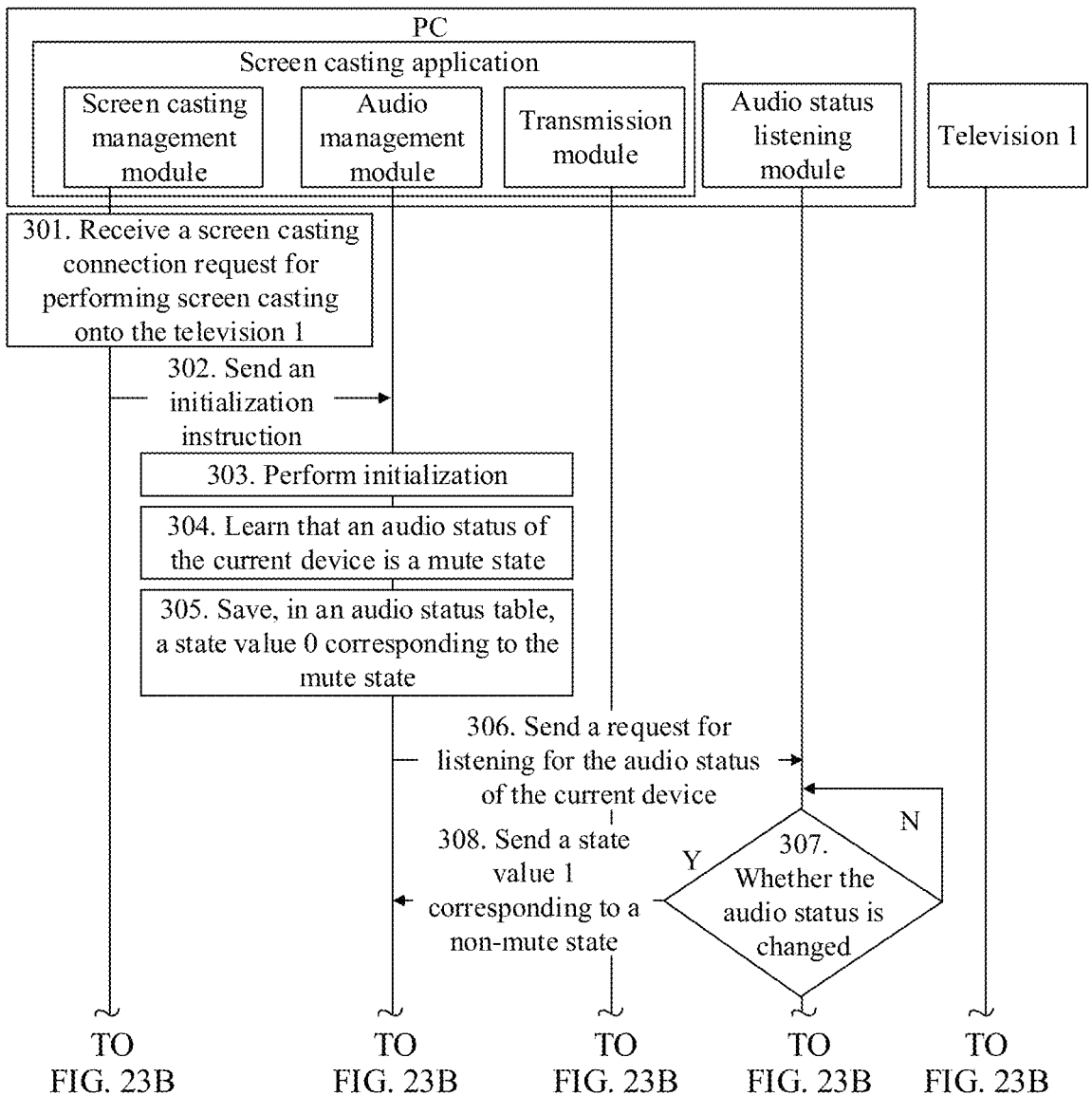
FIG. 23A and FIG. 23B are a schematic diagram 1 illustrating an example in which a lower-layer transmission module sets an audio status of a screen casting transmit end.
Figure 23B:
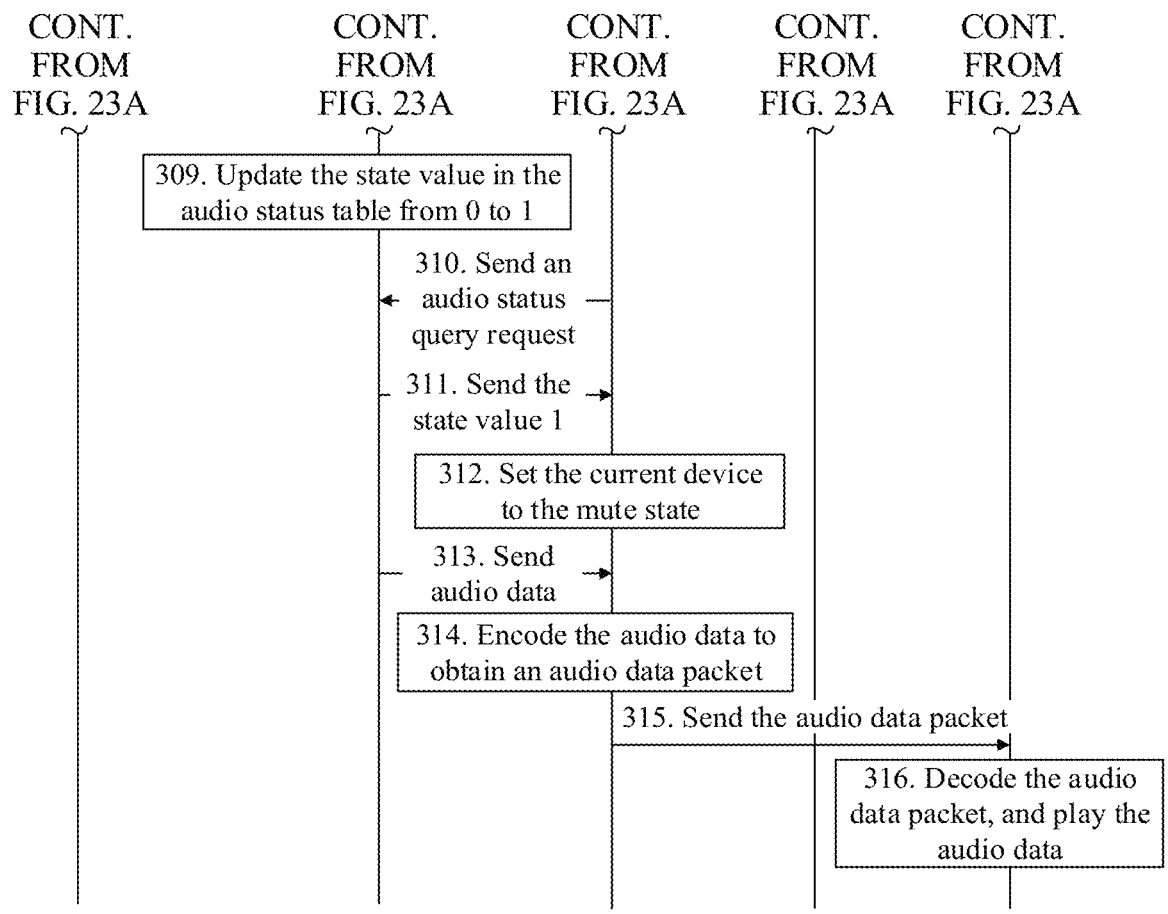

Referring to FIG. 23A and FIG. 23B, for example, the screen casting transmit end is referred to as a PC, and the screen casting receive end is referred to as a television 1.

A screen casting application is installed on the PC, and the screen casting application includes a screen casting management module, an audio management module, and a transmission module.

In addition, a system used by the PC provides an audio status listening module.

It is assumed that when the PC establishes a screen casting connection to the television 1 for the first time, a sound output device is the television 1 by default, that is, the television 1 outputs a sound.

Still referring to FIG. 23A and FIG. 23B, for example, when the user clicks the "connect now" option 10-1 in FIG. 3 or FIG. 4, the screen casting management module receives a screen casting connection request for performing screen casting onto the television 1, that is, performs step 301.

Then, the screen casting management module performs step 302 of sending an initialization instruction to the audio management module.

Correspondingly, after receiving the initialization instruction sent by the screen casting management module, the audio management module performs step 303 of performing an initialization operation, for example, implements initialization by invoking an audioContol.Init( ) interface.

Then, after initialization, the audio management module obtains an audio status of the current device.

Specifically, in actual application, the operation in which the audio management module obtains the audio status of the current device may be implemented by using a precompiled program interface.

For example, in the embodiments, the program interface is referred to as SaveMuteState( ).

By invoking SaveMuteState( ), the audio management module can learn whether a current audio status of the PC is a mute state or a non-mute state.

Correspondingly, if the audio management module learns, by using step 304, that the audio status of the current device is the mute state, the audio management module immediately performs step 305, and specifically, saves, in an audio status table, a state value such as "0" corresponding to the mute state obtained in step 304.

Then, the audio management module sends a request for listening for the audio status of the current device to the audio status listening module, that is, performs step 306.

Specifically, in the embodiments, the operation of invoking the audio status listening module to start listening for the audio status of the PC may be performed by invoking, for example, a pre-compiled ListenVolChange( ) interface.

For example, after the audio status listening module is enabled, in an entire screen casting process, that is, before screen casting disconnection, an operation of step 307 is always performed: detecting, through listening, whether the audio status is changed.

Correspondingly, if it is detected, through listening, that the audio status is changed, step 308 is performed: otherwise, step 307 continues to be performed.

For example, in a scenario shown in FIG. 23A and FIG. 23B, an initial audio status of the PC is the mute state. Therefore, when the audio status listening module detects, through listening, that the audio status is changed, it indicates that the user clicks an audio status switching control, so that the audio status of the PC is changed to the non-mute state. Therefore, step 308 is specifically sending, to the audio management module, a state value such as "1" corresponding to the non-mute state.

Then, the audio management module updates, based on the received state value "1" corresponding to the non-mute state, a state value of the initial audio status recorded in the audio status table, and specifically, updates the state value in the audio status table from 0 to 1, that is, performs step 309.

Because the operation of setting the audio status of the current device in the embodiments is implemented by the transmission module, the transmission module sets an audio device such as a speaker of the current device to mute by using an audio status setting interface that is referred to as, for example, SetDeviceMute( ), that is, performs step 310 of setting the current device to the mute state.

It may be understood that when the sound output device is the television 1, in the screen casting process, regardless of whether the audio status of the PC is the mute state or the non-mute state, the audio device such as the speaker of the PC does not output a sound. Therefore, in this scenario, the transmission module directly invokes the audio status setting interface to set the audio device such as the speaker of the PC to mute.

It should be noted that, in actual application, the operation of step 310 may be performed in synchronization with step 304 after the audio management module performs step 303. This is not limited in the embodiments.

Then, after the operation of step 310 is completed, the audio management module sends audio data in screen casting information to the transmission module, that is, performs step 311.

Correspondingly, after receiving the audio data, the transmission module encodes the audio data in the manner described in step 105, to obtain an audio data packet, that is, performs step 312.

Then, the transmission module sends the obtained audio data packet to the television 1 by using an established screen casting link, that is, performs step 313.

For example, based on functions implemented by the transmission module, in actual application, the transmission module may include an audio service module, an audio encoding module, and a packaging and sending module.

Correspondingly, the audio service module is configured to perform the operation of step 310, the audio encoding module is configured to perform the operation of step 312, and the packaging and sending module is configured to perform the operation of step 313.

Correspondingly, after receiving the audio data packet sent by the transmission module, the television 1 performs step 314 of performing a decoding operation on the audio data packet to recover the audio data and playing the audio data, so that the television 1 outputs a sound.

Therefore, the following process is implemented: The PC is first mute, then plays the audio, and then performs screen casting, so that the television 1 outputs a sound. In the screen casting process, the transmission module updates, based on modification performed by the user on the audio status of the PC, the state value corresponding to the initial audio status recorded in the audio status table. In this way, no impact is caused on use of a screen casting function by the user, and modification performed by the user on the audio status of the PC in the screen casting process can be obtained through listening in real time.

Figure 24:
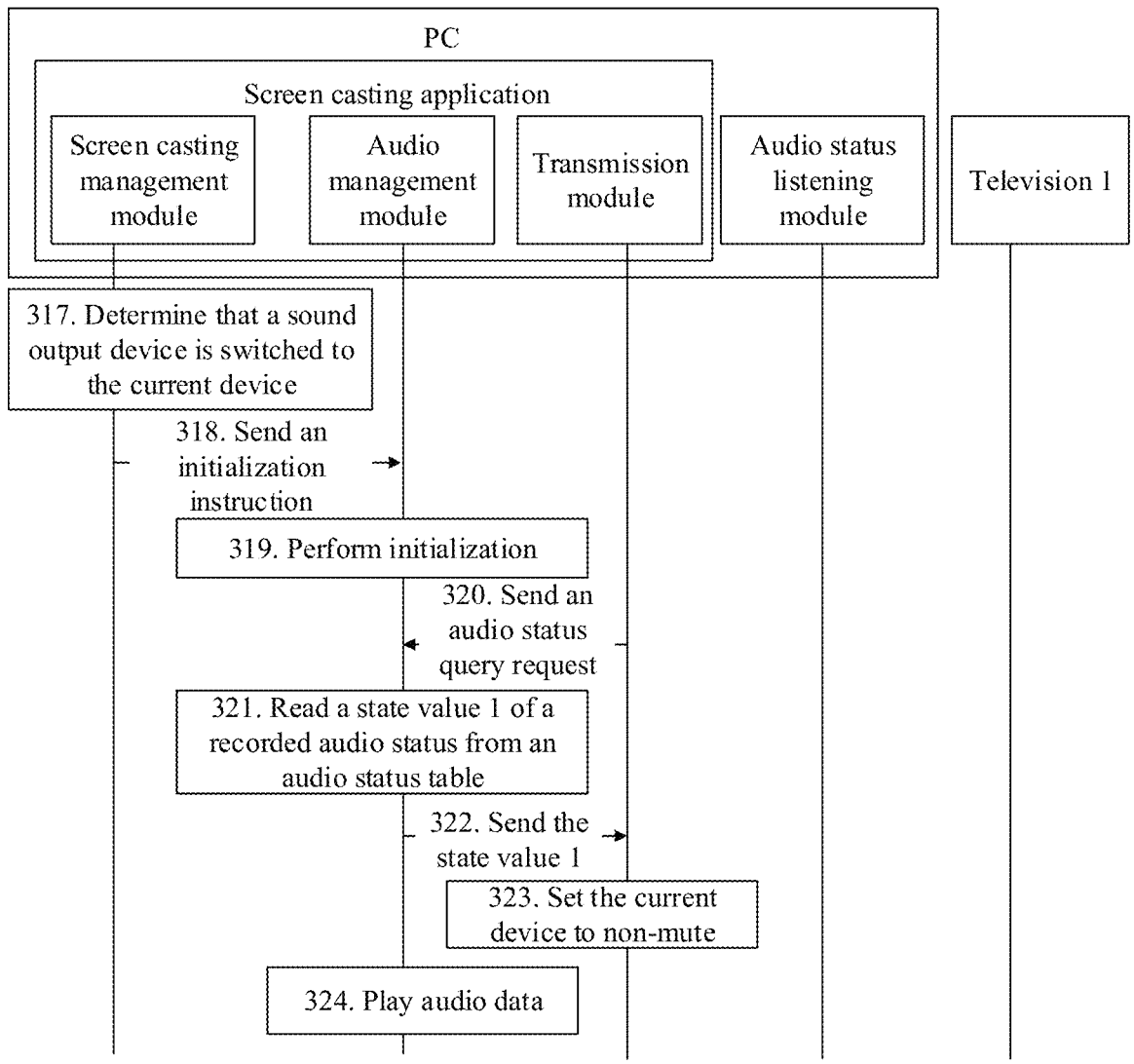
FIG. 24 is a schematic diagram 2 illustrating an example in which a lower-layer transmission module sets an audio status of a screen casting transmit end.

Further, after the screen casting information of the PC is sent to the television 1, and the television 1 starts to play a picture in the screen casting information and plays audio data, if the user switches the sound output device from the television 1 to the PC, for a process of setting the audio status of the PC, references can be made to FIG. 24.

For example, if the screen casting management module detects, through listening, an operation in which the user switches the sound output device, and determines that the sound output device is switched to the current device, that is, after an operation of step 315, the screen casting management module sends an initialization instruction to the audio management module again, that is, performs step 316.

Correspondingly, after receiving the initialization instruction sent by the screen casting management module, the audio management module performs step 317 of performing an initialization operation, for example, implements initialization by invoking the audioContol.Init( ) interface.

Because the operation of setting the audio status of the current device in the embodiments is implemented by the transmission module, when the sound output device is switched to the PC, to ensure that the set audio status is consistent with an audio status expected by the user, the transmission module needs to send an audio status query request to the audio management module that manages the audio status table, that is, performs step 318.

Correspondingly, after receiving the audio status query request sent by the transmission module, the audio management module reads the state value of the recorded audio status from the audio status table, and sends the read state value to the transmission module.

For example, if the state value of the audio status recorded in the audio status table is "1", that is, the user modifies the audio status of the PC into the non-mute state before screen casting or in the screen casting process, after receiving the audio status query request sent by the transmission module, the audio management module reads the state value "1" of the recorded audio status from the audio status table, that is, performs content of step 319.

Then, the audio management module sends the read state value "1" to the transmission module, that is, performs step 320.

Then, the transmission module performs step 321 based on the received state value "1": setting the current device to the non-mute state.

For example, if the state value of the audio status recorded in the audio status table is "0", that is, the user modifies the audio status of the PC into the mute state before screen casting or in the screen casting process, after receiving the audio status query request sent by the transmission module, the audio management module reads the state value "0" of the recorded audio status from the audio status table.

Then, the audio management module sends the read state value "0" to the transmission module. Then, the transmission module sets the current device to the mute state based on the received state value "0".

Correspondingly, after reading the state value from the audio status table and then sending the read state value to the transmission module, the audio management module performs step 322: playing the audio data.

It may be understood that the audio status of the PC is set to the mute state. Therefore, even if the audio data is played by the PC, because the audio status of the PC is the mute state, the PC does not output a sound in a process of playing the audio data.

In addition, it should be noted that, although operations performed by the audio status listening module are not shown in FIG. 24, after being enabled, the audio status listening module is always in a working state in the entire screen casting process, that is, in a process of performing step 315 to step 322, provided that the user modifies the audio status, the operations of step 307 to step 309 in FIG. 23A and FIG. 23B are performed.

In addition, because a screen casting scenario shown in FIG. 24 is that the user switches the sound output device from the television 1 to the PC, the transmission module no longer sends the audio data packet to the television 1, and the television 1 receives no audio data packet, and does not output a sound.

In addition, it may be understood that, because the technical solutions provided in the embodiments are specific to the audio data in the screen casting scenario, sending of video data is not shown in the figure.

Therefore, the following process is implemented: In the screen casting process, the sound output device is switched from the television 1 to the PC, and then the transmission module sets the audio status of the PC based on the state value recorded in the audio status table. In this way, after the sound output device is modified into the PC, the audio status of the PC can be consistent with an audio status set by the user.

Figure 25:
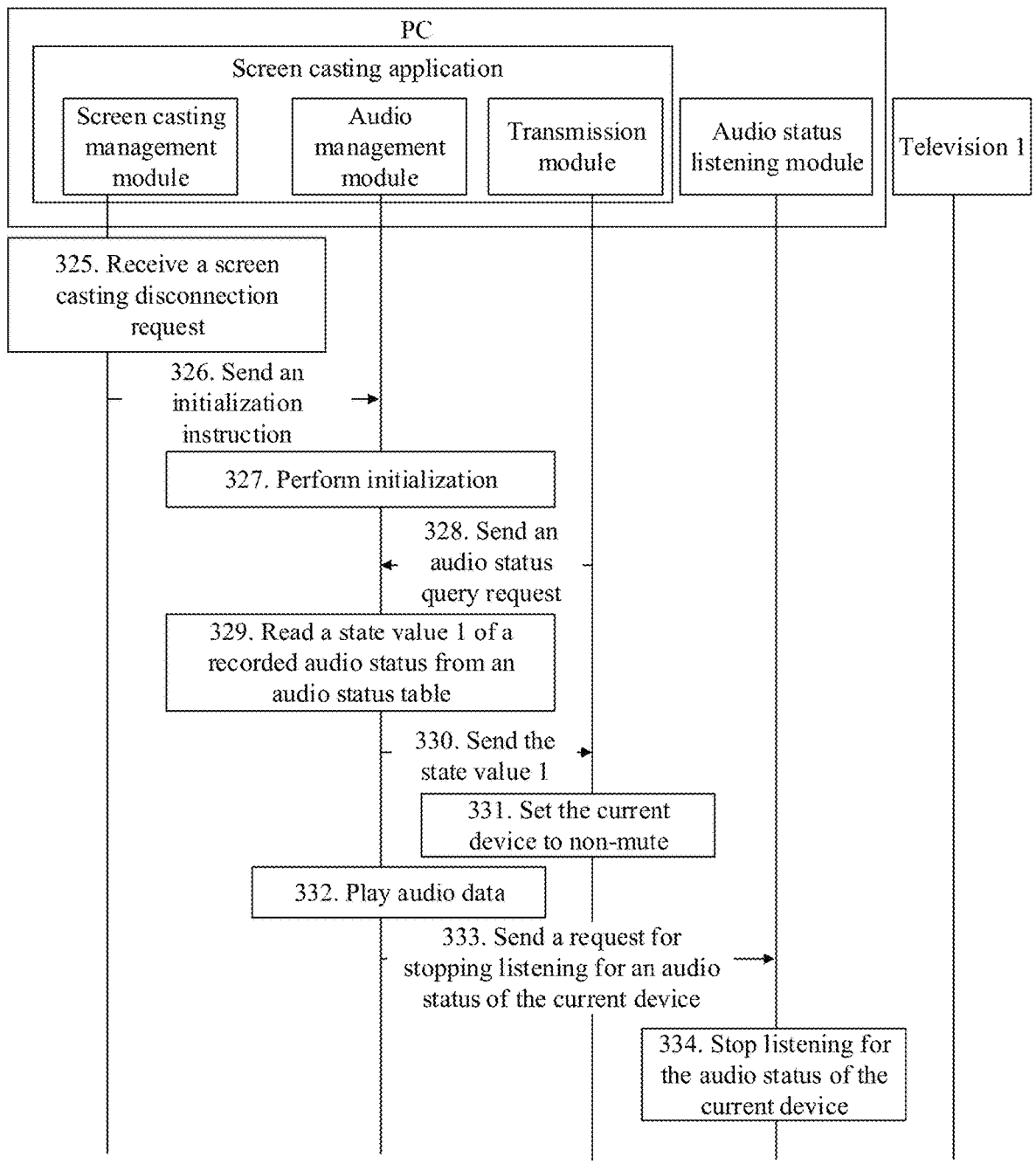
FIG. 25 is a schematic diagram 3 illustrating an example in which a lower-layer transmission module sets an audio status of a screen casting transmit end.

Further, after the operations in FIG. 24 are completed, the PC starts to play the audio data, and the television 1 continues to play the picture/video data in the screen casting information, if the user clicks the disconnect option 10-5 in FIG. 7, for a process of setting the audio status of the PC, references can be made to FIG. 25.

For example, if the screen casting management module receives a screen casting disconnection request, that is, performs an operation of step 323, the screen casting management module sends an initialization instruction to the audio management module again, that is, performs step 324.

Correspondingly, after receiving the initialization instruction sent by the screen casting management module, the audio management module performs step 325 of performing an initialization operation, for example, implements initialization by invoking the audioContol.Init( ) interface.

Because the operation of setting the audio status of the current device in the embodiments is implemented by the transmission module, when the sound output device is switched to the PC, to ensure that the set audio status is consistent with an audio status expected by the user, the transmission module needs to send an audio status query request to the audio management module that manages the audio status table, that is, performs step 326.

Correspondingly, after receiving the audio status query request sent by the transmission module, the audio management module reads the state value of the recorded audio status from the audio status table, and sends the read state value to the transmission module.

For example, if the state value of the audio status recorded in the audio status table is "1", that is, the user modifies the audio status of the PC into the non-mute state before screen casting or in the screen casting process, after receiving the audio status query request sent by the transmission module, the audio management module reads the state value "1" of the recorded audio status from the audio status table, that is, performs content of step 327.

Then, the audio management module sends the read state value "1" to the transmission module, that is, performs step 328.

Then, the transmission module performs step 329 based on the received state value "1": setting the current device to the non-mute state.

For example, if the state value of the audio status recorded in the audio status table is "0", that is, the user modifies the audio status of the PC into the mute state before screen casting or in the screen casting process, after receiving the audio status query request sent by the transmission module, the audio management module reads the state value "0" of the recorded audio status from the audio status table.

Then, the audio management module sends the read state value "0" to the transmission module. Then, the transmission module sets the current device to the mute state based on the received state value "0".

Correspondingly, after reading the state value from the audio status table and then sending the read state value to the transmission module, the audio management module performs step 330: playing the audio data.

It may be understood that the audio status of the PC is set to the mute state. Therefore, even if the audio data is played by the PC, because the audio status of the PC is the mute state, the PC does not output a sound in a process of playing the audio data.

In addition, after screen casting disconnection, the audio management module further sends, to the audio status listening module, a request for stopping listening for the audio status of the current device, that is, performs step 331.

Correspondingly, after receiving the request that is sent by the audio management module and that is for stopping listening for the audio status of the current device, the audio status listening module performs an operation of step 332: stopping listening for the audio status of the current device.

For example, the audio status listening module may invoke, for example, a pre-encapsulated StopNotifyVolChange( ) interface to stop listening for the audio status of the current device.

Therefore, in the screen casting solution provided in this application, the audio status of the screen casting transmit end is set by the transmission module in the screen casting process, so that screen casting applications using different protocols can perform personalized settings based on actual requirements, thereby making the screen casting solution provided in this application more diversified.

In addition, it should be understood that the method interfaces used in the foregoing embodiments are merely examples provided to better understand the technical solutions of the embodiments, and are not used as a unique limitation on the embodiments.

In addition, it should be noted that in some other implementation scenarios, for example, in a solution in which the screen casting method provided in the embodiments is not used, after the user switches the sound output device from the television 200 to the PC device 100, regardless of whether the user modifies an audio status of the PC device in a screen casting process, the PC device 100 outputs a sound in the screen casting process, and the television 200 does not output a sound. In addition, to ensure visual consistency; when the sound output device is switched back to the PC device 100 or screen casting disconnection is performed, the icon corresponding to the audio status switching control is modified into a non-mute icon when the PC device 100 is set to output a sound.

For example, the user sets the audio status of the PC device 100 to the mute state before screen casting or in the screen casting process. In this scenario, before the sound output device is switched back to the PC device 100, the icon corresponding to the audio status switching control is a mute icon, for example, an icon corresponding to the audio status switching control 20-2 in FIG. 11.

It may be understood that in actual application, the audio status switching control needs to be displayed by performing a click operation on the sound setting option 20. Therefore, to maintain consistency between the audio status switching control and the sound setting option, when the audio status switching control corresponds to the mute icon, an icon corresponding to the sound setting option 20 is also the mute icon.

Figure 26:
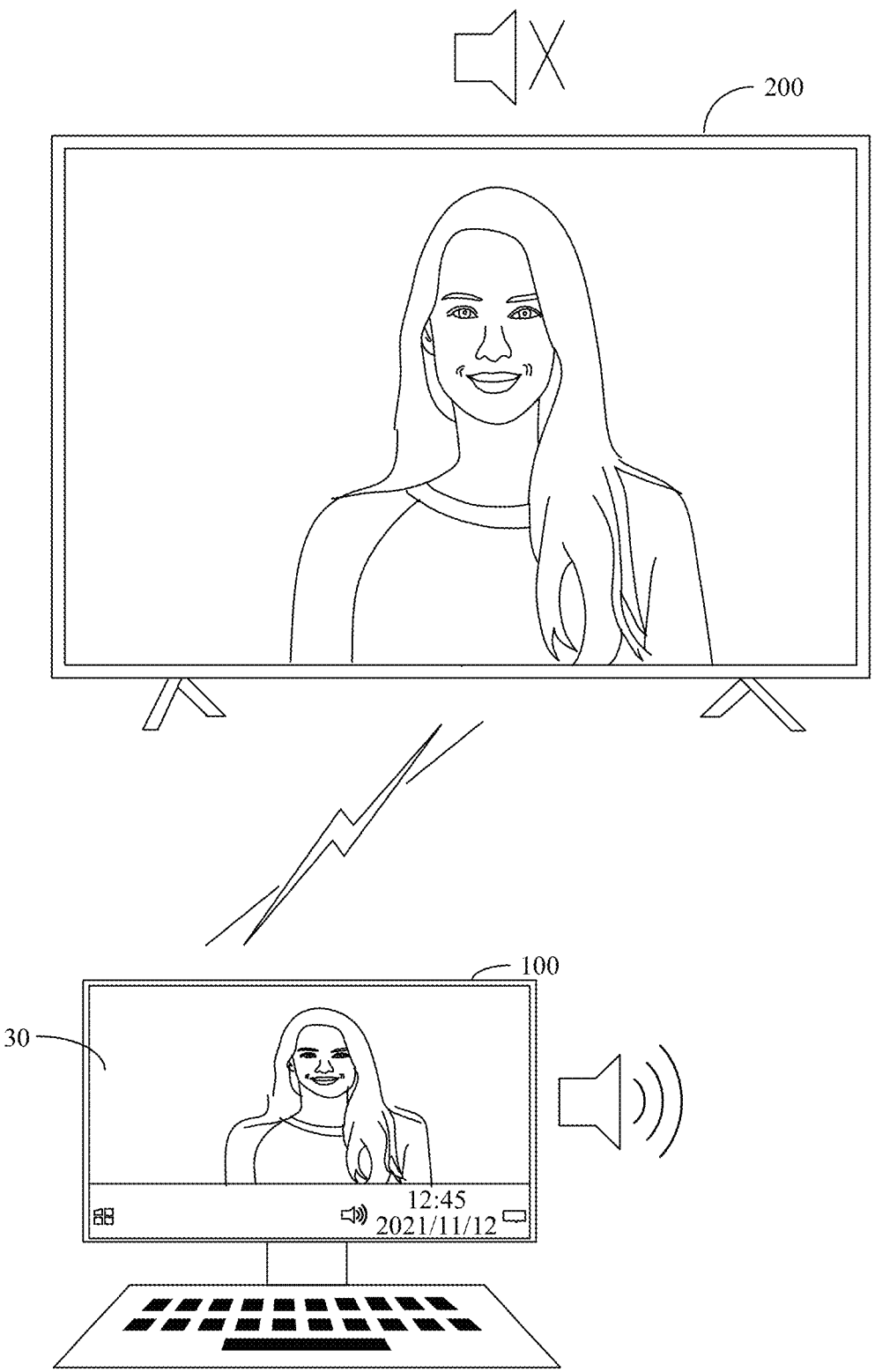
FIG. 26 is a schematic diagram 3 illustrating an example of sound changes that are of a screen casting transmit end and a screen casting receive end and that are made after a sound output device is switched to a current device.

Therefore, to enable the icon corresponding to the audio status switching control 20-2 (or the sound setting option 20) to be consistent with the audio status of the PC device 100 when the sound output device is switched to the PC device 100 when screen casting disconnection is performed or in the screen casting process, the icon corresponding to the audio status switching control 20-2 (or the sound setting option 20) is modified into the non-mute icon, as shown in FIG. 26. However, this manner still cannot meet an actual user requirement because an audio status that is of the PC device 100 and that is actually set by the user is the mute state, but the icon becomes the non-mute icon in this case.

For the foregoing technical problem, the technical solutions provided in the embodiments of this application are also applicable.

For ease of description, in the embodiments, the technical solutions provided in this application are specifically described by using an example in which the audio status of the PC device 100 is the non-mute state, that is, can output a sound, before screen casting.

For example, the audio status switching control shown by 20-2 in FIG. 10 (in this case, the icon is also shown in FIG. 10) and the volume slider control shown by 20-3 in FIG. 10 are displayed in the display interface of the PC device 100. When the PC device 100 plays the audio data based on a volume value corresponding to the volume slider control 20-3, after receiving a click operation on the audio status switching control 20-2, the PC device 100 stops, in response to the click operation, outputting a sound, and modifies the icon corresponding to the volume status switching control 20-2 from the non-mute icon into the mute icon, that is, from the pattern shown in FIG. 10 into the pattern shown in FIG. 11.

It can be learned from the descriptions of the foregoing embodiments, in some implementations, the audio status switching control 20-2 and the volume slider control 20-3 are popped up by using an operation performed by the user on the sound setting option 20 in the display interface. For content of this part, refer to the foregoing embodiments. Details are not described herein again.

Figure 27:
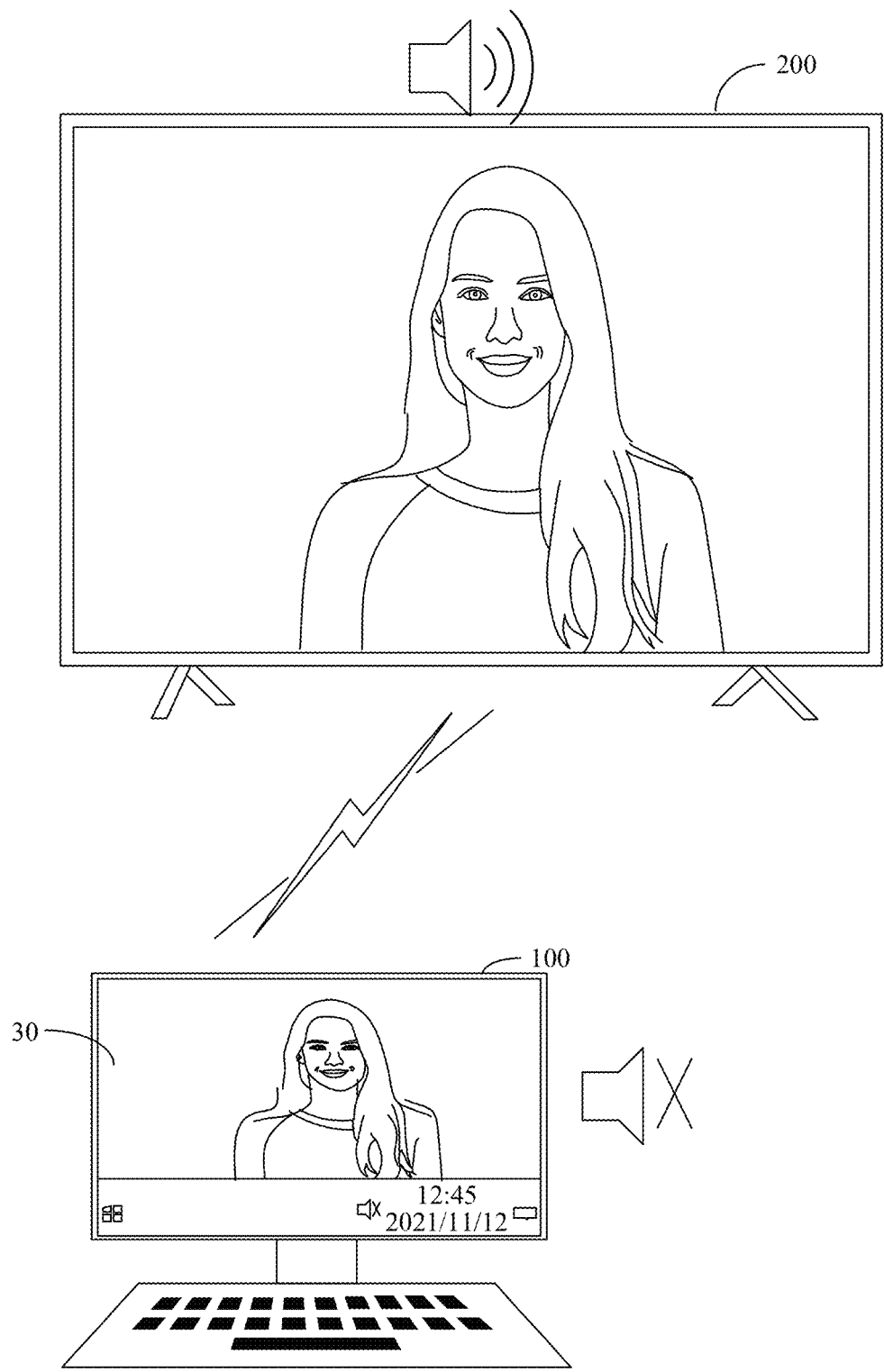
FIG. 27 is a schematic diagram 4 illustrating an example of sound changes that are of a screen casting transmit end and a screen casting receive end and that are made after a sound output device is switched to a current device.

For example, after the PC device 100 establishes a screen casting connection to the television 200, the television 200 plays the audio data, and the PC device 100 does not output a sound, as shown in FIG. 27.

For details of the operation in which the PC device 100 establishes the screen casting connection to the television 200, refer to the descriptions in the foregoing embodiments. Details are not described herein again.

For example, after receiving a click operation for switching the sound output device from the screen casting receive end to the screen casting transmit end, the screen casting transmit end stops, in response to the click operation, sending the audio data to the screen casting receive end, keeps mute, and keeps the icon corresponding to the volume status switching control as the mute icon, as shown in FIG. 15.

For details of an implementation of switching the sound output device, refer to the descriptions in the foregoing embodiments. Details are not described herein again.

Further, based on the foregoing implementation scenario, that is, when the sound output device is switched to the PC device 100 in the screen casting process, a current audio status of the PC device 100 is the mute state, that is, the PC device 100 does not output a sound, and the icon is the mute icon, if receiving a click operation performed by the user on the audio status switching control, the PC device 100 plays, in response to the click operation, the audio data based on the volume value corresponding to the volume slider control, and modifies the icon corresponding to the volume status switching control from the mute icon into the non-mute icon, that is, the PC device 100 switches from a state shown in FIG. 27 to a state shown in FIG. 26.

Further, if the PC device 100 again receives, after switching from the state shown in FIG. 27 to the state shown in FIG. 26, a click operation performed by the user on the audio status switching control, the PC device 100 stops, in response to the click operation, outputting a sound, and modifies the icon corresponding to the volume status switching control from the non-mute icon into the mute icon, that is, the PC device 100 switches from the state shown in FIG. 26 to a state shown in FIG. 15.

Further, based on the foregoing implementation scenario, that is, the PC device 100 is set to mute before screen casting, if the user does not modify the audio status of the PC device 100 after the screen casting connection is established, that is, if the user does not modify the audio status of the PC device 100 in the screen casting process, the audio status of the PC device 100 is still the mute state. When receiving a click operation for breaking the screen casting connection between the PC device 100 and the television 200, the PC device 100 stops, in response to the click operation, sending the audio data to the television 200, keeps mute, and keeps the icon corresponding to the volume status switching control as the mute icon, as shown in, for example, FIG. 17.

In addition, in some implementation scenarios, the user may modify the audio status of the PC device 100 in the screen casting process. For example, the PC device 100 is set to mute before screen casting. After the screen casting connection is established, if receiving a click operation on the audio status switching control, the PC device 100 records, in response to the click operation, that the audio status of the PC device 100 is changed to the non-mute state, that is, when screen casting disconnection is performed or the sound output device is changed to the PC device 100, the PC device 100 can output a sound.

In addition, it should be understood that because the PC device 100 currently still establishes the screen casting connection to the television 200, and the television 200 is the sound output device in this case, the icon corresponding to the audio status switching control of the PC device 100 is still kept as the mute icon, that is, the PC device 100 and the television 200 still keep in states shown in FIG. 27.

Correspondingly, if the PC device receives a click operation for switching the sound output device from the television 200 to the PC device 100, the PC device 100 stops, in response to the click operation, sending the audio data to the television 200, plays the audio data based on the volume value corresponding to the volume slider control and based on a recorded audio status of the PC device 100, for example, the non-mute state in this case, and modifies the icon corresponding to the volume status switching control from the mute icon into the non-mute icon, that is, the PC device 100 switches from the state shown in FIG. 27 to the state shown in FIG. 26.

Further, after the screen casting connection is established, if receiving a click operation on the audio status switching control, the PC device 100 records, in response to the click operation, that the audio status of the PC device 100 is changed to the non-mute state, and still keeps the icon corresponding to the audio status switching control as the non-mute icon. Subsequently, when receiving a click operation for breaking the screen casting connection between the PC device 100 and the television 200, the PC device 100 stops, in response to the click operation, sending the audio data to the television 200. In addition, because the recorded audio status is the non-mute state, the audio data is played based on the volume value corresponding to the volume slider control. In addition, to keep consistency between the icon and the audio status, the icon corresponding to the volume status switching control is modified from the mute icon into the non-mute icon, as shown in, for example, FIG. 28.

Therefore, the following case is implemented: The PC device 100 is in the mute state before screen casting, the sound output device is switched in the screen casting process, and the audio status of the PC device 100 and the icon are changed and set when screen casting disconnection is performed.

In addition, it should be noted that in some other implementation scenarios, for example, before screen casting, the PC device is in the non-mute state, that is, the PC device 100 can output a sound, and the icon corresponding to the audio status switching control is the non-mute icon, as shown in, for example, FIG. 9. In this scenario, if the user does not manually modify the non-mute state of the PC device 100 in the screen casting process after the PC device 100 establishes the screen casting connection to the television 200, that is, the PC device 100 and the television 200 keep in states shown in FIG. 27 in the screen casting process, when the sound output device is changed to the PC device 100, the icon corresponding to the audio status switching control of the PC device 100 is changed to the non-mute icon, and the PC device 100 outputs a sound, as shown in FIG. 26.

Figure 28:
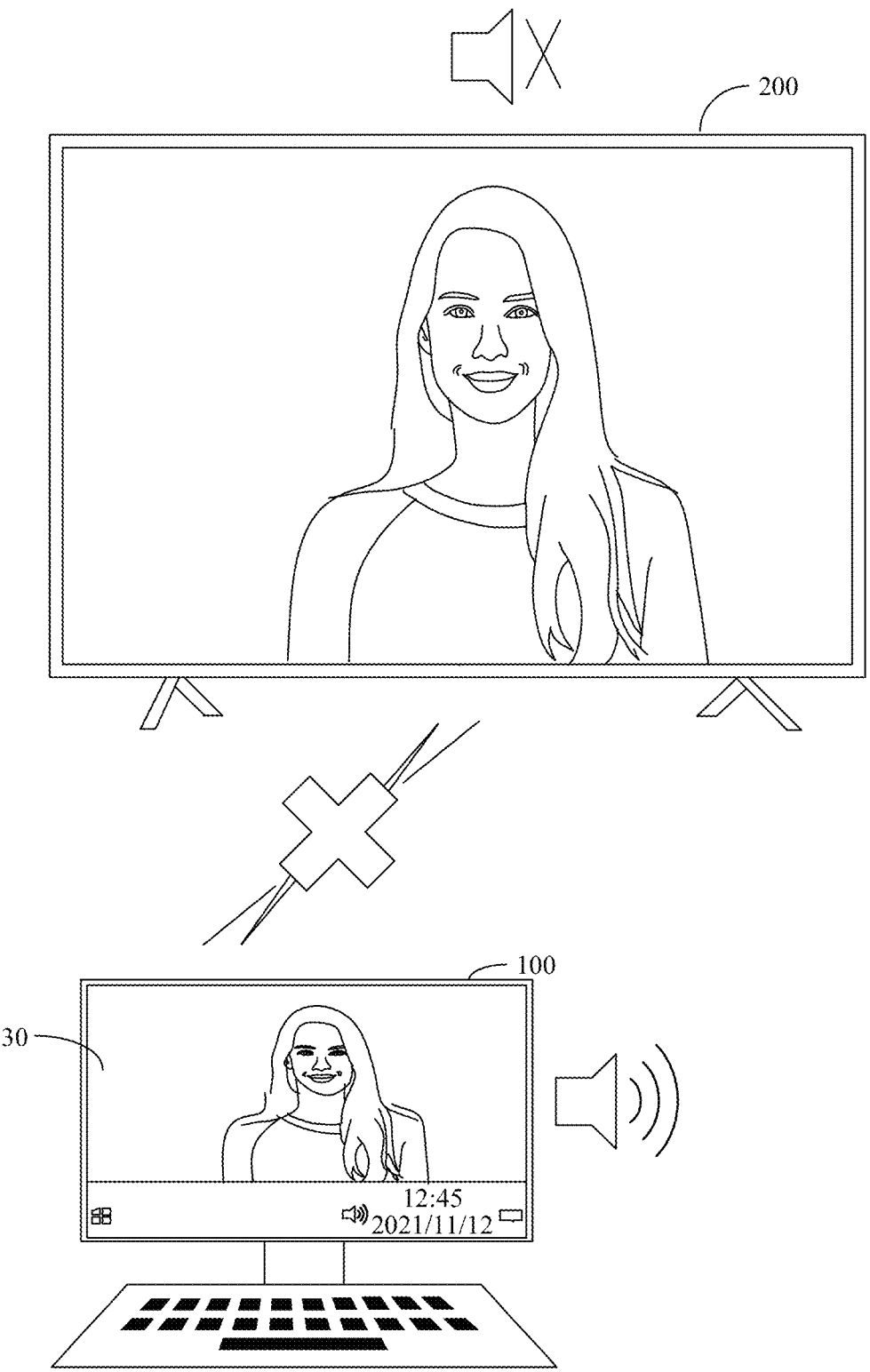
FIG. 28 is a schematic diagram 3 illustrating an example of sound changes that are of a screen casting transmit end and a screen casting receive end and that are made after screen casting disconnection.

Correspondingly, in the foregoing scenario, if the user does not manually modify the non-mute state of the PC device 100 in the screen casting process after the PC device 100 establishes the screen casting connection to the television 200, that is, the PC device 100 and the television 200 keep in the states shown in FIG. 27 in the screen casting process, after screen casting disconnection, the icon corresponding to the audio status switching control of the PC device 100 is changed to the non-mute icon, and the PC device 100 outputs a sound, as shown in FIG. 28.

In addition, it may be understood that, a volume of audio data played by the television 200 is associated with a volume of audio data provided by the PC device 100. Therefore, in some implementation scenarios, the user may operate the volume slider control in the display interface of the PC device 100 to adjust the volume of the audio data played by the television 200, that is, after a click operation on the volume slider control is received, the television 200 plays the audio data based on an adjusted volume value.

In addition, in some other implementation scenarios, the PC device 100 may play a sound by using a built-in audio device such as a speaker or by using an external audio device such as a headset (which may be a Bluetooth headset, a wired headset, or the like) or acoustic equipment. Therefore, when the PC device 100 establishes a screen casting connection to the television 200, there may be a phenomenon that the television 200 cannot obtain the audio data from the PC device 100 and consequently the television 200 cannot output a sound.

To resolve this problem, this application provides another implementation. For ease of description, the following provides descriptions by using an example in which an audio device currently used by the PC device 100 is a built-in speaker and a headset is inserted in a screen casting process.

Still referring to FIG. 9, for example, if the user wants to switch the audio device currently used by the PC device 100 from the speaker to a headset 1 in the screen casting process, the user may first click the sound setting control 20.

Figure 29:
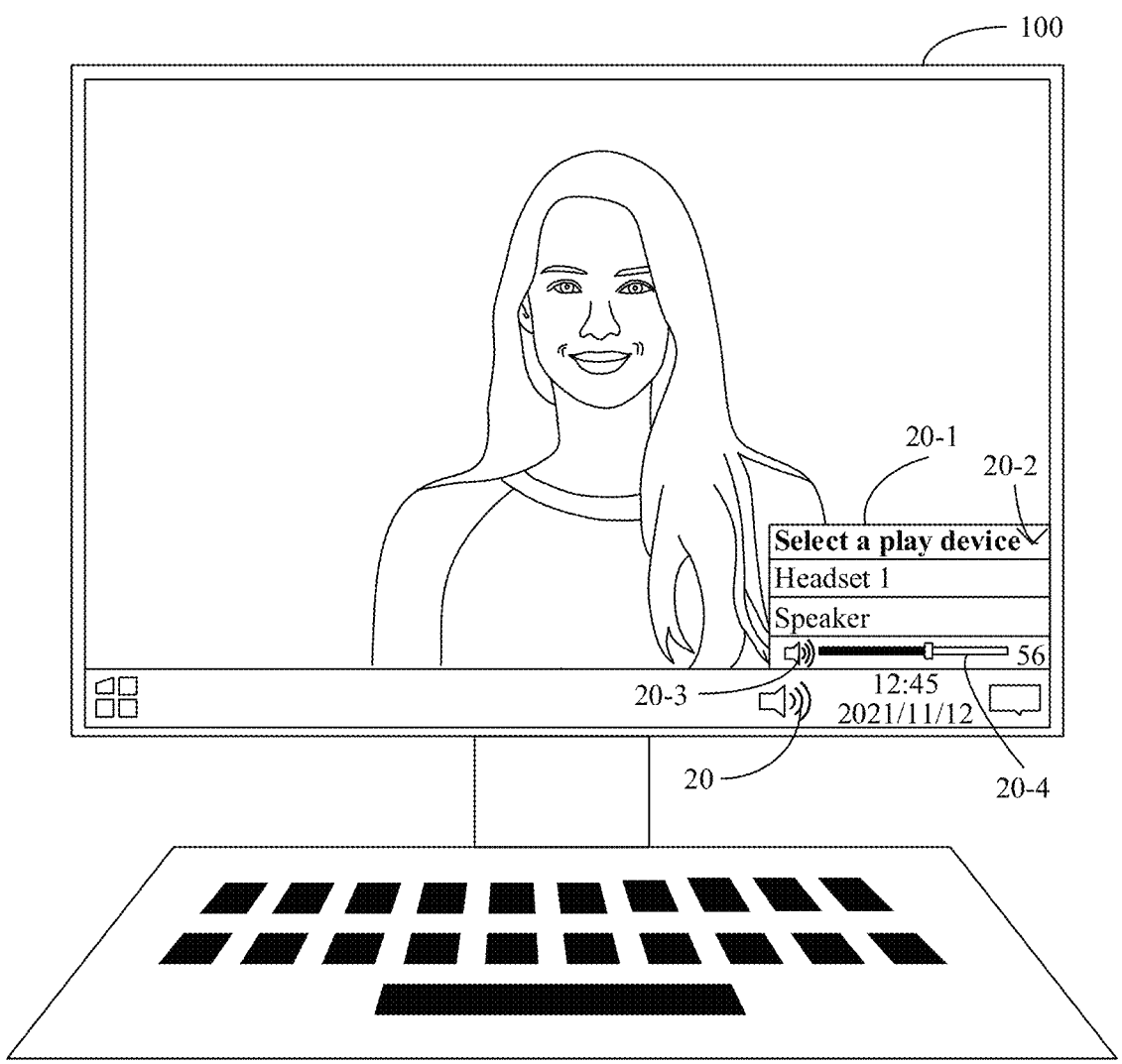
FIG. 29 is a schematic diagram 1 illustrating an example of switching an audio device of a screen casting transmit end.

Correspondingly, after the user clicks the sound setting control 20, the PC device 100 displays the sound setting window 20-1 in response to the operation behavior of the user, as shown in FIG. 29.

Still referring to FIG. 29, for example, the sound setting window 20-1 displays an audio device selection control 20-2, the currently used audio device such as the speaker, and an audio status switching control 20-3 and a volume slider control 20-4 for volume adjustment that correspond to the speaker.

Still referring to FIG. 29, when the user clicks the audio device selection control 20-2, the PC device 100 displays, in response to the operation behavior of the user, a list for selecting a play device, as shown in FIG. 29.

Referring to FIG. 29, for example, the list for selecting a play device displays all audio devices that can be selected by the PC device 100, such as the headset 1 and the speaker in FIG. 29.

Figure 30:
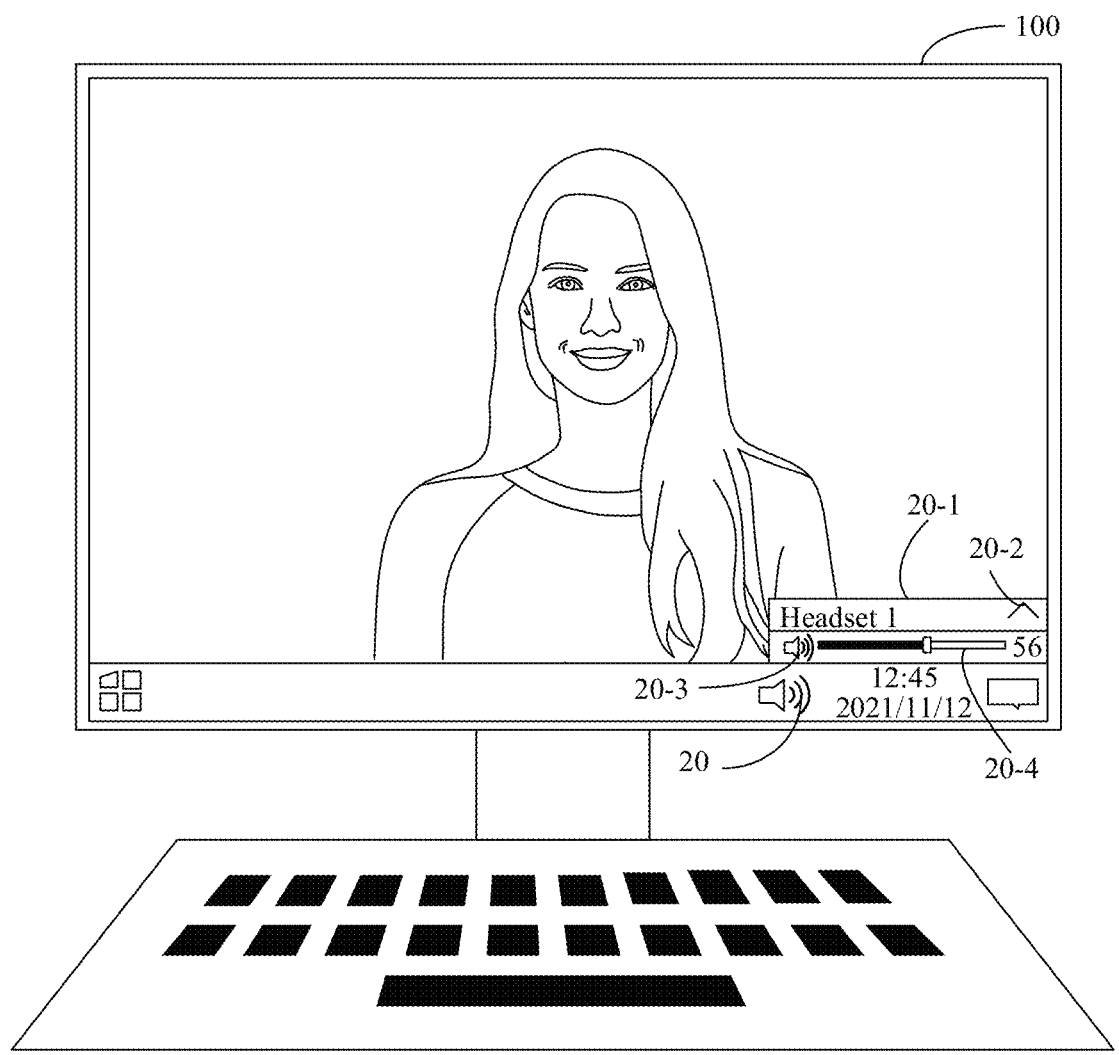
FIG. 30 is a schematic diagram 2 illustrating an example of switching an audio device of a screen casting transmit end.

Still referring to FIG. 29, when the user clicks a "headset 1" option, the PC device 100 switches the currently used audio device from the speaker to the headset 1 in response to the operation behavior of the user, and content displayed in the sound setting window 20-1 after switching is shown in FIG. 30.

It may be understood that in the foregoing descriptions, the speaker and the headset 1 share one audio status switching control 20-3 and one volume slider control 20-4 for volume adjustment.

Specifically, in this case, when the audio device currently used by the PC device 100 is the speaker, operations on the audio status switching control 20-3 and the volume slider control 20-4 for volume adjustment are essentially adjusting an audio status and a volume of the speaker.

Correspondingly, when the audio device currently used by the PC device 100 is the headset 1, operations on the audio status switching control 20-3 and the volume slider control 20-4 for volume adjustment are essentially adjusting an audio status and a volume of the headset 1.

It may be understood that, for implementation of this manner, in some examples, a mapping relationship among a current audio status of the audio status switching control 20-3, a current volume value of the volume slider control 20-4, and a currently used audio device may be maintained. Therefore, when it is detected that the audio device is changed, a displayed audio status corresponding to the audio status switching control 20-3 and a displayed volume value corresponding to the volume slider control 20-4 are adjusted based on the change.

In addition, it may be understood that in some other implementation scenarios, based on a quantity of audio devices that can be selected by the PC device 100, audio status switching controls 20-3 and volume slider controls 20-4 for volume adjustment that respectively correspond to the audio devices may be set. In this way, when the audio devices are changed, audio statuses and volume values may be set by using the audio status switching controls 20-3 and the volume slider controls 20-4 for volume adjustment that respectively correspond to the audio devices.

In addition, it should be noted that, specifically, in an actual application scenario, after the PC device 100 establishes a screen casting connection to the large-screen device, that is, in the screen casting process, the user may further manually modify an audio status of the audio device currently used by the PC device 100. Therefore, to ensure that the state value of the initial audio status recorded in the audio status table can be dynamically updated based on actual modification performed by the user, listening needs to be performed on the audio status switching control.

Specifically, in the embodiments, to detect, through listening, whether the user clicks the audio status switching control corresponding to the audio device currently used by the PC device 100, the audio status listening module provided by the system used by the PC device 100 is used. For listening, by using the audio status listening module, for a change of the audio status of the audio device currently used by the PC device 100, refer to the descriptions in the foregoing embodiments. Details are not described herein again.

It is not difficult to find that in the technical solutions provided in the embodiments, listening for the audio status of the audio device currently used by the PC device 100 is the same as that in the foregoing embodiments, and the embodiments mainly focus on the following case: When a plurality of audio devices can be selected by the PC device 100, a currently selected audio device is determined based on an identification number of the audio device. Further, when the television 200 is selected as the sound output device in the screen casting process, audio data can be obtained from a sound channel corresponding to the determined audio device, thereby ensuring that in the screen casting process, when the television 200 is selected to output a sound, the television 200 can always obtain audio data that can be played.

It should be understood that the foregoing description is merely an example provided to better understand the technical solutions of the embodiments, and is not used as a unique limitation on the embodiments.

In addition, it should be noted that, in an actual application scenario, the system screen casting method that is provided in the foregoing embodiments and that is implemented by an electronic device may be alternatively performed by a chip system included in the electronic device. The chip system may include a processor. The chip system may be coupled to a memory, so that when the chip system runs, a computer program stored in the memory is invoked to implement the foregoing steps performed by the electronic device. The processor in the chip system may be an application processor or a processor that is not an application processor.

In addition, an embodiment of this application further provides a computer-readable storage medium. The computer storage medium stores computer instructions. When the computer instructions are run on an electronic device, the electronic device is enabled to perform the foregoing related method steps to implement the system screen casting method in the foregoing embodiments.

In addition, an embodiment of this application further provides a computer program product. When the computer program product is run on an electronic device, the electronic device is enabled to perform the foregoing related steps to implement the system screen casting method in the foregoing embodiments.

In addition, an embodiment of this application further provides a chip (which may be alternatively a component or a module). The chip may include one or more processing circuits and one or more transceiver pins. The transceiver pin and the processing circuit communicate with each other by using an internal connection path. The processing circuit performs the foregoing related method steps to implement the system screen casting method in the foregoing embodiments, to control a receive pin to receive a signal and control a transmit pin to send a signal.

In addition, it may be learned from the foregoing descriptions that, the electronic device, the computer-readable storage medium, the computer program product, or the chip provided in the embodiments of this application may be configured to perform the corresponding method provided above. Therefore, for beneficial effects that can be achieved by the electronic device, the computer-readable storage medium, the computer program product, or the chip, refer to the beneficial effects of the corresponding method provided above. Details are not described herein again.

As described above, the foregoing embodiments are merely intended for describing the technical solutions of this application, but not for limiting this application. Although this application is described in detail with reference to the foregoing embodiments, persons of ordinary skill in the art should understand that they can still make modifications to the technical solutions described in the foregoing embodiments or make equivalent replacements to some technical features thereof, without departing from the scope of the technical solutions of the embodiments of this application.

What is claimed is:

1. An electronic device, wherein the electronic device is a screen casting transmit end and comprises a memory and a processor, the memory is coupled to the processor, the processor is configured to:
   display an audio status switching control and a volume slider control in a display interface of the screen casting transmit end;
   when the screen casting transmit end plays audio data based on a volume value corresponding to the volume slider control, after receiving a click operation on the audio status switching control, stop, by the screen casting transmit end in response to the click operation, outputting a sound, record mute in an audio status table as an initial audio status, and modify an icon corresponding to the audio status switching control from a non-mute icon into a mute icon;
   play the audio data by using a screen casting receive end after the screen casting transmit end establishes a screen casting connection to the screen casting receive end; and
   after receiving a click operation for switching a sound output device from the screen casting receive end to the screen casting transmit end, stop, by the screen casting transmit end in response to the click operation, sending the audio data to the screen casting receive end, keeping mute based on the initial audio status recorded in the audio status table, and keep the icon corresponding to the audio status switching control as the mute icon.

2. The electronic device according to claim 1, wherein the processor is further configured to:
   after stopping sending the audio data to the screen casting receive end, keeping mute, and keeping the icon corresponding to the audio status switching control as the mute icon, play, by the screen casting transmit end after receiving a click operation on the audio status switching control, the audio data based on the volume value corresponding to the volume slider control in response to the click operation, and modifying the icon corresponding to the audio status switching control from the mute icon into the non-mute icon.

3. The electronic device according to claim 2, wherein the processor is further configured to:
   after playing, by the screen casting transmit end after receiving a click operation on the audio status switching control, the audio data based on the volume value corresponding to the volume slider control in response to the click operation, and modifying the icon corresponding to the audio status switching control from the mute icon into the non-mute icon, and after receiving a click operation on the audio status switching control, stop, by the screen casting transmit end in response to the click operation, outputting a sound, and modify the icon corresponding to the audio status switching control from the non-mute icon into the mute icon.

4. The electronic device according to claim 1, wherein the processor is further configured to:
   after playing the audio data by using a screen casting receive end after the screen casting transmit end establishes a screen casting connection to the screen casting receive end, and after receiving a click operation for breaking the screen casting connection between the screen casting transmit end and the screen casting receive end, stop, by the screen casting transmit end in response to the click operation, send the audio data to the screen casting receive end, keep mute, and keep the icon corresponding to the audio status switching control as the mute icon.

5. The electronic device according to claim 1, wherein the processor is further configured to:
after playing the audio data by using a screen casting receive end after the screen casting transmit end establishes a screen casting connection to the screen casting receive end, record, by the screen casting transmit end after receiving a click operation on the audio status switching control, that an audio status of the screen casting transmit end is a non-mute state in response to the click operation, and keep the icon corresponding to the audio status switching control as the mute icon.

6. The electronic device according to claim 5, wherein the processor is further configured to:
after recording, by the screen casting transmit end after receiving a click operation on the audio status switching control, that an audio status of the screen casting transmit end is a non-mute state in response to the click operation, and keeping the icon corresponding to the audio status switching control as the mute icon, and after receiving the click operation for switching the sound output device from the screen casting receive end to the screen casting transmit end, stop, by the screen casting transmit end in response to the click operation, send the audio data to the screen casting receive end, playing the audio data based on the volume value corresponding to the volume slider control, and modify the icon corresponding to the audio status switching control from the mute icon into the non-mute icon.

7. The electronic device according to claim 5, wherein the processor is further configured to:
after recording, by the screen casting transmit end after receiving a click operation on the audio status switching control, that an audio status of the screen casting transmit end is a non-mute state in response to the click operation, and keeping the icon corresponding to the audio status switching control as the mute icon, and after receiving a click operation for breaking the screen casting connection between the screen casting transmit end and the screen casting receive end, stop, by the screen casting transmit end in response to the click operation, send the audio data to the screen casting receive end, play the audio data based on the volume value corresponding to the volume slider control, and modify the icon corresponding to the audio status switching control from the mute icon into the non-mute icon.

8. The electronic device according to claim 1, wherein the processor is further configured to:
after playing the audio data by using a screen casting receive end after the screen casting transmit end establishes a screen casting connection to the screen casting receive end, and after receiving a click operation on the volume slider control, play the audio data by using the screen casting receive end based on an adjusted volume value.

9. The electronic device according to claim 1, wherein the processor is further configured to:
when the screen casting transmit end plays the audio data by using a built-in speaker, after receiving a screen casting connection request, establish, by the screen casting transmit end, the screen casting connection to the screen casting receive end in response to the screen casting connection request, obtain the audio data from a sound channel corresponding to the speaker, and send the audio data to the screen casting receive end, so that the screen casting receive end plays the audio data.

10. The electronic device according to claim 9, wherein the processor is further configured to:
after obtaining the audio data from a sound channel corresponding to the speaker, and sending the audio data to the screen casting receive end, so that the screen casting receive end plays the audio data, and after receiving the click operation for switching the sound output device from the screen casting receive end to the screen casting transmit end, stop, by the screen casting transmit end in response to the click operation, obtaining the audio data from the sound channel corresponding to the speaker, keep the speaker mute, and keeping the icon corresponding to the audio status switching control as the mute icon.

11. The electronic device according to claim 9, wherein the processor is further configured to:
after obtaining the audio data from a sound channel corresponding to the speaker, and sending the audio data to the screen casting receive end, so that the screen casting receive end plays the audio data, and after receiving the click operation for breaking the screen casting connection between the screen casting transmit end and the screen casting receive end, stop, by the screen casting transmit end in response to the click operation, obtain the audio data from the sound channel corresponding to the speaker, keep the speaker mute, and keep the icon corresponding to the audio status switching control as the mute icon.

12. The electronic device according to claim 9, wherein the processor is further configured to:
after obtaining the audio data from a sound channel corresponding to the speaker, and sending the audio data to the screen casting receive end, so that the screen casting receive end plays the audio data, and after a headset is connected to the screen casting transmit end, obtain the audio data from a sound channel corresponding to the headset, and send the audio data to the screen casting receive end, so that the screen casting receive end plays the audio data.

13. The electronic device according to claim 12, wherein the processor is further configured to:
after obtaining the audio data from a sound channel corresponding to the headset, and sending the audio data to the screen casting receive end so that the screen casting receive end plays the audio data, and after receiving a click operation on the audio status switching control, set, by the screen casting transmit end, the headset to a mute state in response to the click operation, and keep the icon corresponding to the audio status switching control as the mute icon.

14. The electronic device according to claim 13, wherein the processor is further configured to:
after setting the headset to a mute state, and keeping the icon corresponding to the audio status switching control as the mute icon, and after receiving the click operation for switching the sound output device from the screen casting receive end to the screen casting transmit end, stop, by the screen casting transmit end in response to the click operation, obtain the audio data from the sound channel corresponding to the headset, control the headset to stop outputting a sound, and keep the icon corresponding to the audio status switching control as the mute icon.

15. The electronic device according to claim 14, wherein the processor is further configured to:
after stopping obtaining the audio data from the sound channel corresponding to the headset, controlling the headset to stop outputting a sound, and keeping the icon corresponding to the audio status switching control as the mute icon, and after receiving a click operation on the audio status switching control, control, by the screen casting transmit end in response to the click operation, the headset to output a sound, and modify the icon corresponding to the audio status switching control from the mute icon into the non-mute icon.

16. The electronic device according to claim 13, wherein the processor is further configured to:
after setting the headset to a mute state, and keeping the icon corresponding to the audio status switching control as the mute icon, and after receiving the click operation for breaking the screen casting connection between the screen casting transmit end and the screen casting receive end, stop, by the screen casting transmit end in response to the click operation, obtain the audio data from the sound channel corresponding to the headset, control the headset to stop outputting a sound, and keep the icon corresponding to the audio status switching control as the mute icon.

17. A non-transitory computer-readable storage medium, comprising a computer program, wherein when the computer program is run on an electronic device, the electronic device is enabled to:
display an audio status switching control and a volume slider control in a display interface of a screen casting transmit end;
when the screen casting transmit end plays audio data based on a volume value corresponding to the volume slider control, after receiving a click operation on the audio status switching control, stop, by the screen casting transmit end in response to the click operation, outputting a sound, and modify an icon corresponding to the audio status switching control from a non-mute icon into a mute icon;
play the audio data by using a screen casting receive end after the screen casting transmit end establishes a screen casting connection to the screen casting receive end;
after receiving a click operation for switching a sound output device from the screen casting receive end to the screen casting transmit end, stop, by the screen casting transmit end in response to the click operation, sending the audio data to the screen casting receive end, keeping mute, and keep the icon corresponding to the audio status switching control as the mute icon; and
after playing the audio data by using a screen casting receive end after the screen casting transmit end establishes a screen casting connection to the screen casting receive end, record, by the screen casting transmit end after receiving a click operation on the audio status switching control, that an audio status of the screen casting transmit end is a non-mute state in response to the click operation, and keep the icon corresponding to the audio status switching control as the mute icon.

18. A screen casting method, applied to a screen casting transmit end, wherein the screen casting transmit end is a PC device, a screen casting application is installed on the PC device, and the method comprises:
displaying an audio status switching control and a volume slider control in a display interface of the screen casting transmit end;
when the screen casting transmit end plays audio data based on a volume value corresponding to the volume slider control, after receiving a click operation on the audio status switching control, stopping, by the screen casting transmit end in response to the click operation, outputting a sound, recording mute in an audio status table as an initial audio status, and modifying an icon corresponding to the audio status switching control from a non-mute icon into a mute icon;
playing the audio data by using a screen casting receive end after the screen casting transmit end establishes a screen casting connection to the screen casting receive end; and
after receiving a click operation for switching a sound output device from the screen casting receive end to the screen casting transmit end, stopping, by the screen casting transmit end in response to the click operation, sending the audio data to the screen casting receive end, keeping mute based on the initial audio status recorded in the audio status table, and keeping the icon corresponding to the audio status switching control as the mute icon.

* * * * *